(12) United States Patent
Miura et al.

(10) Patent No.: US 10,370,467 B2
(45) Date of Patent: Aug. 6, 2019

(54) POLYMER

(71) Applicant: Sumitomo Chemical Company, Limited, Tokyo (JP)

(72) Inventors: Yu Miura, Ichihara (JP); Yasutoyo Kawashima, Ichihara (JP); Kohei Ueda, Ichihara (JP); Yoshinobu Nozue, Tokyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/535,606

(22) PCT Filed: Dec. 10, 2015

(86) PCT No.: PCT/JP2015/084613
§ 371 (c)(1),
(2) Date: Jun. 13, 2017

(87) PCT Pub. No.: WO2016/098674
PCT Pub. Date: Jun. 23, 2016

(65) Prior Publication Data
US 2018/0030175 A1    Feb. 1, 2018

(30) Foreign Application Priority Data

Dec. 15, 2014 (JP) .................................. 2014-252746

(51) Int. Cl.
| | | |
|---|---|---|
| C08F 8/14 | (2006.01) | |
| C08L 23/08 | (2006.01) | |
| C08F 210/02 | (2006.01) | |
| C08F 220/14 | (2006.01) | |
| C08F 220/68 | (2006.01) | |
| C08F 220/32 | (2006.01) | |
| C08J 9/10 | (2006.01) | |

(52) U.S. Cl.
CPC .......... *C08F 210/02* (2013.01); *C08F 220/68* (2013.01); *C08J 9/103* (2013.01); *C08J 9/107* (2013.01); *C08L 23/0869* (2013.01); *C08F 2810/20* (2013.01); *C08F 2810/50* (2013.01); *C08J 2203/18* (2013.01); *C08J 2323/08* (2013.01); *C08L 2205/06* (2013.01); *C08L 2312/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,510,448 A * | 5/1970 | Byler et al. | .............. | C08K 3/04 252/511 |
| 3,642,459 A * | 2/1972 | Ilnyckyj | .................. | C08F 10/00 44/393 |
| 3,700,754 A | 10/1972 | Schmitt et al. | | |
| 4,782,110 A * | 11/1988 | Wolfe, Jr. | ............... | C08L 23/06 524/522 |
| 4,990,566 A * | 2/1991 | Hert | ...................... | C08L 23/0869 524/517 |
| 5,252,675 A | 10/1993 | Moteki et al. | | |
| 6,037,297 A | 3/2000 | Stibrany et al. | | |
| 6,200,720 B1 | 3/2001 | Tagami | | |
| 8,202,958 B2 * | 6/2012 | Demirors | .............. | C08F 110/02 526/348 |
| 10,208,192 B2 * | 2/2019 | Garcia Castro | ....... | C10L 1/1973 |
| 2005/0049373 A1 | 3/2005 | Minami et al. | | |
| 2005/0106392 A1 | 5/2005 | Sano et al. | | |
| 2007/0157509 A1 | 7/2007 | Siggelkow et al. | | |
| 2007/0225446 A1 | 9/2007 | Nakano et al. | | |
| 2009/0118451 A1* | 5/2009 | Fuchs | ................... | C08F 210/06 526/351 |
| 2010/0016513 A1 | 1/2010 | Hartmann et al. | | |

FOREIGN PATENT DOCUMENTS

| | | | | |
|---|---|---|---|---|
| EP | 0184321 A2 * | 6/1986 | ............. | C08L 23/10 |
| JP | H10152524 A | 6/1998 | | |
| JP | H10330742 A | 12/1998 | | |
| JP | H11194494 A | 7/1999 | | |

(Continued)

OTHER PUBLICATIONS

Yokota et al., "Synthesis, Structure, and Thermal Properties of Widely-Spaced Comb-Like Polymers", Polymer Journal, vol. 15, No. 12, pp. 891-898 (1983).

Yokota et al., "Synthesis of Sequence-Ordered Copolymer. Hydrogenation of Alternating Butadiene-Methyl Methacrylate Copolymer", American Chemical Society, Macromolecules, vol. 14, No. 6, Nov.-Dec. 1981.

Int'l Preliminary Report on Patentability dated Jun. 29, 2017 in Int'l Application No. PCT/JP2015/084613.

Extended European Search Report dated Nov. 30, 2018 in EP Application No. 15869879.5.

(Continued)

*Primary Examiner* — Nicole M. Buie-Hatcher
(74) *Attorney, Agent, or Firm* — Panitch Schwarze Belisario & Nadel LLP

(57) ABSTRACT

A polymer that is capable of affording a heat storage material superior in humidity permeability and shape retention after phase transition and that is superior in molding processability is provided. The polymer includes constitutional units (A) derived from ethylene, constitutional units (B) represented by a specified formula, and optionally includes constitutional units (C) represented by another specified formula. Where the total number of the units (A), the units (B), and the units (C) is 100%, the number of the units (A) accounts for 70% to 99%, the total number of the units (B) and the units (C) accounts for 1% by weight to 30% by weight. Where the total number of the units (B) and the units (C) is 100%, the number of the units (B) accounts for 1% to 100% and the number of the units (C) accounts for 0% to 99%.

11 Claims, No Drawings

(56) References Cited

FOREIGN PATENT DOCUMENTS

| JP | 2004027189 A | 1/2004 |
|---|---|---|
| JP | 2007186700 A | 7/2007 |
| JP | 2015091903 A | 5/2015 |
| WO | 99/30822 A1 | 6/1999 |
| WO | 2015156416 A1 | 10/2015 |

OTHER PUBLICATIONS

Office Action dated Apr. 26, 2016 in JP Application No. 2015561803.
Partial European Search Report dated Aug. 17, 2018 in EP Application No. 15869879.5.
Office Action dated Jan. 17, 2019 in CN Application No. 201580067900.00 (English translation).

\* cited by examiner

POLYMER

CROSS-REFERENCE TO RELATED APPLICATION

This application is a Section 371 of International Application No. PCT/JP2015/084613, filed Dec. 10, 2015, which was published in the Japanese language on Jun. 23, 2016, under International Publication No. WO 2016/098674 A1, and the disclosure of which is incorporated herein by reference.

TECHNICAL FIELD

The present invention relates to polymers composed of constitutional units derived from ethylene and prescribed constitutional units.

BACKGROUND ART

In recent years, latent heat type heat storage materials that utilize latent heat based on phase transition between solid and liquid, phase transition between crystal and amorphous, or phase transition of crystal polymorphism have attracted attention. One example of the utilization of a latent heat type heat storage material is an embodiment in which, in a residence, heat is stored in a latent heat type heat storage material in the night using nighttime power and the stored heat is utilized during the daytime as a heat source for various applications and the electric power consumption during the daytime is thereby saved.

As polymers that can be applied to latent heat type heat storage materials, there are known polymers that develop heat storage performance by emitting or absorbing latent heat through phase transition of side chains (Patent Documents 1 to 3). Patent Document 4 discloses a crystalline higher α-olefin copolymer including two or more types of higher α-olefin having 10 or more carbon atoms as a polymer having a main chain and long side chains.

PRIOR ART DOCUMENTS

Patent Document

[Patent Document 1] JP-A-2003-268358 (also published as US 2005/106392 (A1))
[Patent Document 2] JP-A-2004-27189
[Patent Document 3] JP-A-2011-528396 (also published as US 2010/016513 (A1))
[Patent Document 4] JP-A-2005-75908 (also published as US 2005/049373 (A1) and US 2006/111526 (A1))

SUMMARY OF THE INVENTION

Problems to Be Solved by the Invention

However, when the polymers disclosed in the above-cited patent documents are used for heat storage materials, the shape of the heat storage materials is difficult to be maintained because the polymers are prone to deform after the polymers undergo phase transition from crystal to amorphous, and the heat storage materials may grow mold if used as building materials for residences because they are not sufficient in moisture permeability. In addition, the molding processability of the polymers is also insufficient.

Under such circumstances, the object of the present invention is to provide a polymer that is excellent in molding processability and capable of affording a heat storage material excellent in moisture permeability and in shape retention after the polymer undergoes phase transition from crystal to amorphous.

Means for Solving the Problems

That is, the present invention relates to a polymer comprising constitutional units (A) derived from ethylene and constitutional unit (B) represented by Formula (1) below and optionally comprising at least one type of constitutional units (C) selected from the group consisting of constitutional units represented by Formula (2) below and constitutional units represented by Formula (3) below, where the total number of the units (A), the units (B), and the units (C) is 100%, the number of the units (A) accounts for 70% to 99% and the total number of the units (B) and the units (C) accounts for 1% to 30%; where the total number of the units (B) and the units (C) is 100%, the number of the units (B) accounts for 1% to 100% and the number of the units (C) accounts for 0% to 99%,

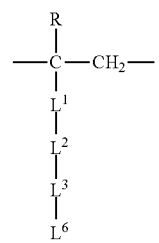

Formula (1)

in Formula (1),

R represents a hydrogen atom or a methyl group,
$L^1$ represents —CO—O—, —O—CO—, or —O—,
$L^2$ represents a single bond, —CH$_2$—, —CH$_2$—CH$_2$—, —CH$_2$—CH$_2$—CH$_2$—, —CH$_2$—CH(OH)—CH$_2$—, or —CH$_2$—CH(CH$_2$OH)—,
$L^3$ represents a single bond, —CO—O—, —O—CO—, —O—, —CO—NH—, —NH—CO—, —CO—NH—CO—, —NH—CO—NH—, —NH—, or —N(CH$_3$)—,
$L^6$ represents an alkyl group having 14 to 30 carbon atoms;

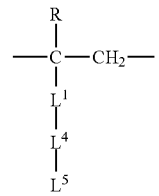

Formula (2)

in Formula (2),

R represents a hydrogen atom or a methyl group,
$L^1$ represents —CO—O—, —O—CO—, or —O—,
$L^4$ represents an alkylene group having 1 to 8 carbon atoms,
$L^5$ represents a hydrogen atom, an epoxy group, —CH(OH)—CH$_2$OH, a carboxyl group, a hydroxyl group, an amino group, or an alkylamino group having 1 to carbon atoms;

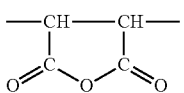
Formula (3)

in each of the horizontal chemical formulae represented by $L^1$, $L^2$, or $L^3$ in Formula (1) and Formula (2) above, the left side thereof corresponds to the top side of Formula (1) and the right side thereof corresponds to the bottom side of Formula (1).

Advantageous Effects of the Invention

According to the present invention, there can be provided a polymer which can afford a heat storage material superior in shape retention after the polymer undergoes crystal to amorphous and which is superior in molding processability.

MODE FOR CARRYING OUT THE INVENTION

The polymer of the present invention has constitutional units (A) derived from ethylene such that the shape retention of a heat storage material containing the polymer after the polymer undergoes phase transition from crystal to amorphous and the molding processability of the polymer are good. The units (A) are constitutional units produced by polymerizing ethylene, and the units (A) may form a branched structure in the polymer.

The polymer of the present invention has constitutional units (B) represented by Formula (1) below such that the moisture permeability of a heat storage material containing the polymer is good.

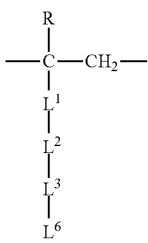
Formula (1)

In Formula (i),
R represents a hydrogen atom or a methyl group,
$L^1$ represents —CO—O—, —O—CO—, or —O—,
$L^2$ represents a single bond, —CH$_2$—, —CH$_2$—CH$_2$—, —CH$_2$—CH$_2$—CH$_2$—, —CH$_2$—CH(OH)—CH$_2$—, or —CH$_2$—CH(CH$_2$OH)—,
$L^3$ represents a single bond, —CO—O—, —O—CO—, —O—, —CO—NH—, —NH—CO—, —CO—NH—CO—, —NH—CO—NH—, —NH—, or —N(CH$_3$)—,
$L^6$ represents an alkyl group having 14 to 30 carbon atoms;
Preferably, R is a hydrogen atom.
$L^1$ is preferably —CO—O— or —O—CO—, and more preferably —CO—O—.
$L^2$ is preferably a single bond, —CH$_2$—, —CH$_2$—CH$_2$—, or —CH$_2$—CH$_2$—CH$_2$—, and more preferably a single bond.
$L^3$ is preferably a single bond, —O—CO—, —O—, —NH—, or —N(CH$_3$)—, and more preferably a single bond.

$L^6$ in Formula (1) is an alkyl group having 14 to 30 carbon atoms so as to achieve good molding processability of the polymer.

Examples of the alkyl group having 14 to 30 carbon atoms include straight chain alkyl groups having 14 to 30 carbon atoms and branched alkyl groups having 14 to 30 carbon atoms. $L^6$ is preferably a straight chain alkyl group having 14 to 30 carbon atoms, more preferably a straight chain alkyl group having 14 to 24 carbon atoms, and even more preferably a straight chain alkyl group having 16 to 22 carbon atoms.

Examples of the straight chain alkyl group having 14 to 30 carbon atoms include a n-tetradecyl group, a n-pentadecyl group, a n-hexadecyl group, a n-heptadecyl group, a n-octadecyl group, a n-nonadecyl group, a n-eicosyl group, a n-heneicosyl group, a n-docosyl group, a n-tricosyl group, a n-tetracosyl group, a n-pentacosyl group, a n-hexacosyl group, a n-heptacocyl group, a n-octacosyl group, a n-nonacosyl group, and a n-triacontyl group.

Examples of the branched alkyl group having 14 to 30 carbon atoms include an isotetradecyl group, an isopentadecyl group, an isohexadecyl group, an isoheptadecyl group, an isooctadecyl group, an isononadecyl group, an isoeicosyl group, an isoheneicosyl group, an isodocosyl group, an isotricosyl group, an iso tetracosyl group, an isopentacosyl group, an isohexacosyl group, an isoheptacocyl group, an isooctacosyl group, an iso nonacosyl group, and an isotriacontyl group.

Examples of the combination of R, $L^1$, and $L^2$ and $L^3$ in Formula (1) include the following:

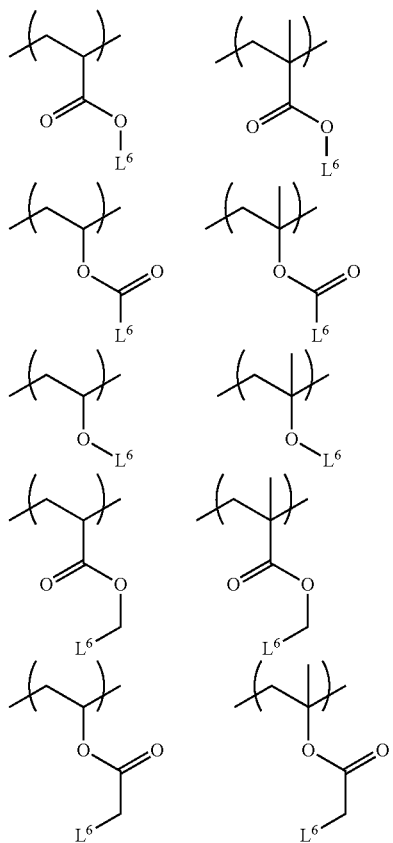

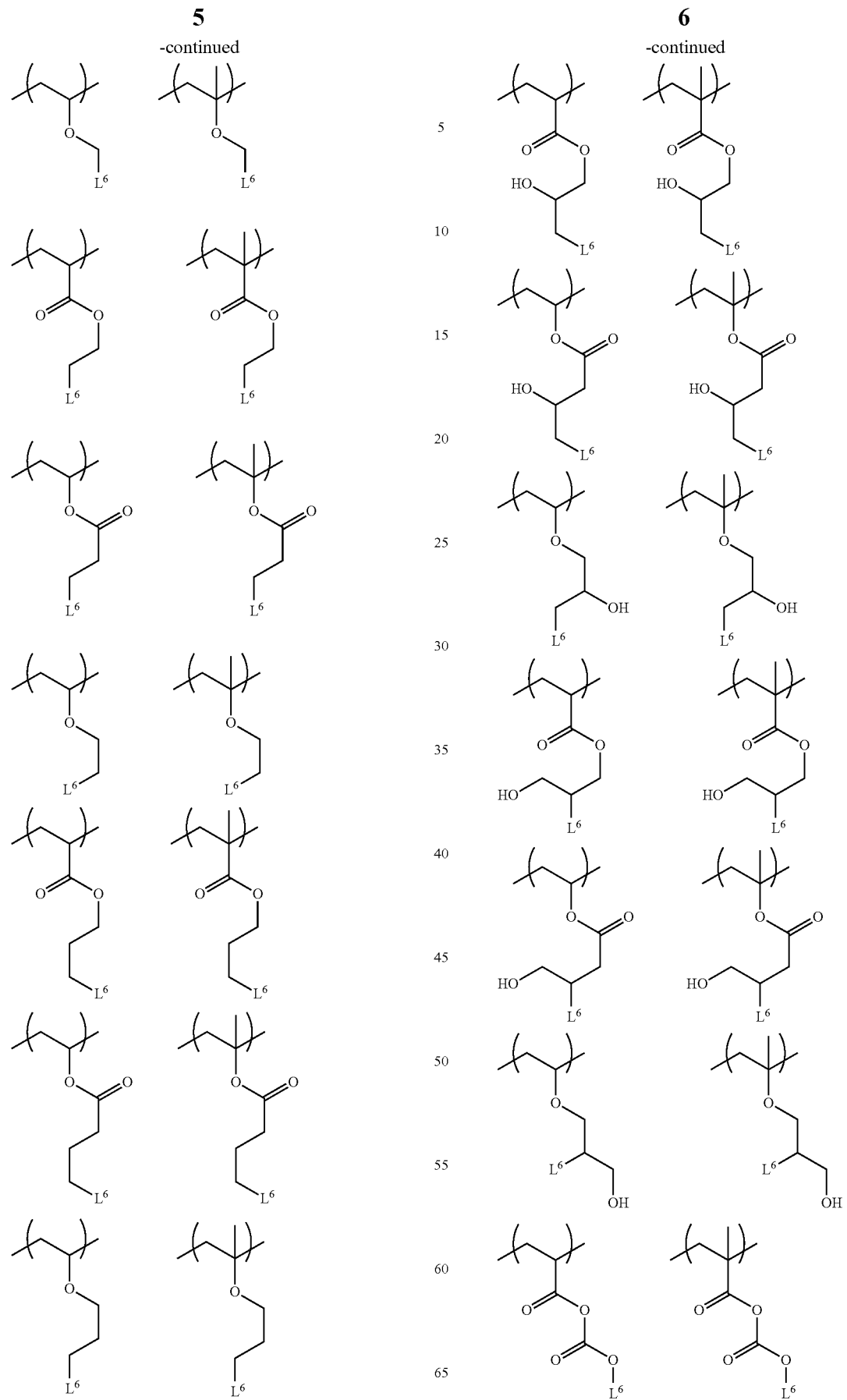

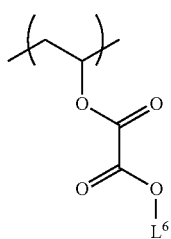 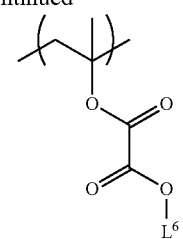 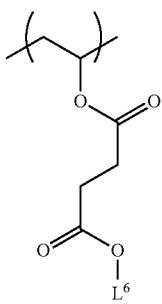 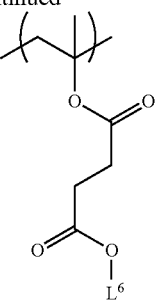
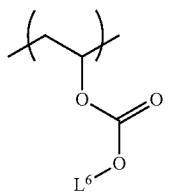 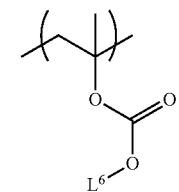 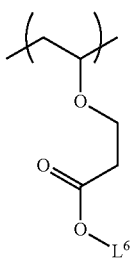 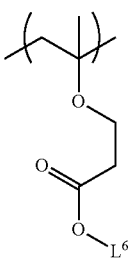
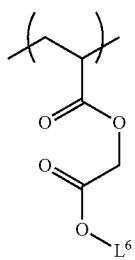 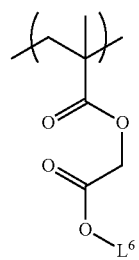 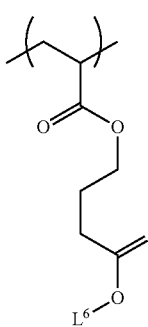 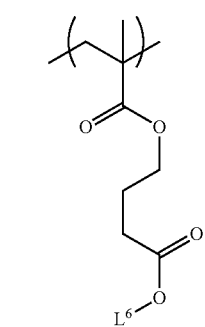
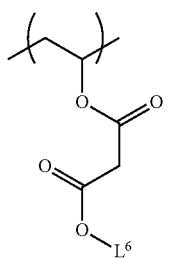 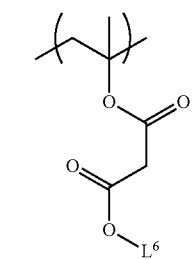 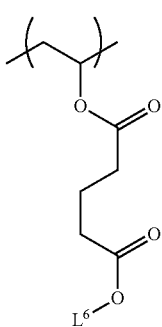 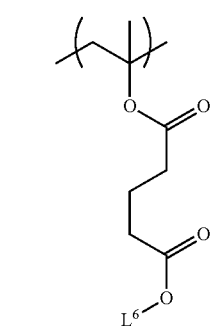
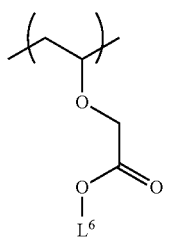 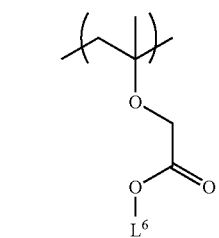 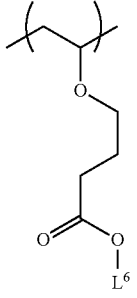 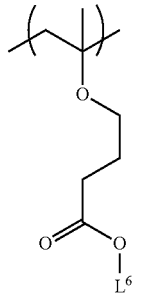
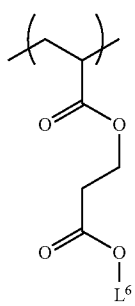 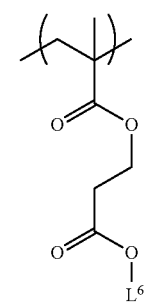 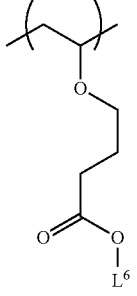 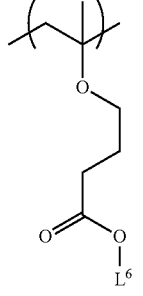

-continued
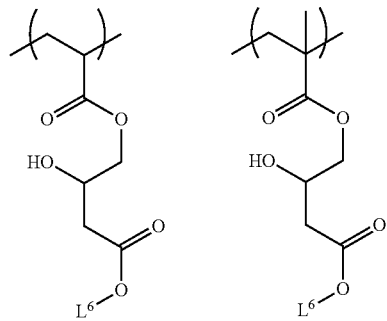
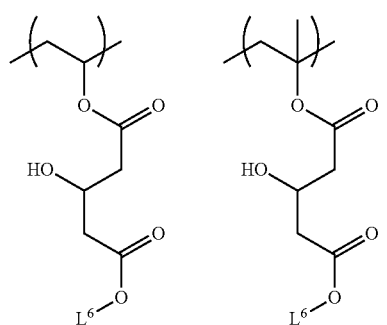
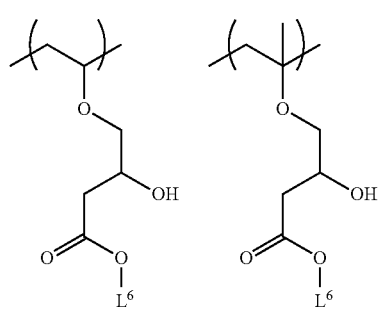
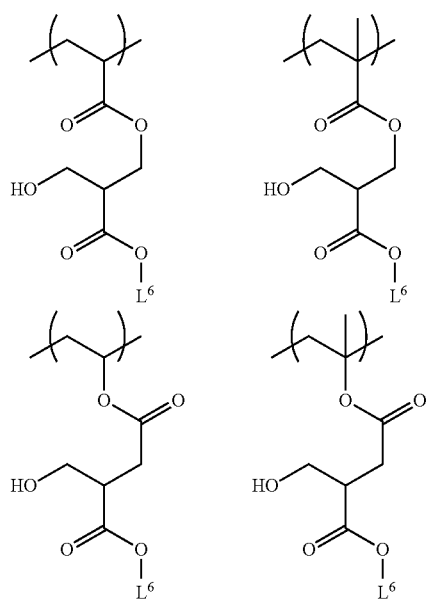
-continued
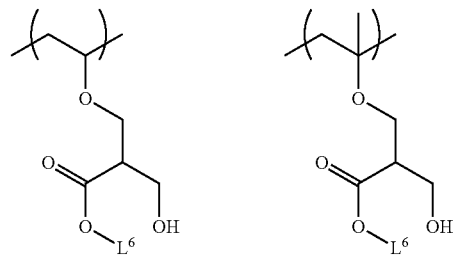
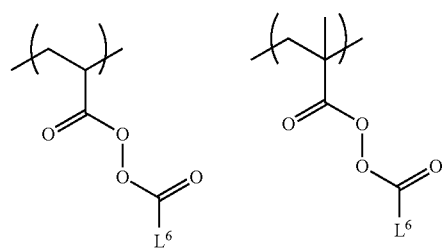
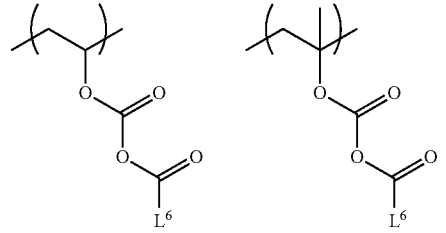
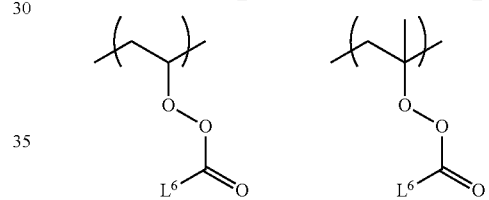
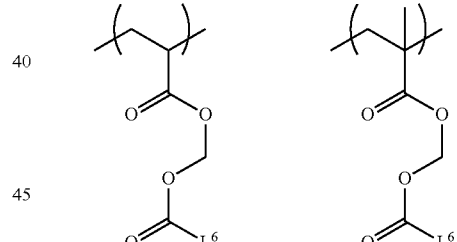
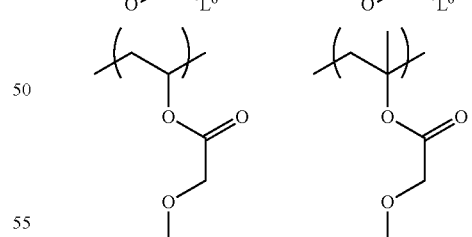
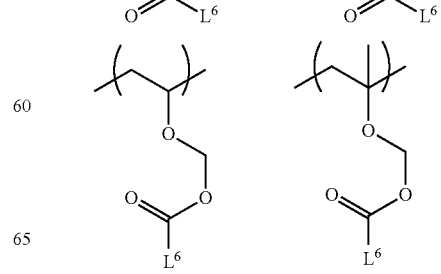

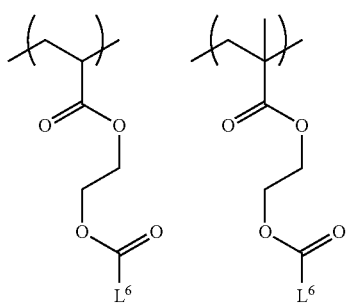
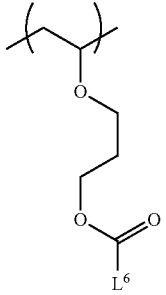
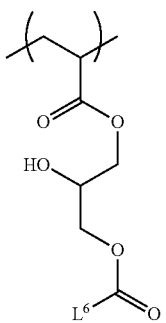
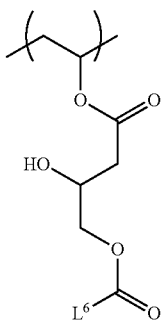
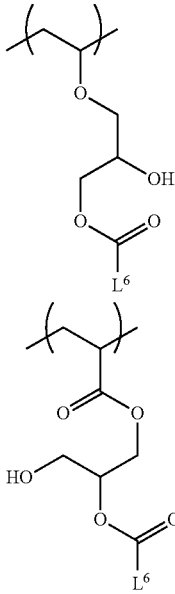

-continued
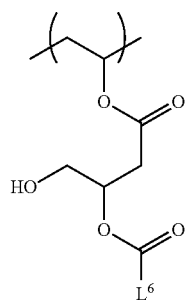 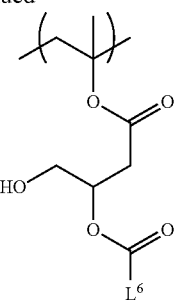
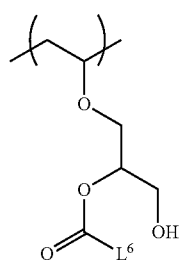 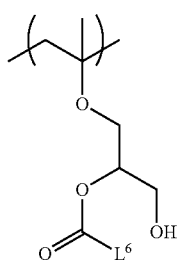
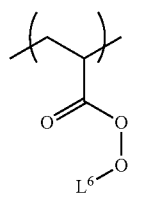 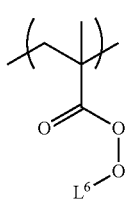
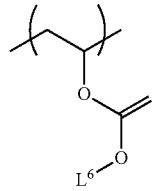 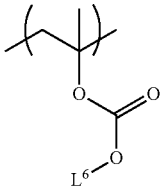
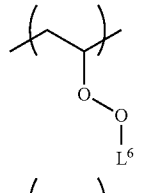 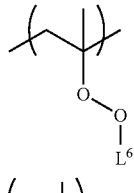
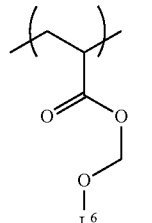 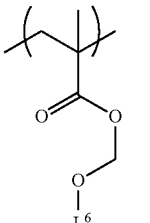
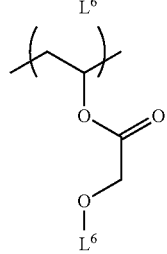 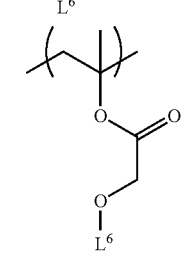
-continued
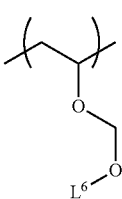 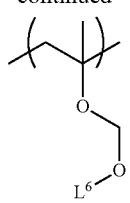
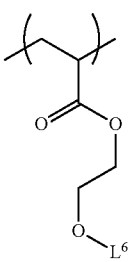 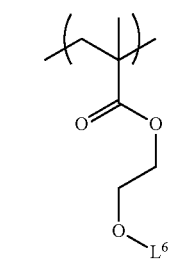
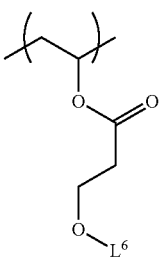 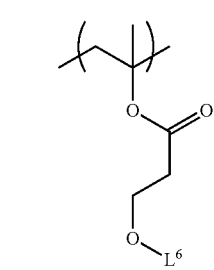
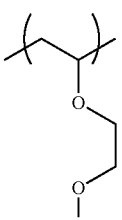 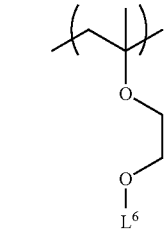
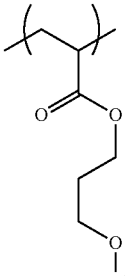 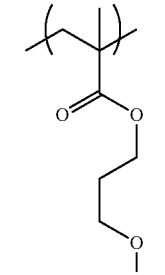
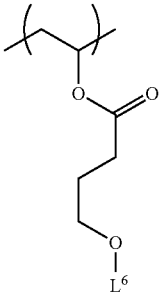 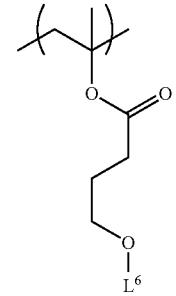

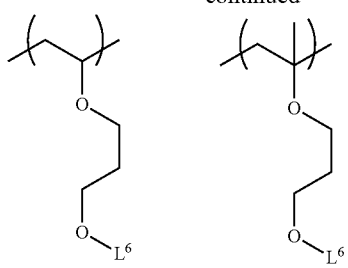
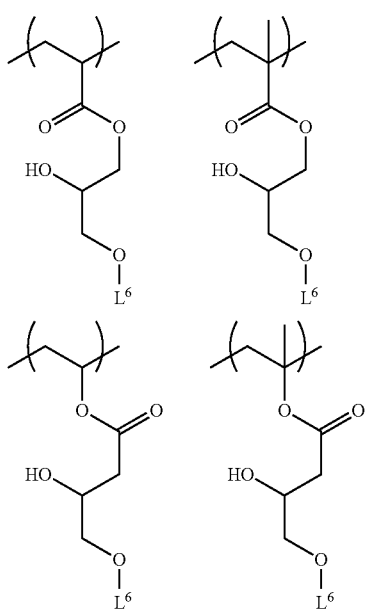
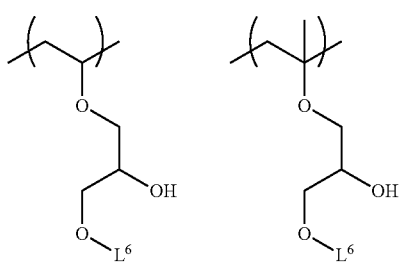
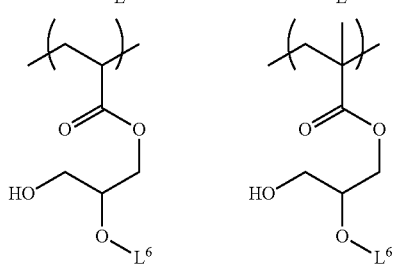
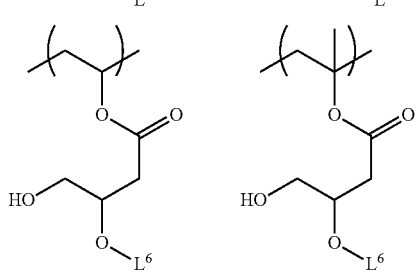
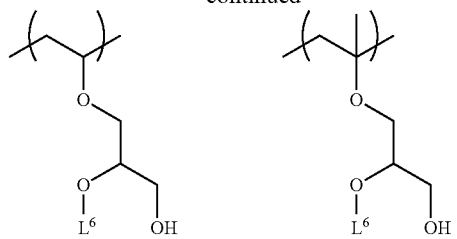
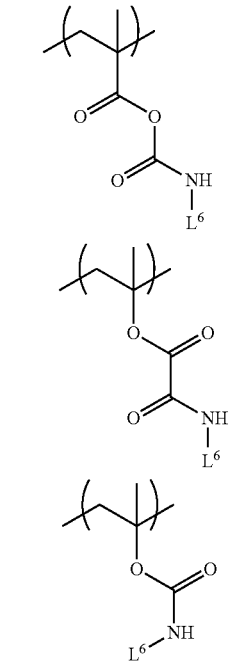
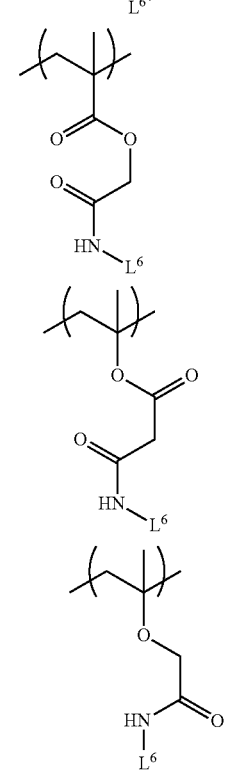

17
-continued
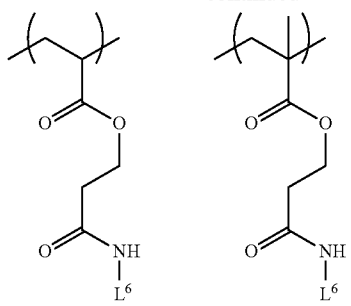
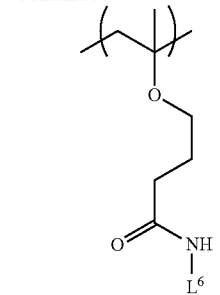
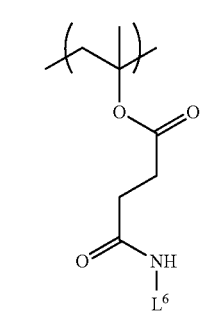
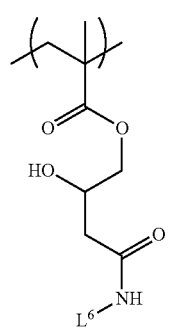
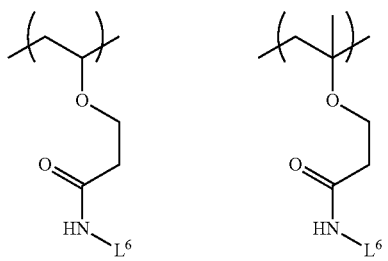
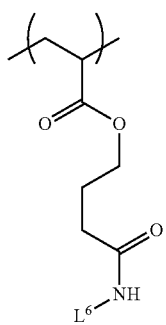
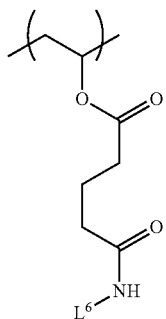
18
-continued
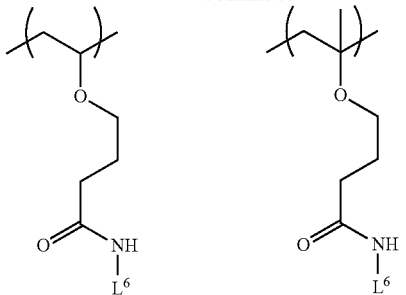
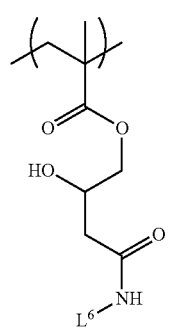
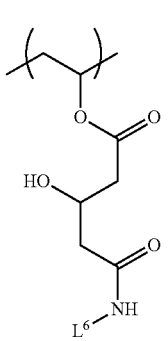
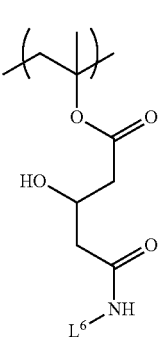
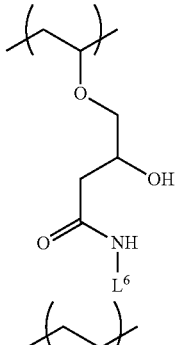
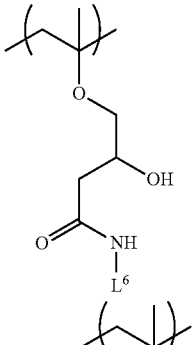
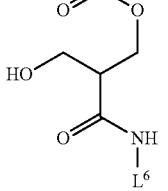
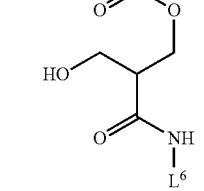

-continued

-continued
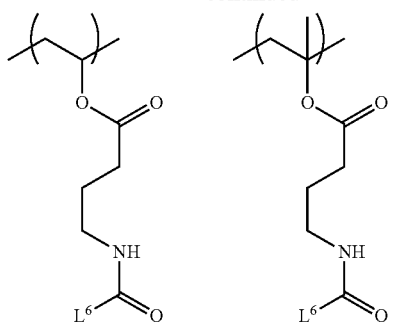
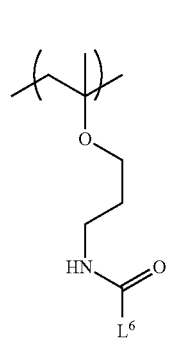
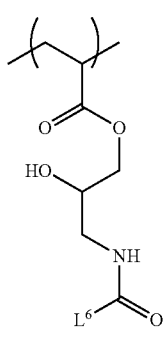
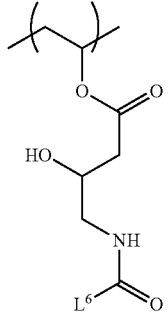
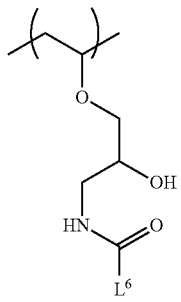
-continued
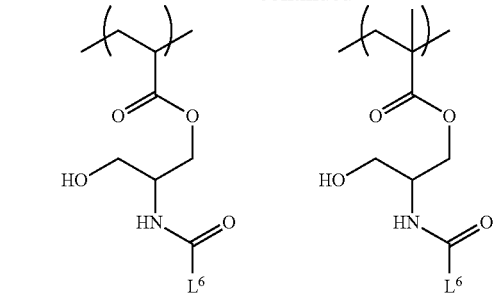
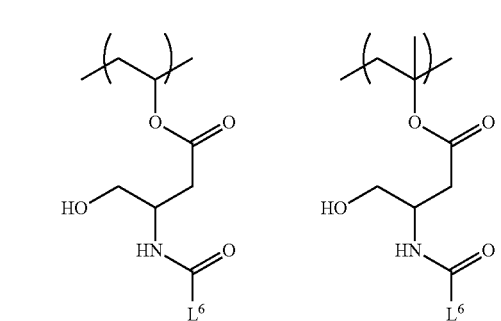
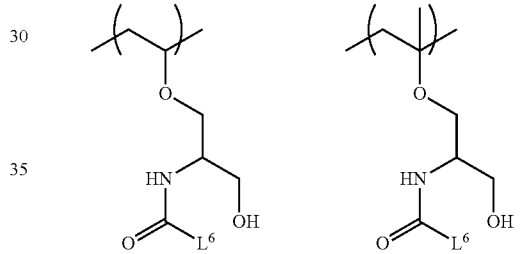
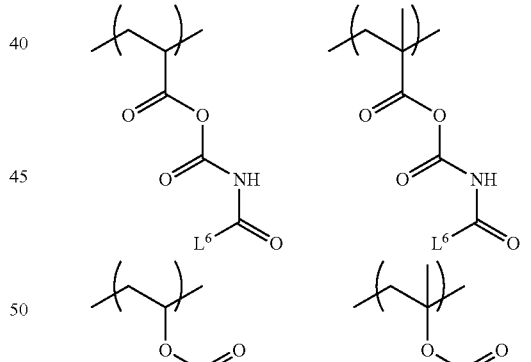
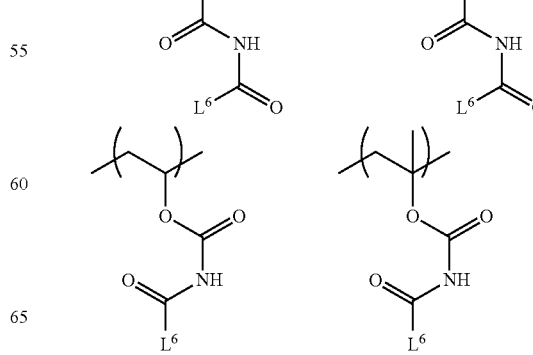

-continued
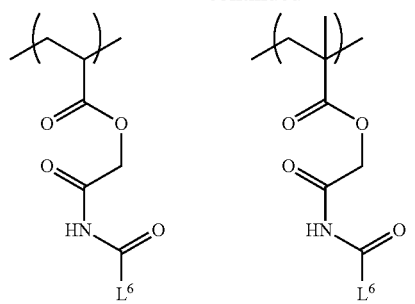
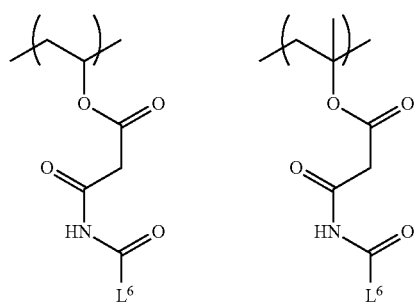
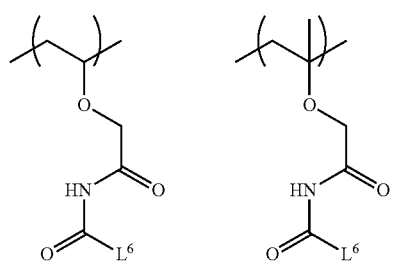
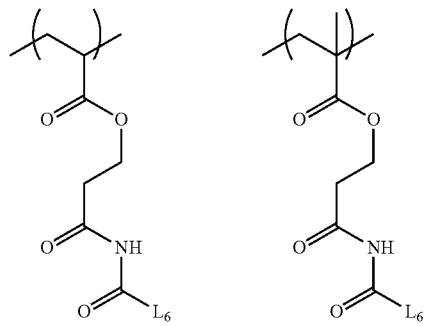
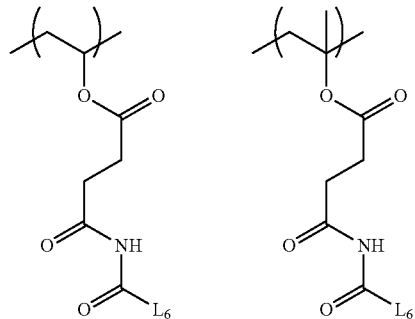
-continued
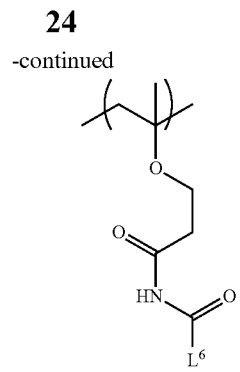
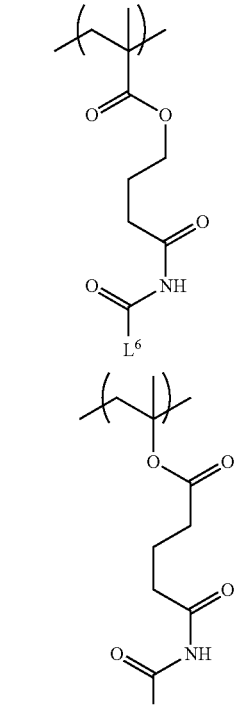
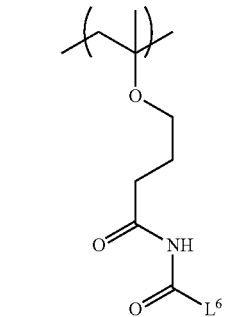
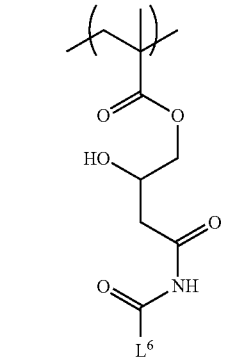

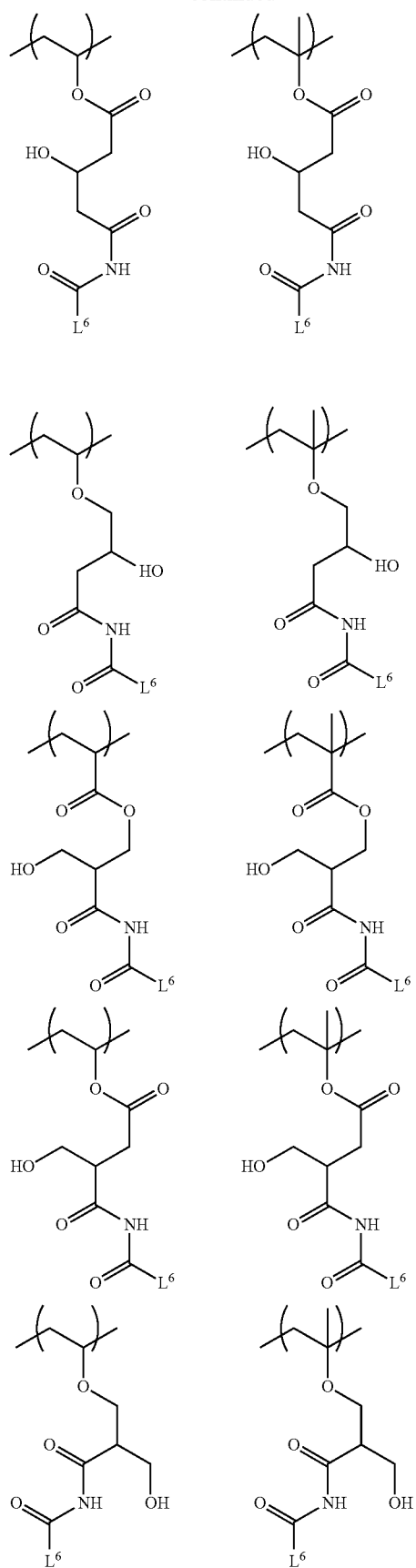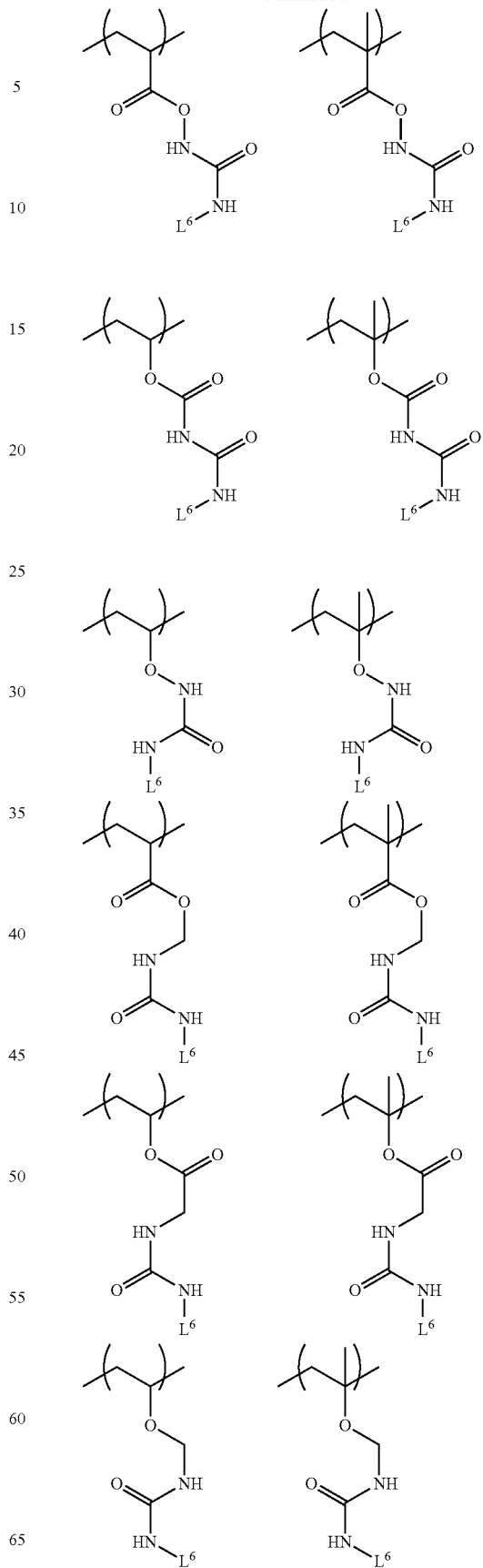

-continued
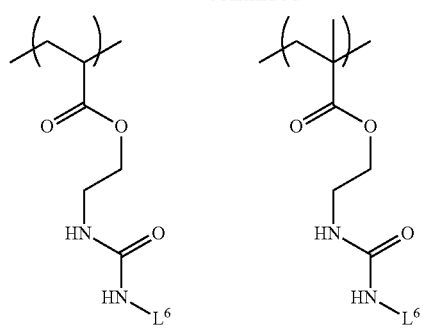
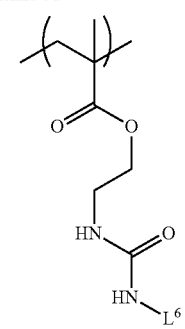
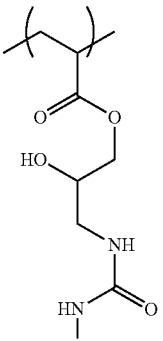
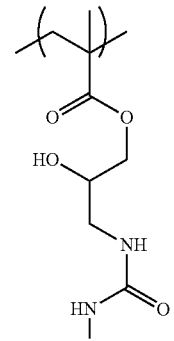
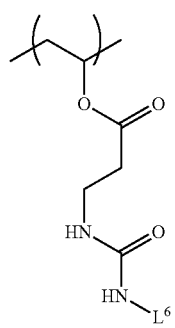
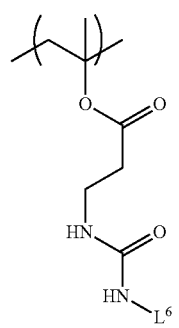
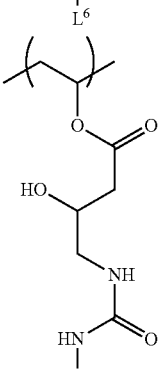
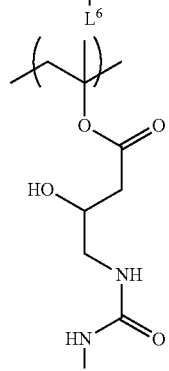
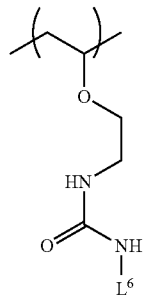
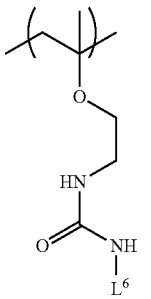
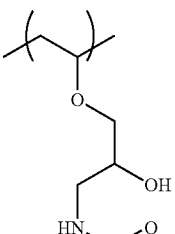
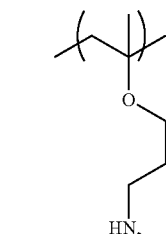
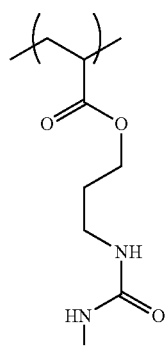
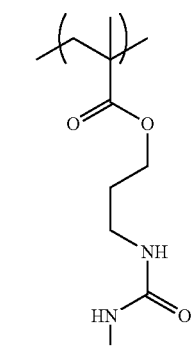
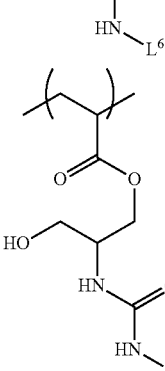
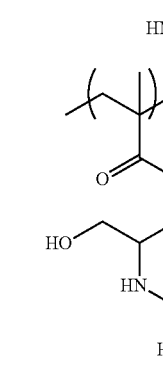
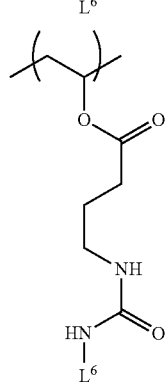
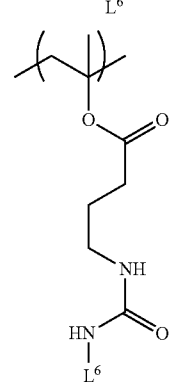
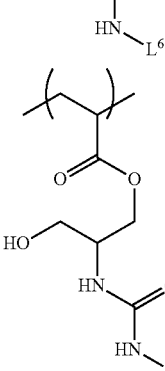
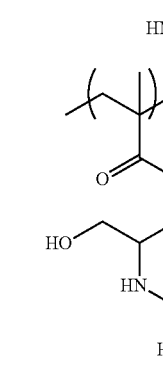

-continued
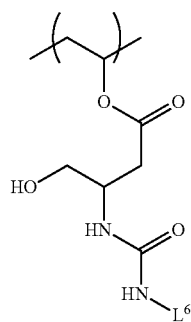 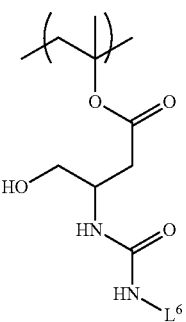 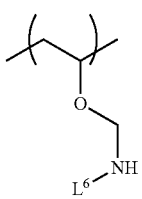 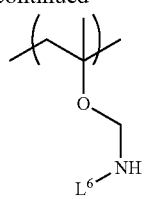
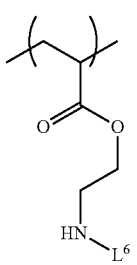 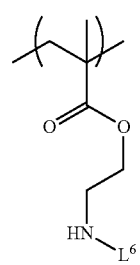
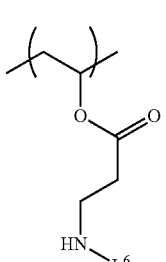 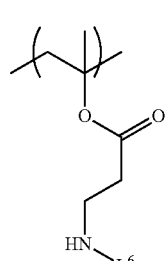
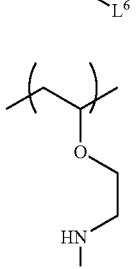 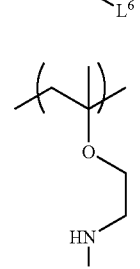
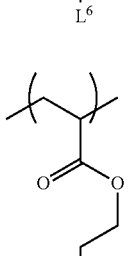 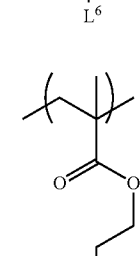
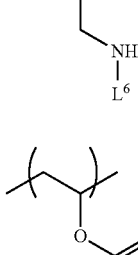 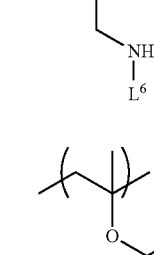
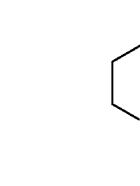

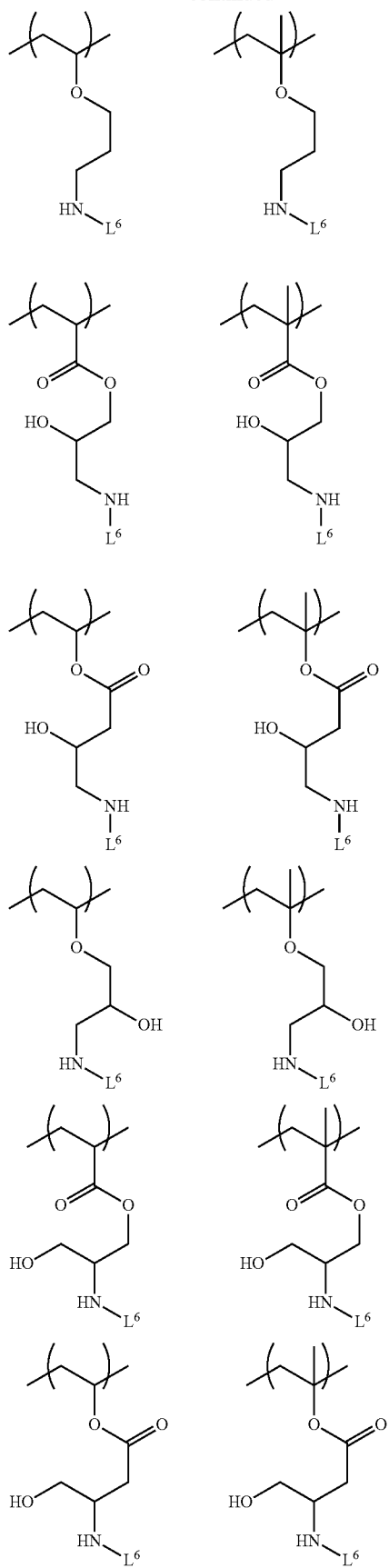
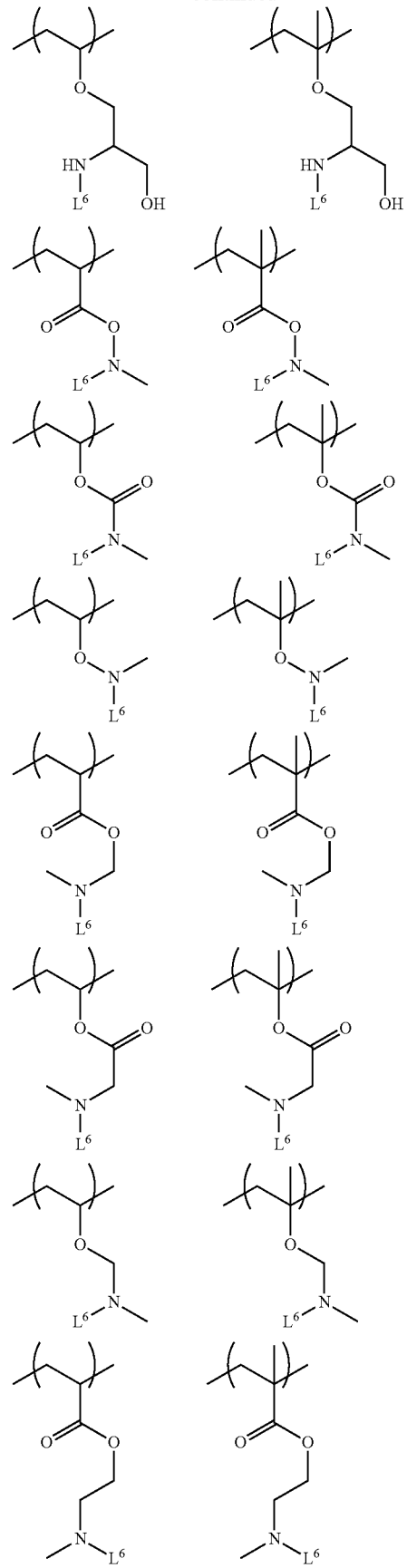

-continued
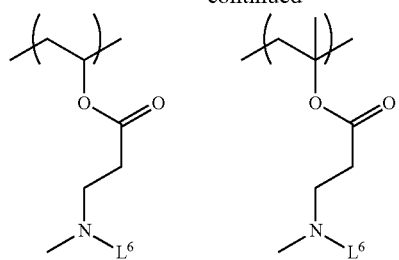
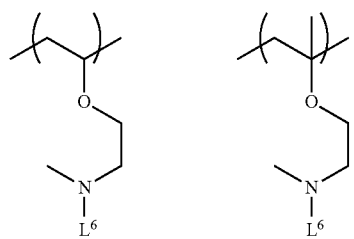
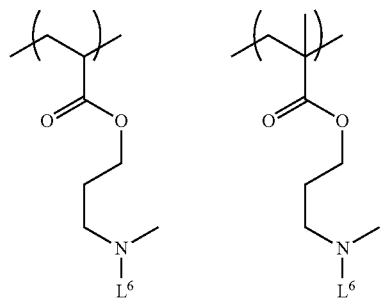
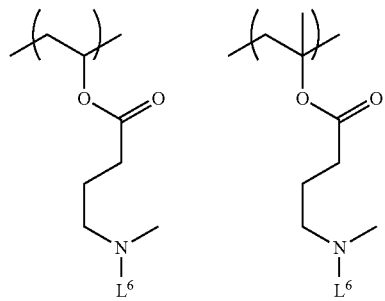
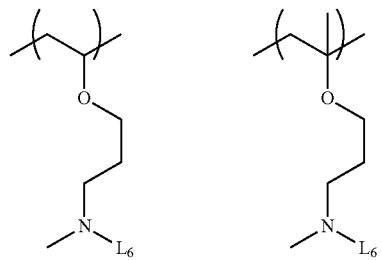
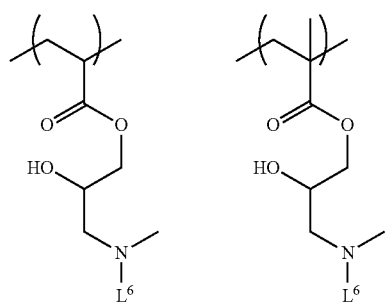
-continued
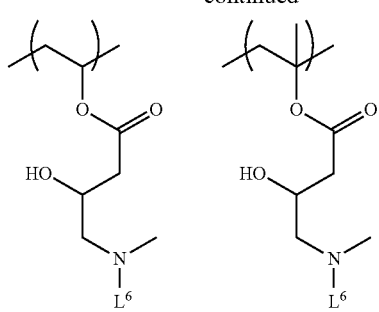
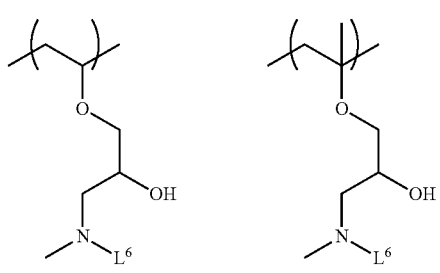
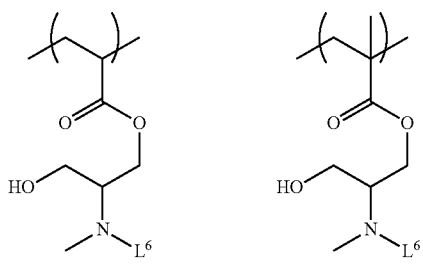
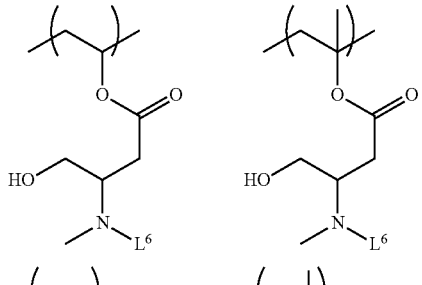
Examples of the combination of R, $L^1$, and $L^2$ and $L^3$ in Formula (1) preferably include the following:
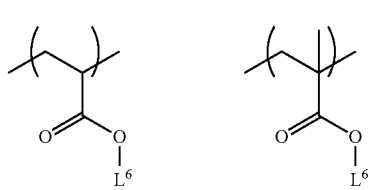

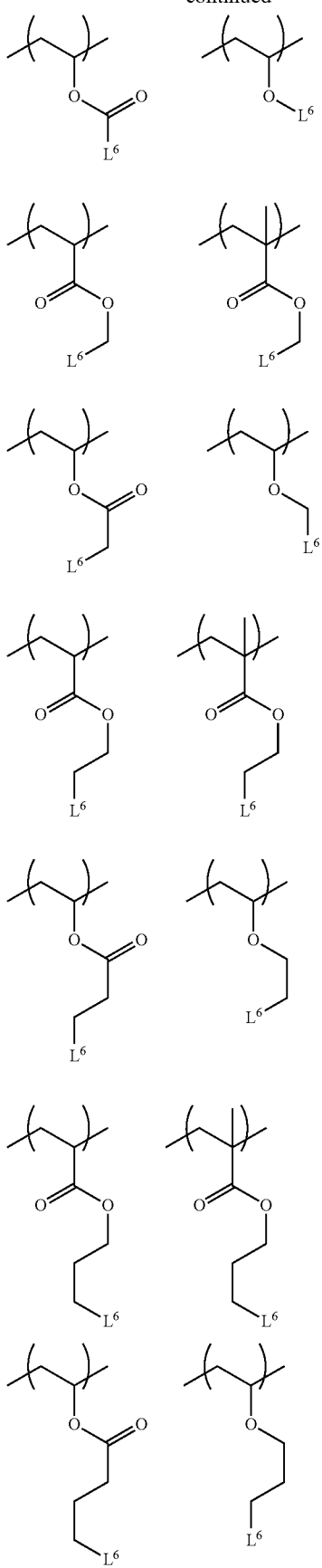
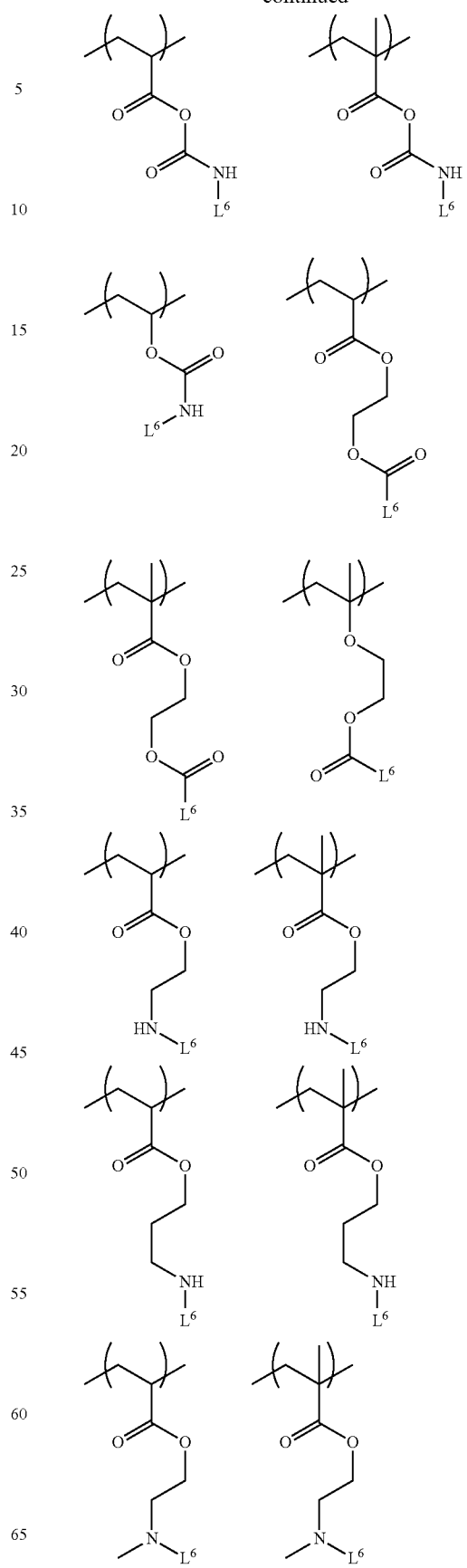

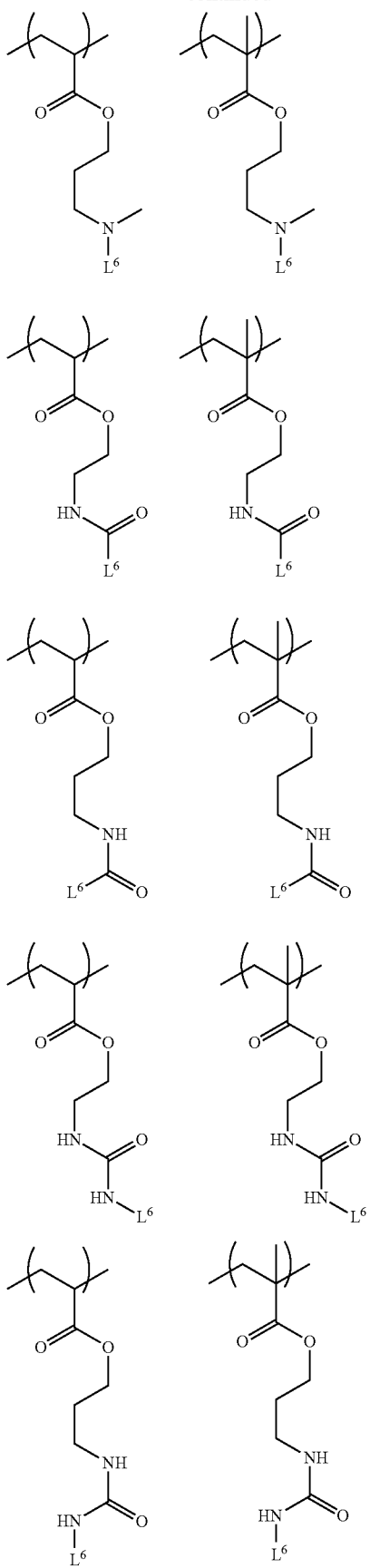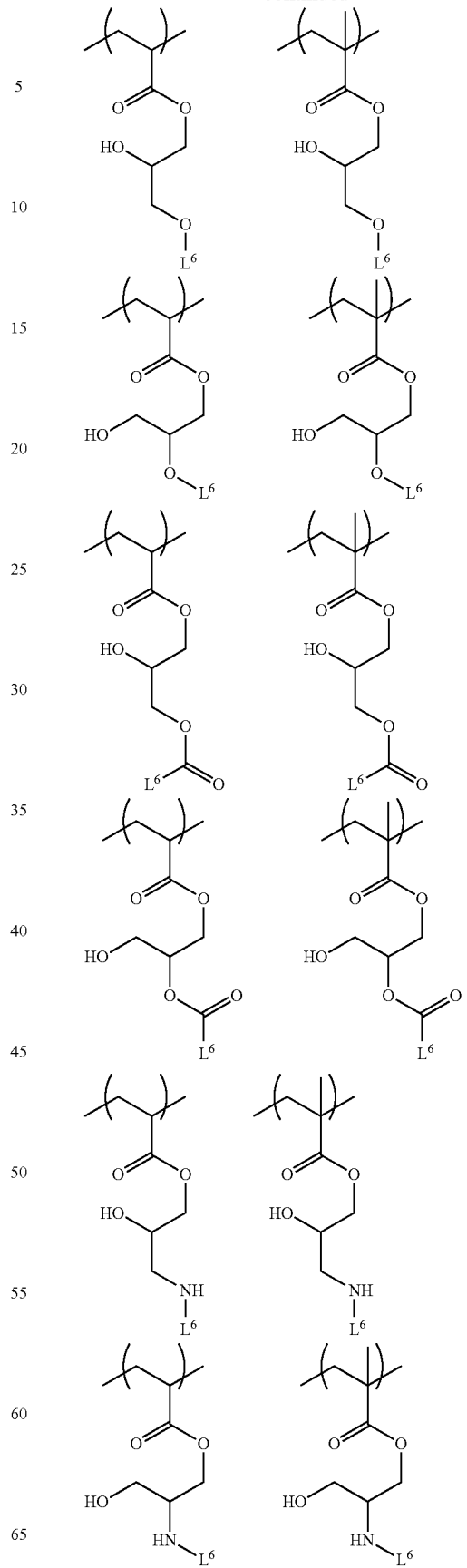

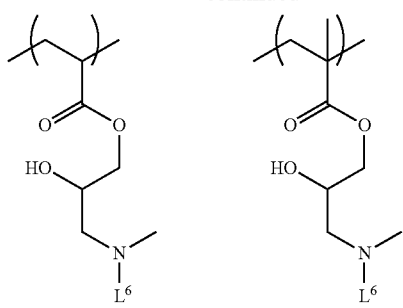
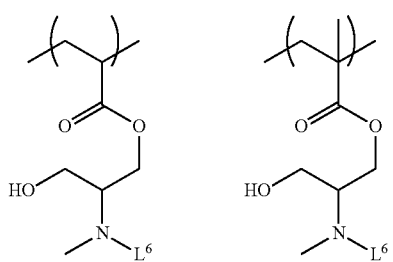
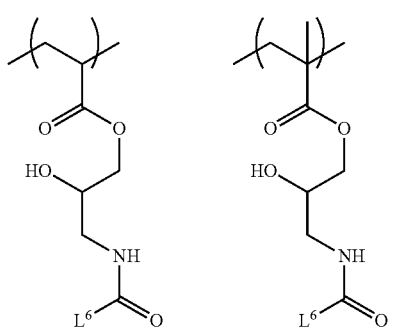
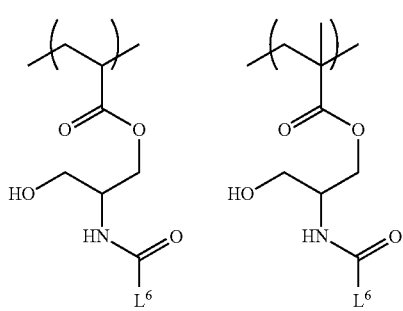
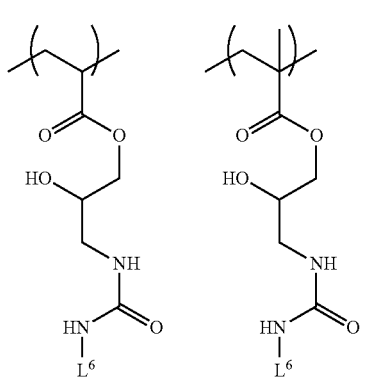
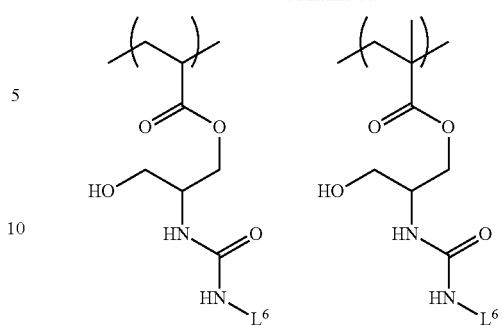
Examples of the combination of R, $L^1$, and $L^2$ and $L^3$ in Formula (1) more preferably include the following:
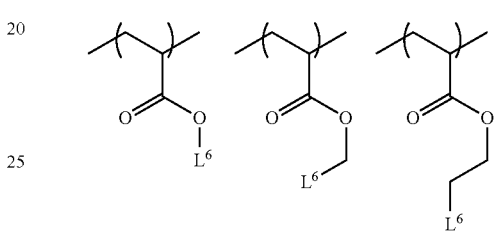
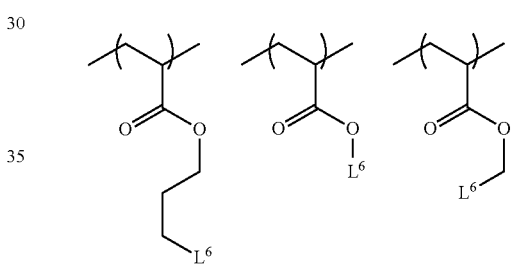
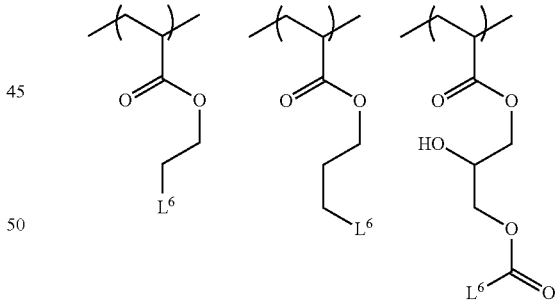
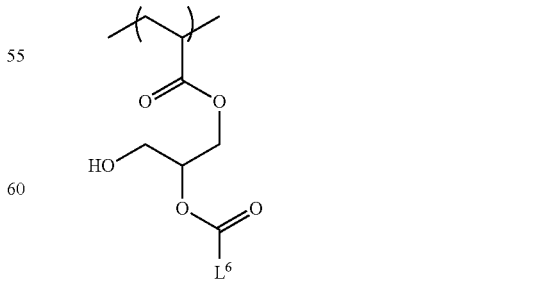
Examples of the combination of R, $L^1$, and $L^2$ and $L^3$ in Formula (1) even more preferably include the following:

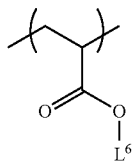

Preferably, the unit (B) is a constitutional unit derived from n-tetradecyl acrylate, a constitutional unit derived from n-pentadecyl acrylate, a constitutional unit derived from n-hexadecyl acrylate, a constitutional unit derived from n-heptadecyl acrylate, a constitutional unit derived from n-octadecyl acrylate, a constitutional unit derived from n-nonadecyl acrylate, a constitutional unit derived from n-eicosyl acrylate, a constitutional unit derived from n-heneicosyl acrylate, a constitutional unit derived from n-docosyl acrylate, a constitutional unit derived from n-tricosyl acrylate, a constitutional unit derived from n-tetracosyl acrylate, a constitutional unit derived from n-pentacosyl acrylate, a constitutional unit derived from n-hexacosyl acrylate, a constitutional unit derived from n-heptacosyl acrylate, a constitutional unit derived from n-octacosyl acrylate, a constitutional unit derived from n-nonacosyl acrylate, a constitutional unit derived from n-triacontyl acrylate, a constitutional unit derived from n-tetradecyl methacrylate, a constitutional unit derived from n-pentadecyl methacrylate, a constitutional unit derived from n-hexadecyl methacrylate, a constitutional unit derived from n-heptadecyl methacrylate, a constitutional unit derived from n-octadecyl methacrylate, a constitutional unit derived from n-nonadecyl methacrylate, a constitutional unit derived from n-eicosyl methacrylate, a constitutional unit derived from n-heneicosyl methacrylate, a constitutional unit derived from n-docosyl methacrylate, a constitutional unit derived from n-tricosyl methacrylate, a constitutional unit derived from n-tetracosyl methacrylate, a constitutional unit derived from n-pentacosyl methacrylate, a constitutional unit derived from n-hexacosyl methacrylate, a constitutional unit derived from n-heptacosyl methacrylate, a constitutional unit derived from n-octacosyl methacrylate, a constitutional unit derived from n-nonacosyl methacrylate, a constitutional unit derived from n-triacontyl methacrylate, a constitutional unit derived from n-vinyl tetradecylate, a constitutional unit derived from n-vinyl hexadecylate, a constitutional unit derived from n-vinyl octadecylate, a constitutional unit derived from n-vinyl eicosylate, a constitutional unit derived from n-vinyl docosylate, a constitutional unit derived from n-tetradecyl vinyl ether, a constitutional unit derived from n-hexadecyl vinyl ether, a constitutional unit derived from n-octadecyl vinyl ether, a constitutional unit derived from n-eicosyl vinyl ether, or a constitutional unit derived from n-docosyl vinyl ether.

The polymer of the present invention may have two or more types of the unit (B) and may be a polymer having constitutional units derived from n-eicosyl acrylate and constitutional units derived from n-octadecyl acrylate.

The polymer of the present invention may have at least one type of constitutional units (C) selected from the group consisting of constitutional units represented by Formula (2) below and constitutional units represented by Formula (3) below,

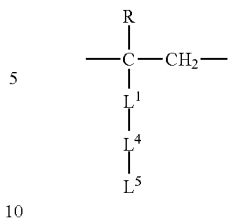

Formula (2)

in Formula (2),

R represents a hydrogen atom or a methyl group, $L^1$ represents —CO—O—, —O—CO—, or —O—, $L^4$ represents an alkylene group having 1 to 8 carbon atoms, $L^5$ represents a hydrogen atom, an epoxy group, —CH(OH)—CHOH, a carboxyl group, a hydroxyl group, an amino group, or an alkylamino group having 1 to carbon atoms;

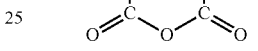

Formula (3)

Preferably, R is a hydrogen atom.

$L^1$ is preferably —CO—O— or —O—CO—, and more preferably —CO—O—.

Examples of the alkylene group having 1 to 8 carbon atoms as $L^4$ include a methylene group, an ethylene group, a n-propylene group, a 1-methylethylene group, a n-butylene group, a 1,2-dimethylethylene group, a 1,1-dimethylethylene group, a 2,2-dimethylethylene group, a n-pentylene group, a n-hexylene group, a n-heptalene group, a n-octylene group, and a 2-ethyl-n-hexylene group.

$L^4$ is preferably a methylene group, an ethylene group, and n-propylene group, and more preferably a methylene group.

Examples of the alkylamino group having 1 to 4 carbon atoms as $L^5$ include a methylamino group, an ethylamino group, a propylamino group, a butylamino group, a dimethylamino group, and a diethylamino group.

$L^5$ is preferably a hydrogen atom, an epoxy group, or —CH(OH)—CH$_2$OH, and more preferably a hydrogen atom.

Examples of the combination of R, $L^1$, and $L^4$ and $L^5$ in Formula (2) include the following:

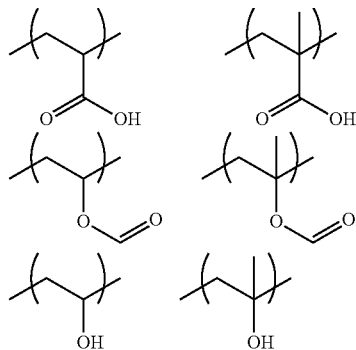

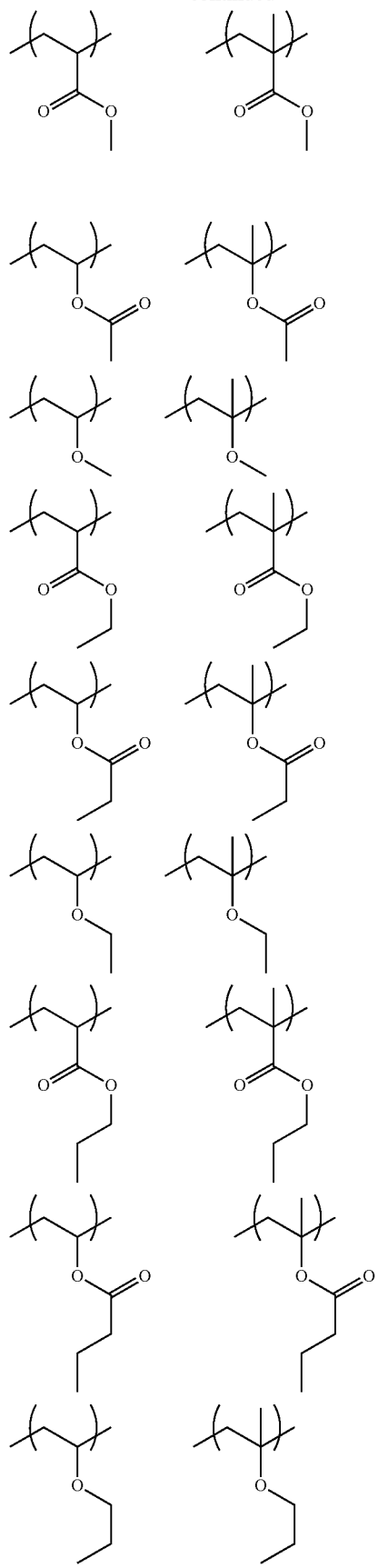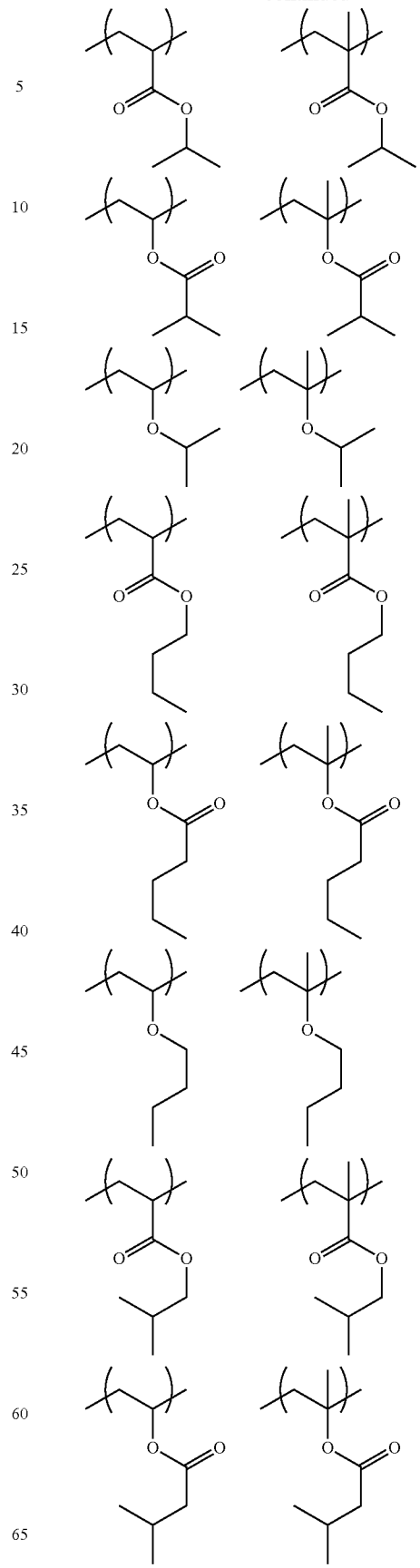

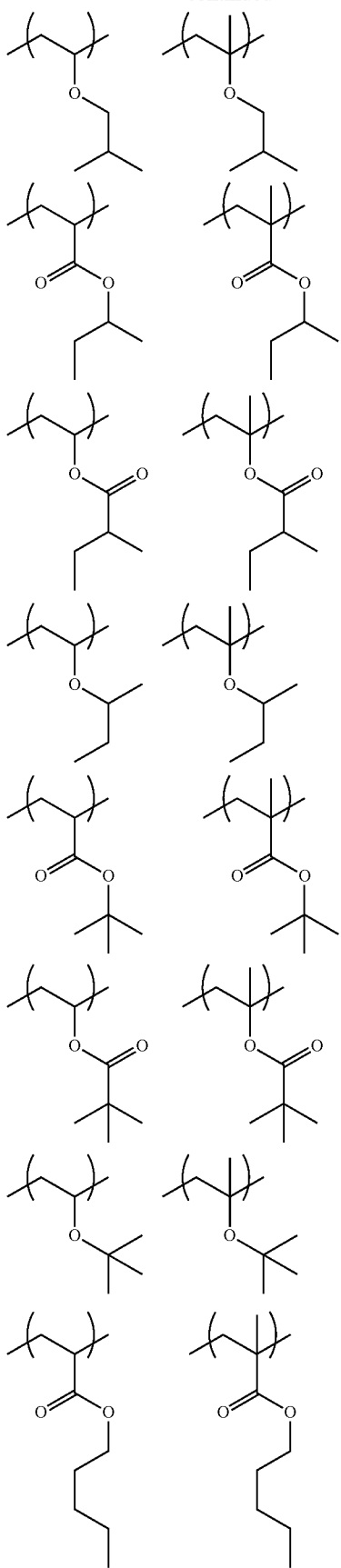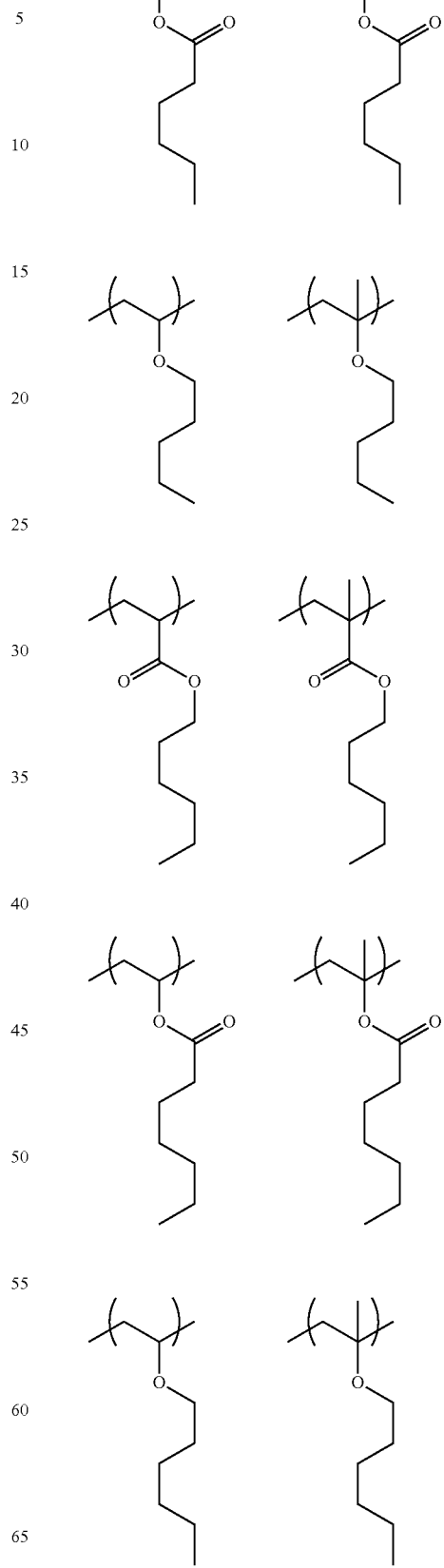

-continued
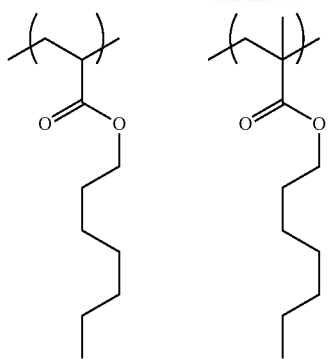
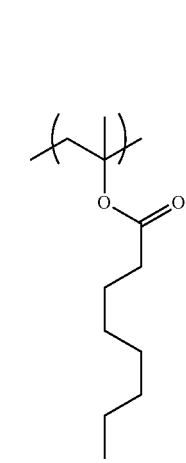
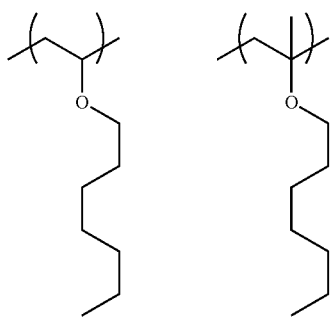
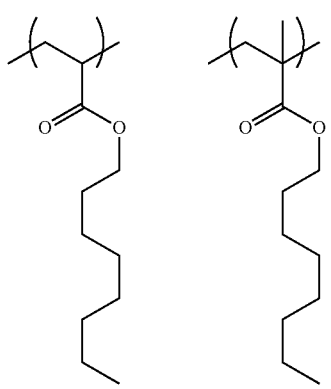
-continued
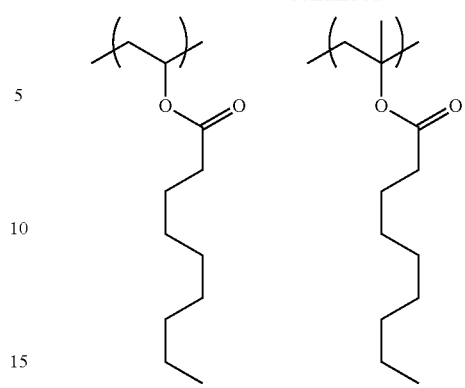
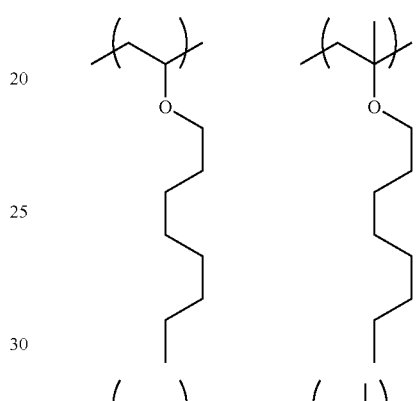
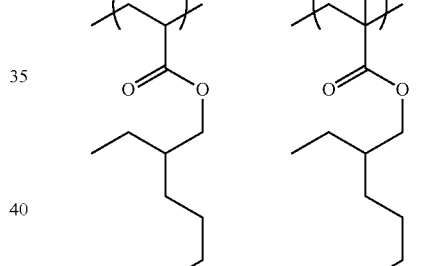
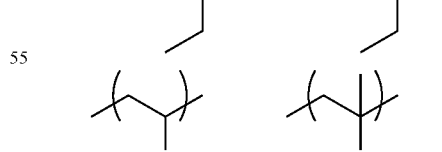

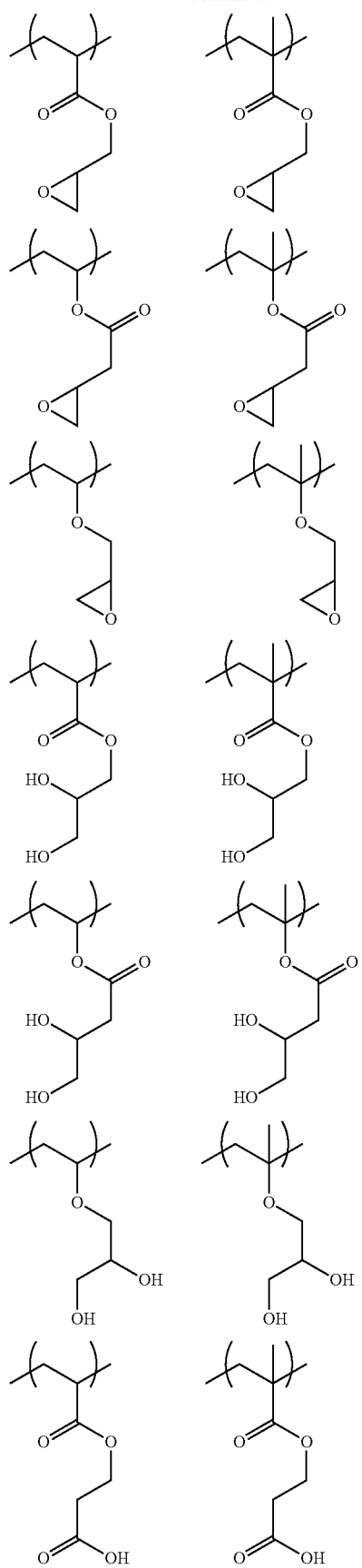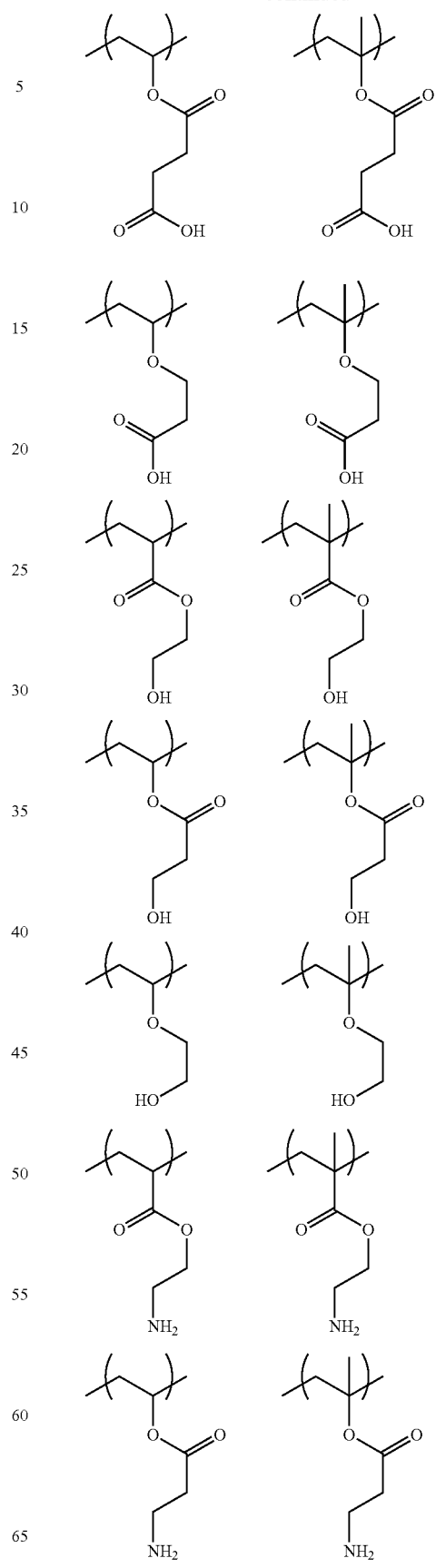

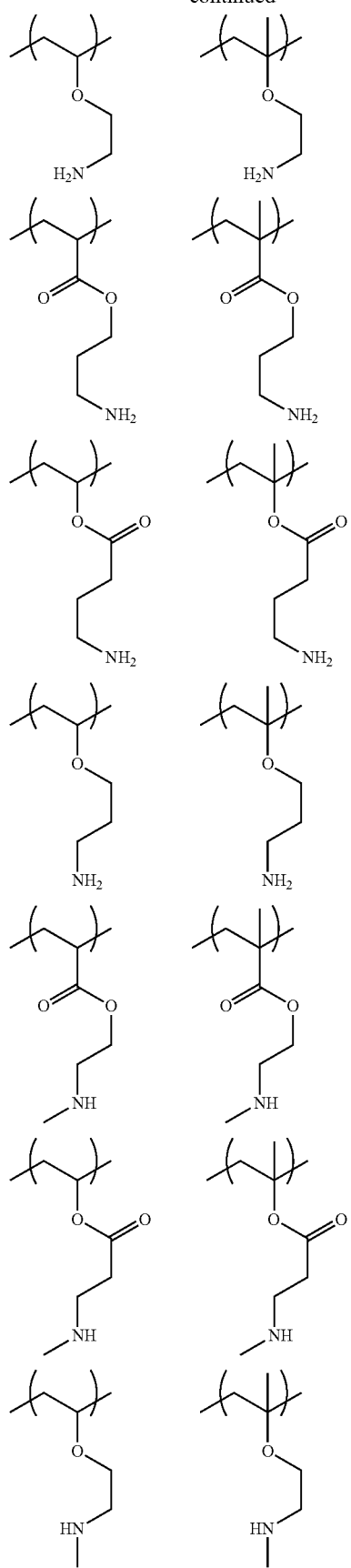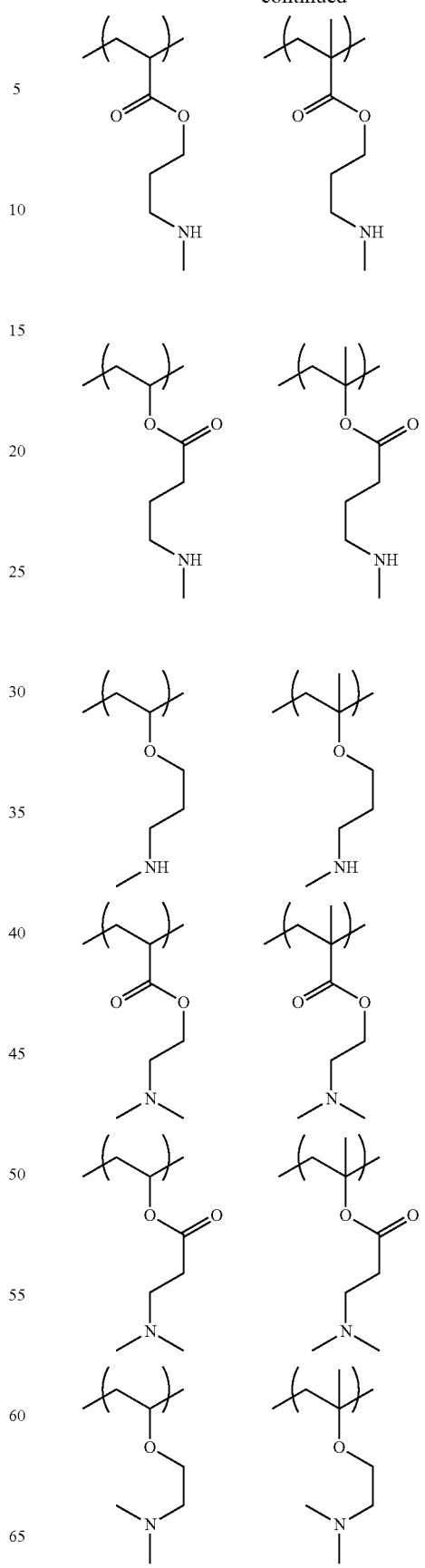

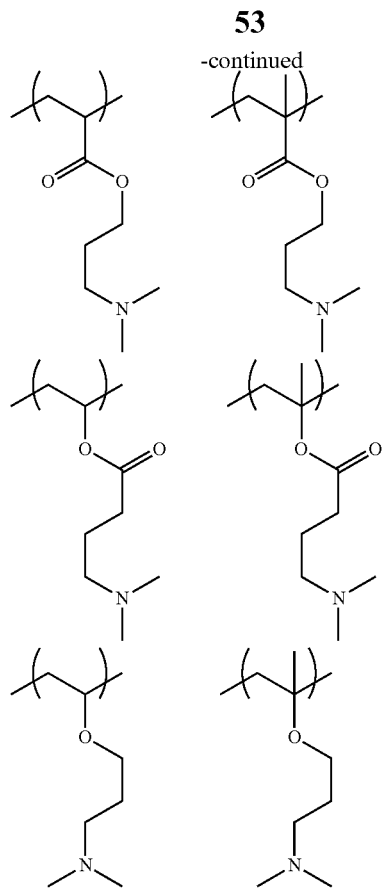
Examples of the combination of R, $L^1$, and $L^4$ and $L^5$ in Formula (2) preferably include the following:
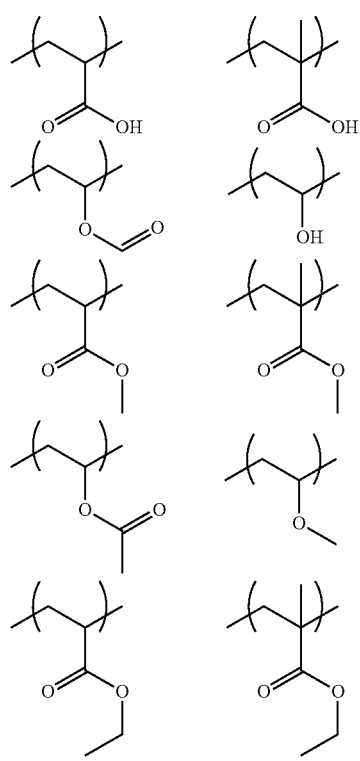
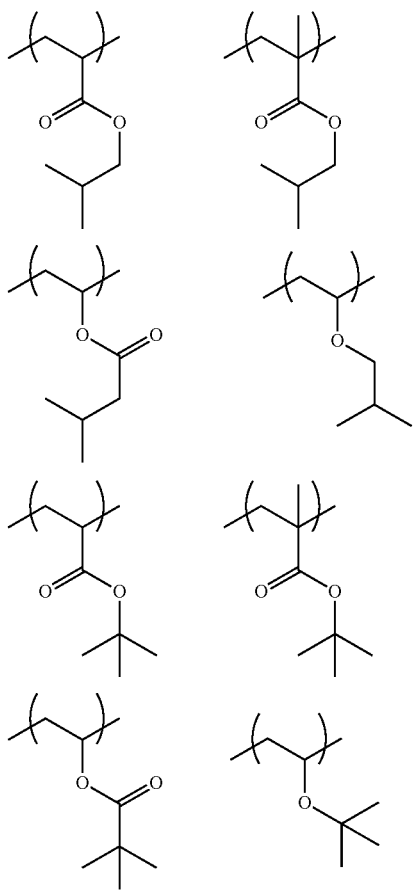

55
-continued
56
-continued
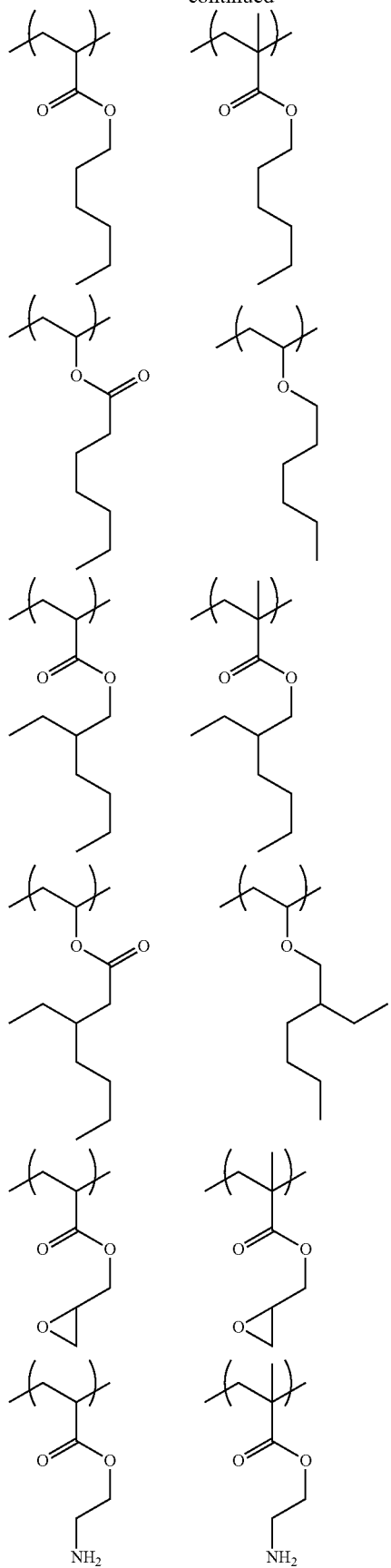
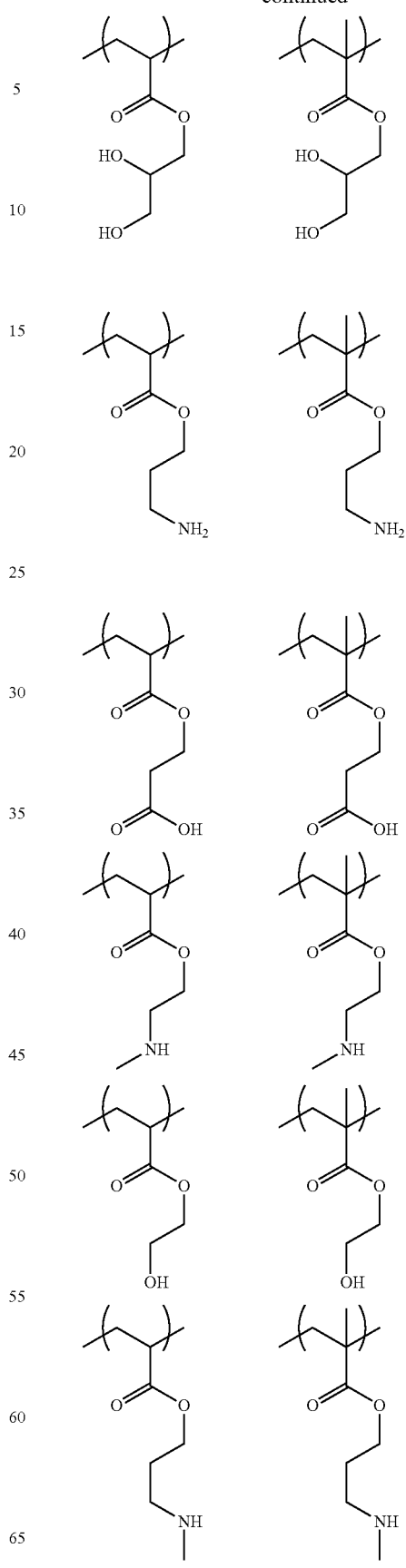

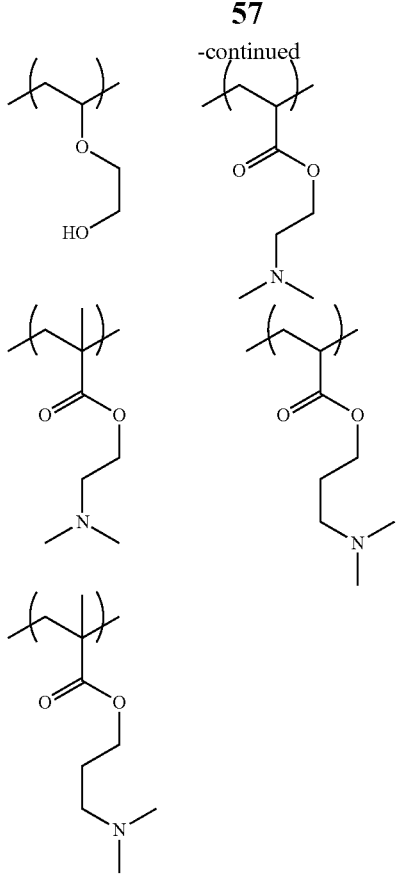

Examples of the combination of R, $L^1$, and $L^4$ and $L^5$ in Formula (2) more preferably include the following:

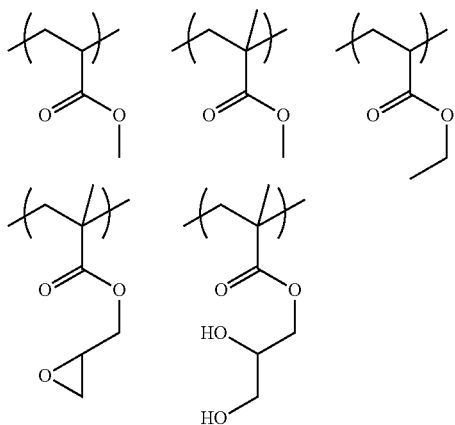

Examples of the combination of R, $L^1$, and $L^4$ and $L^5$ in Formula (2) even more preferably include the following:

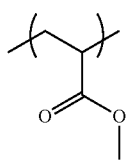

Examples of the constitutional unit represented by Formula (2) include a constitutional unit derived from acrylic acid, a constitutional unit derived from methacrylic acid, a constitutional unit derived from vinyl alcohol, a constitutional unit derived from methyl acrylate, a constitutional unit derived from ethyl acrylate, a constitutional unit derived from n-propylacrylate, a constitutional unit derived from isopropyl acrylate, a constitutional unit derived from n-butyl acrylate, a constitutional unit derived from isobutyl acrylate, a constitutional unit derived from sec-butyl acrylate, a constitutional unit derived from tert-butyl acrylate, a constitutional unit derived from methyl methacrylate, a constitutional unit derived from ethyl methacrylate, a constitutional unit derived from n-propyl methacrylate, a constitutional unit derived from isopropyl methacrylate, a constitutional unit derived from n-butyl methacrylate, a constitutional unit derived from isobutyl methacrylate, a constitutional unit derived from sec-butyl methacrylate, a constitutional unit derived from tert-butyl methacrylate, a constitutional unit derived from vinyl formate, a constitutional unit derived from vinyl acetate, a constitutional unit derived from vinyl propionate, a constitutional unit derived from vinyl (n-butyrate), a constitutional unit derived from vinyl (isobutyrate), a constitutional unit derived from methyl vinyl ether, a constitutional unit derived from ethyl vinyl ether, a constitutional unit derived from n-propyl vinyl ether, a constitutional unit derived from isopropyl vinyl ether, a constitutional unit derived from n-butyl vinyl ether, a constitutional unit derived from isobutyl vinyl ether, a constitutional unit derived from sec-butyl vinyl ether, a constitutional unit derived from tert-butyl vinyl ether, a constitutional unit derived from glycidyl acrylate, a constitutional unit derived from glycidyl methacrylate, a constitutional unit derived from 2,3-dihydroxypropyl acrylate, a constitutional unit derived from 2,3-dihydroxypropyl methacrylate, a constitutional unit derived from 3-(dimethylamino)propyl acrylate, and a constitutional unit derived from 3-(dimethylamino)propyl methacrylate.

The constitutional unit represented by Formula (3) is a constitutional unit derived from maleic anhydride.

The polymer of the present invention may be a polymer having two or more types of the constitutional unit (C) and may be a polymer having constitutional units derived from methyl acrylate, constitutional units derived from ethyl acrylate, and constitutional units derived from glycidyl methacrylate, for example.

In the polymer of the present invention, where the total number of the units (A), the units (B), and the units (C) is 100%, the number of the units (A) accounts for 70% to 99% and the total number of the units (B) and the units (C) accounts for 1% to 30%; and Where the total number of the units (B) and the units (C) is 100%, the number of the units (B) accounts for 1% to 100% and the number of the units (C) accounts for 0% to 99%, The number of the units (A) in the polymer of the present invention accounts for 70% to 99%, preferably 80% to 97.5%, and more preferably 85% to 92.5% where the total number of the units (A), the units (B) and the units (C) is 100 such that the moisture permeability and the shape retention of a heat storage material containing the polymer are good. The total number of the units (B) and the units (C) in the polymer of the present invention accounts for 1% to 30%, and preferably 2.5% to 20% where the total number of the units (A), the units (B) and the units (C) is 100 such that the moisture permeability and the shape retention of a heat storage material containing the polymer are good.

The number of the units (B) in the polymer of the present invention accounts for 1% to 100% where the total number of the units (A), the units (B) and the units (C) is 100, and preferably is 60% to 100%, and more preferably 80% to 100% such that the heat storage performance of a heat storage material containing the polymer is good. The number of the units (C) in the polymer of the present invention accounts for 0% to 99% where the total number of the units (B) and the units (C) is 100, and preferably is 0% to 40%, and more preferably 0% to 20% such that the heat storage performance of a heat storage material containing the polymer is good.

The number of the units (A), the number of the units (B), and the number of the units (C) can be determined by a well-known method from the integral values of the signals of $^{13}$C nuclear magnetic resonance spectrum (hereinafter, $^{13}$C-NMR spectrum) or $^1$H nuclear magnetic resonance spectrum (hereinafter, $^1$H-NMR spectrum) assigned to the respective types of constitutional units.

When the polymer of the present invention is a polymer produced as described below by reacting a copolymer comprising constitutional units derived from ethylene and at least one type of constitutional units (C) selected from the group consisting of constitutional units represented by Formula (2) and constitutional units represented by Formula (3) (hereinafter, referred to as copolymer (1)) with at least one compound (α) described below, the number of the units (A), the number of the units (B), and the number of the units (C) is determined by the following method, for example.

First, the numbers of the units (A) and the units (C) contained in the copolymer (1) are determined. When determined from a $^{13}$C-NMR spectrum, the numbers of diads (AA, AC, CC) of the units (A) and the units (C) are determined from the spectrum, and then these are substituted into the formula given below to calculate the numbers of the units (A) and the units (C).

Herein, AA is a unit (A)-unit (A) diad, AC is a unit (A)-unit (C) diad, and CC is a unit (C)-unit (C) diad.

The number of constitutional units (A)=100–the number of constitutional units (C)

The number of constitutional units (C)=100×(AC/2 CC)/(AA+AC+CC)

Since the units (B) in the polymer of the present invention are formed by reacting the units (C) contained in the copolymer (1) with the compound (α), the conversion of the units (C) by the reaction is determined by the following method.

The integral value of a signal assigned to specified carbon contained in the side chains of the units (C) of the copolymer (1) (hereinafter, integral value Y) and the integral value of a signal assigned to specific carbon contained in the side chains of the units (C) of the polymer (hereinafter, integral value Z) are substituted into the formula given below to calculate the conversion.

Conversion=Z/(Y+

Since the units (A) contained in the copolymer (1) are not changed by the reaction of the copolymer (1) and the compound (α), the number of the units (A) contained in the polymer shall be equal to the number of the units (A) contained in the copolymer (1). The number of the units (B) contained in the polymer is determined as the product of the number of the units (C) contained in the copolymer (1) and the conversion described above. The number of the units (C) contained in the polymer is determined as the difference between the number of the units (C) contained in the copolymer (1) and the number of the units (B) contained in the polymer.

Examples of the method for producing the polymer of the present invention include a method comprising reacting the copolymer (1) with at least one compound selected from the group consisting of alcohols having an alkyl group having 14 to 30 carbon atoms, amines having an alkyl group having 14 to 30 carbon atoms, alkyl halides having an alkyl group having 14 to 30 carbon atoms, carboxylic acids having an alkyl group having 14 to 30 carbon atoms, carboxylic acid amides having an alkyl group having 14 to 30 carbon atoms, carboxylic acid halides having an alkyl group having 14 to 30 carbon atoms, carbamic acids having an alkyl group having 14 to 30 carbon atoms, alkylureas having an alkyl group having 14 to 30 carbon atoms, and isocyanates having an alkyl group having 14 to 30 carbon atoms (hereinafter, referred to as "compound α"), and a method comprising copolymerizing ethylene with a monomer that serves as a source material of the units (B).

The copolymer (1) is a raw material for producing the polymer of the present invention, and the copolymer (1) does contains no constitutional units (B) represented by Formula (1). The copolymer (1) may contain constitutional units that correspond to none of the unit (A), the unit (B), and the unit (C).

In the copolymer (1), the number of the units (B) preferably accounts for 70% to 99% and the total number of the units (C) preferably accounts for 1% to 30%, where the total number of the units (A) and the units (C) is 100%.

Examples of the method for forming the units (B) in the polymer of the present invention include a method comprising reacting the units (C) contained in the copolymer (1) with the above-mentioned compound (α) and a method comprising copolymerizing ethylene with a monomer that serve as a source material of the units (B). The alkyl group of the compound (α) preferably is a straight chain alkyl group.

Examples of the copolymer (1) include an ethylene-acrylic acid copolymer, an ethylene-methacrylic acid copolymer, an ethylene-vinyl alcohol copolymer, an ethylene-methyl acrylate copolymer, an ethylene-ethyl acrylate copolymer, an ethylene-n-propyl acrylate copolymer, an ethylene-n-butyl acrylate copolymer, an ethylene-methyl methacrylate copolymer, an ethylene-ethyl methacrylate copolymer, an ethylene-n-propyl methacrylate copolymer, an ethylene-butyl methacrylate copolymer, an ethylene-vinyl formate copolymer, an ethylene-vinyl acetate copolymer, an ethylene-vinyl propionate copolymer, an ethylene-vinyl (n-butyrate) copolymer, an ethylene-methyl vinyl ether copolymer, an ethylene-ethyl vinyl ether copolymer, an ethylene-n-propyl vinyl ether copolymer, an ethylene-n-butyl vinyl ether copolymer, an ethylene-maleic anhydride copolymer, an ethylene-glycidyl acrylate copolymer, an ethylene-glycidyl methacrylate copolymer, an ethylene-3-(dimethylamino) propylacrylate copolymer, and an ethylene-3-(dimethylamino) propyl methacrylate copolymer.

Examples of alcohols having a straight chain alkyl group having 14 to 30 carbon atoms include n-tetradecyl alcohol, n-pentadecyl alcohol, n-hexadecyl alcohol, n-heptadecyl alcohol, n-octadecyl alcohol, n-nonadecyl alcohol, n-eicosyl alcohol, n-heneicosyl alcohol, n-docosyl alcohol, n-tricosyl alcohol, n-tetracosyl alcohol, n-pentacosyl alcohol, n-hexacosyl alcohol, n-heptacosyl alcohol, n-octacosyl alcohol, n-nonacosyl alcohol, and n-triacontyl alcohol.

Examples of alcohols having a branched alkyl group having 14 to 30 carbon atoms include isotetradecyl alcohol, isopentadecyl alcohol, isohexadecyl alcohol, isoheptadecyl alcohol, isooctadecyl alcohol, isononadecyl alcohol, isoeicosyl alcohol, isoheneicosyl alcohol, isodocosyl alcohol, isotricosyl alcohol, isotetracosyl alcohol, isopentacosyl alcohol, isohexacosyl alcohol, isoheptacosyl alcohol, isooctacosyl alcohol, and isononacosyl alcohol, and isotriacontyl alcohol.

Examples of amines having a straight chain alkyl group having 14 to carbon atoms include n-tetradecylamine, n-pentadecylamine, n-hexadecylamine, n-heptadecylamine, n-octadecylamine, n-nonadecylamine, n-eicosylamine, n-heneicosylamine, n-docosylamine, n-tricosylamine, n-tetracosylamine, n-pentacosylamine, n-hexacosyl amine, n-heptacosylamine, n-octacosylamine, n-nonacosylamine, and n-triacontylamine.

Examples of amines having a branched alkyl group having 14 to 30 carbon atoms include isotetradecylamine, isopentadecylamine, isohexaclecylamine, isoheptadecylamine, isooctadecylamine, isononadecylamine, isoeicosylamine, isoheneicosylamine, isodocosylamine, isotricosylamine, isotetracosylamine, isopentacosylamine, isohexacosylamine, isoheptacosylamine, isooctacosylamine, isononacosylamine, and isotriacontylamine.

Examples of iodides having a straight chain alkyl group having 14 to carbon atoms include n-tetradecyl iodide, n-pentadecyl iodide, n-hexadecyl iodide, n-heptadecyl iodide, n-octadecyl iodide, n-nonadecyl iodide, n-eicosyl iodide, n-heneicosyl iodide, n-docosyl iodide, n-tricosyl iodide, n-tetracosyl iodide, n-pentacosyl iodide, n-hexacosyl iodide, n-heptacosyl iodide, n-octacosyl iodide, n-nonacosyl iodide, and n-triacontyl iodide.

Examples of iodides having a branched alkyl group having 14 to 30 carbon atoms include isotetradecyl iodide, isopentadecyl iodide, isohexadecyl iodide, isoheptadecyl iodide, isooctadecyl iodide, isononadecyl iodide, isoeicosyl iodide, isoheneicosyl iodide, isodocosyl iodide, isotricosyl iodide, isotetracosyl iodide, isopentacosyl iodide, isohexacosyl iodide, isoheptacosyl iodide, isooctacosyl iodide, isononacosyl iodide, and isotriacontyl iodide.

Examples of carboxylic acids having a straight chain alkyl group having 14 to 30 carbon atoms include n-tetradecanoic acid, n-pentadecanoic acid, n-hexadecanoic acid, n-heptadecanoic acid, n-octadecanoic acid, n-nonadecanoic acid, n-eicosanoic acid, n-heneicosanoic acid, n-docosanoic acid, n-tricosanoic acid, n-tetracosanoic acid, n-pentacosanoic acid, n-hexacosanoic acid, n-heptacosanoic acid, n-octacosanoic acid, n-nonacosanoic acid, and n-triacontanoic acid.

Examples of carboxylic acids having a branched alkyl group having 14 to 30 carbon atoms include isotetradecanoic acid, isopentadecanoic acid, isohexadecanoic acid, isoheptadecanoic acid, isooctadecanoic acid, isononadecanoic acid, isoeicosanoic acid, isoheneicosanoic acid, isodocosanoic acid, isotricosanoic acid, isotetracosanoic acid, isopentacosanoic acid, isohexacosanoic acid, isoheptacosanoic acid, isooctacosanoic acid, isononacosanoic acid, and isotriacontanoic acid.

Examples of carboxylic acid amides having a straight chain alkyl group having 14 to 30 carbon atoms include n-tetradecanamide, n-pentadecanamide, n-hexadecanamide, n-heptadecanamide, n-octadecanamide, n-nonadecanamide, n-eicosanamide, n-heneicosanamide, n-docosanamide, n-tricosanamide, n-tetracosanamide, n-pentacosanamide, n-hexacosanamide, n-heptacosanamide, n-octacosanamide, n-nonacosanamide, and n-triacontanamide.

Examples of carboxylic acid amides having a branched alkyl group having 14 to 30 carbon atoms include isotetradecanamide, isopenta decanamide, isohexadecanamide, isoheptadecanamide, isooctadecanamide, isononadecanamide, isoeicosanamide, isoheneicosanamide, isodocosanamide, isotricosanamide, isotetracosanamide, isopentacosanamide, isohexacosanamide, isoheptacosanamide, isooctacosanamide, isononacosanamide, and isotriacontanamide.

Examples of carboxylic acid halides having a straight chain alkyl group having 14 to 30 carbon atoms include n-tetradecanoyl chloride, n-pentadecanoyl chloride, n-hexadecanoyl chloride, n-heptadecanoyl chloride, n-octadecanoyl chloride, n-nonadecanoyl chloride, n-eicosanoyl chloride, n-heneicosanoyl chloride, n-docosanoyl chloride, n-tricosanoyl chloride, n-tetracosanoyl chloride, n-pentacosanoyl chloride, n-hexacosanoyl chloride, n-heptacosanoyl chloride, n-octacosanoyl chloride, n-nonacosanoyl chloride, and n-triacontanoyl chloride.

Examples of carboxylic acid halides having a branched alkyl group having 14 to 30 carbon atoms include isotetradecanoyl chloride, isopentadecanoyl chloride, isohexadecanoyl chloride, isoheptadecanoyl chloride, isooctadecanoyl chloride, isononadecanoyl chloride, isoeicosanoyl chloride, isoheneicosanoyl chloride, isodocosanoyl chloride, isotricosanoyl chloride, isotetracosanoyl chloride, isopentacosanoyl chloride, isohexacosanoyl chloride, isoheptacosanoyl chloride, isooctacosanoyl chloride, isononacosanoyl chloride, and isotriacontanoyl chloride.

Examples of carbamic acids having a straight chain alkyl group having 14 to 30 carbon atoms include n-tetradecylcarbamic acid, n-pentadecylcarbamic acid, n-hexadecylcarbamic acid, n-heptadecylcarbamic acid, n-octadecylcarbamic acid, n-nonadecylcarbamic acid, n-eicosylcarbamic acid, n-heneicosylcarbamic acid, n-docosylcarbamic acid, n-tricosylcarbamic acid, n-tetracosylcarb amic acid, n-pentacosylcarb amic acid, n-hexacosylcarbamic acid, n-heptacosylcarbamic acid, n-octacosylcarbamic acid, n-nonacosylcarbamic acid, and n-triacontylcarbamic acid.

Examples of carbamic acids having a branched alkyl group having 14 to 30 carbon atoms include isotetradecylcarbamic acid, isopenta decylcarbamic acid, isohexadecylcarbamic acid, isohepta decylcarbamic acid, isooctadecylcarbamic acid, isononadecylcarbamic acid, isoeicosylcarbamic acid, isoheneicosylcarbamic acid, isodocosylcarbamic acid, isotricosylcarbamic acid, isotetracosylcarbamic acid, isopenta cosylcarbamic acid, isohexacosylcarbamic acid, isoheptacosylcarbamic acid, isooctacosylcarbamic acid, isononacosylcarbamic acid, and isotriacontylcarbamic acid.

Examples of alkylureas having a straight chain alkyl group having 14 to 30 carbon atoms include n-tetradecylurea, n-pentadecylurea, n-hexadecylurea, n-heptadecylurea, n-octadecylurea, n-nonadecylurea, n-eicosylurea, n-heneicosylurea, n-docosylurea, n-tricosylurea, n-tetracosylurea, n-pentacosylurea, n-hexacosylurea, n-heptacosylurea, n-octacosylurea, n-nonacosylurea, and n-triacontylurea.

Examples of alkylureas having a branched alkyl group having 14 to 30 carbon atoms include isotetradecylurea, isopentadecylurea, isohexadecylurea, isoheptadecylurea, isooctadecylurea, isononadecylurea, isoeicosylurea, isoheneicosylurea, isodocosylurea, isotricosylurea, isotetracosylurea, isopentacosylurea, isohexacosylurea, isoheptacosylurea, isooctacosylurea, isononacosylurea, and isotriacontylurea.

Examples of isocyanates having a straight chain alkyl group having 14 to 30 carbon atoms include n-tetradecyl isocyanate, n-pentadecyl isocyanate, n-hexadecyl isocyanate, n-heptadecyl isocyanate, n-octadecyl isocyanate, n-nonadecyl isocyanate, n-eicosyl isocyanate, n-heneicosyl isocyanate, n-docosyl isocyanate, n-tricosyl isocyanate, n-tetracosyl isocyanate, n-pentacosyl isocyanate, n-hexacosyl isocyanate, n-heptacosyl isocyanate, n-octacosyl isocyanate, n-nonacosyl isocyanate, and n-triacontyl isocyanate.

Examples of isocyanates having a branched alkyl group having 14 to 30 carbon atoms include isotetradecyl isocyanate, isopentadecyl isocyanate, isohexadecyl isocyanate, isoheptadecyl isocyanate, isooctadecyl isocyanate, isononadecyl isocyanate, isoeicosyl isocyanate, isoheneicosyl isocyanate, isodocosyl isocyanate, isotricosyl isocyanate, isotetracosyl isocyanate, isopentacosyl isocyanate, isohexacosyl isocyanate, isoheptacosyl isocyanate, isooctacosyl isocyanate, isononacosyl isocyanate, and isotriacontyl isocyanate.

When the reactivity ratio of ethylene used as a raw material in the production of the copolymer (1) is represented by r1 and the reactant ratio of the monomer to form the unit (C) is represented by r2, the product of the reactivity ratios r1r2 is preferably 0.5 to 5.0, and more preferably 0.5 to 3.0 such that the shape retention of a heat storage material containing the copolymer is good.

The reactivity ratio r1 of ethylene is a value defined by the formula r1=k11/k12 where k11 represents the reaction velocity of ethylene to bond to a polymer terminated by the unit (A) in copolymerizing ethylene with a monomer that forms the unit (C), and k12 represents the reaction velocity of the monomer that forms the unit (C) to bond to a monomer terminated by the unit (A). The reactivity ratio r1 is an index that indicates with which of ethylene and the monomer that forms the constitutional unit (C) the polymer terminated by the unit (A) is more prone to react during the copolymerization of ethylene with the monomer that forms the unit (C). A larger r1 indicates that the polymer terminated by the unit (A) reacts with ethylene more easily and a sequence of the unit (A) is formed more easily.

The reactivity ratio r2 of the monomer that forms the unit (C) is a value defined by the formula r2=k21/k22 where k21 represents the reaction velocity of ethylene to bond to a polymer terminated by the unit (C) in copolymerizing ethylene with a monomer that forms the unit (C), and k22 represents the reaction velocity of the monomer that forms the unit (C) to bond to a monomer terminated by the unit (C). The reactivity ratio r2 is an index that indicates with which of ethylene and the monomer that forms the constitutional unit (C) the polymer terminated by the unit (C) is more prone to react during the copolymerization of ethylene with the monomer that forms the unit (C). A larger r2 indicates that the polymer terminated by the unit (C) reacts with the monomer that forms the unit (C) more easily and a sequence of the unit (C) is formed more easily.

The product of reactivity ratios r1r2 is calculated by the method disclosed in the document "Kakugo, M., Naito, Y., Mizunuma, K., Miyatake, T., Macromolecules, 1982, 15, 1150." In the present invention, r1r2 is obtained by substituting the numbers of AA, AC, and CC, which are diads of the unit (A) and the unit (C), calculated from a $^{13}C$ nuclear magnetic resonance spectrum of the copolymer (1) into the following formula.

$$r1r2=AA[CC/(AC/2)^2]$$

The product of reactivity ratios r1r2 is an index that indicates the monomer sequence distribution of a copolymer. The closer to 1 the r1r2, the higher the degree of randomness of the monomer sequence distribution of the copolymer; the closer to 0 the r1r2, the higher the degree of alternate copolymerization of the monomer sequence distribution of the copolymer; and the larger the r1r2, the higher the degree of block copolymerization of the monomer sequence distribution of the copolymer.

The melt flow rate of the copolymer (1) measured at a temperature of 190° C. under a load of 21 N in accordance with JIS K7210 is preferably 0.1 to g/10 minutes to 500 g/10 minutes.

Preferably, the method for producing the copolymer (1) is a radical polymerization method performed under high pressure.

The reaction temperature at the time of reacting the copolymer (1) with at least one compound (α) is usually 40° C. to 250° C. The reaction may be performed in the presence of a solvent, and examples of the solvent include hexane, heptane, octane, nonane, decane, toluene, and xylene. When a by-product is generated in the reaction, the reaction may be performed while distilling off the by-product under reduced pressure in order to promote the reaction. In another possible embodiment, the by-product is azeotropically distilled together with the solvent, the vaporized by-product and the vaporized solvent are cooled, the distillate containing the by-product and the solvent is separated into a by-product layer and a solvent layer, and then the reaction is performed while returning only the solvent recovered as a refluxing liquid to the reaction system.

The reaction of the copolymer (1) with the at least one compound (α) may be performed while melt-kneading the copolymer (1) and the compound (α). When a by-product is generated when reacting the copolymer (1) with the compound (α) under melt-kneading, the reaction may be performed while distilling off the by-product under reduced pressure in order to promote the reaction. The melt-kneading apparatus to be used for the melt-kneading may be a known apparatus, such as a single screw extruder, a twin screw extruder, and a Banbury mixer. The temperature of the melt-kneading apparatus is preferably 100° C. to 250° C.

When the copolymer (1) is reacted with at least compounds (α) mentioned above, a catalyst may be added in order to promote the reaction. Examples of the catalyst include alkali metal salts and Group 4 metal complexes. Examples of the alkali metal salts include alkali metal hydroxides, such as lithium hydroxide, sodium hydroxide, and potassium hydroxide, and alkali metal alkoxides, such as lithium methoxide and sodium methoxide. Examples of the Group 4 metal complexes include tetra(isopropyl) orthotitanate, tetra(n-butyl) orthotitanate, and tetraoctadecyl orthotitanate. The amount of the catalyst added is preferably 0.01 parts by weight to 50 parts by weight, and more preferably 0.01 parts by weight or more and 5 parts by weight relative to the total amount of 100 parts by weight of the copolymer (1) and the at least one compounds (α) to be used for the reaction.

The melting peak temperature of the polymer of the present invention is preferably 0° C. to 100° C., and more preferably 10° C. to 60° C. such that the heat storage performance of a heat storage material containing the polymer is good.

The melting peak temperature of a polymer as referred to herein is a temperature which corresponds to the top of a melting peak observed by analyzing by the method according to JIS K7121-1987 a melt curve measured by the differential scanning calorimetry and at which the melting endotherm is maximum. When the melt curve has two or more melting peaks defined by JIS K7121-1987, the temperature of the top of the melting peak where the endotherm is maximum is defined as the melting peak temperature.

[Differential scanning calorimetry]

An aluminum pan in which about 5 mg of a sample is enclosed is (1) held at 150° C. for 5 minutes, then (2) cooled from 150° C. to −50° C. at a rate of 5° C./minute, then (3) held at −50° C. for 5 minutes, and then (4) heated from −50° C. to 150° C. at a rate of 5° C./minute, using a differential scanning calorimeter under nitrogen atmosphere. The differential scanning calorimetry curve produced by the calorimetric measurement in the step (4) is defined as the melt curve.

The polymer preferably has a melting enthalpy (ΔH), measured within a temperature range of from 10° C. (inclusive) to 60° C. (exclusive) by differential scanning calorimetry, of 50 J/g or more such that the heat storage performance of a heat storage material containing the polymer of the present invention is good. The ΔH is usually 200 J/g or less.

The melting enthalpy as referred to herein is the heat of fusion determined by analyzing, by the method according to JIS K7122-1987, a melt curve measured by the above-described differential scanning calorimetry at the part within the range of from 10° C. (inclusive) to 60° C. (exclusive). The melting peak temperature and the ΔH of a polymer can be brought into the above ranges by adjusting the number of the units (B) of the polymer and the number of carbon atoms of $L^6$ in Formula (1) of the unit (B).

The polymer of the present invention has constitutional units (A) derived from ethylene such that the shape retention after the polymer undergoes phase transition from crystal to amorphous and the molding processability of the polymer are good. Moreover, the constitutional units (A) derived from ethylene preferably form a branched structure in a polymer such that the blow moldability or the foamability is good, and more preferably, the branched structure is a long chain branched structure which is so long that macromolecular chains can be entangled due to the branched structure.

The ratio A defined by the following Formula (I) of the polymer of the present invention is preferably 0.95 or less, more preferably 0.90 or less, and even more preferably 0.80 or less.

$$A = \alpha_1/\alpha_0 \quad (I)$$

In Formula (I), $\alpha_1$ is a value obtained by a method comprising: measuring the absolute molecular weight and the intrinsic viscosity of a polymer by gel permeation chromatography using an apparatus equipped with a light scattering detector and a viscosity detector, plotting the measured data with logarithms of absolute molecular weights as abscissa against logarithms of intrinsic viscosities as ordinate, approximating with Formula (I-I) in the least squares sense logarithms of absolute molecular weights and logarithms of intrinsic viscosities within the range of from the logarithm of the weight-average molecular weight of the polymer to the logarithm of the z-average molecular weight of the polymer on the abscissa, and representing the slope of the straight line showing Formula (I-I) by $\alpha_1$.

$$\log[\eta_1] = \alpha_1 \log M_1 \log K_1 \quad (I-I)$$

In Formula (I-I), $[\eta_1]$ represents the intrinsic viscosity (unit: dl/g) of the polymer, $M_1$ represents the absolute molecular weight of the polymer, and $K_1$ is a constant.

In Formula (I), $\alpha_0$ is a value obtained by a method comprising: measuring the absolute molecular weight and the intrinsic viscosity of a polyethylene standard substance 1475a (available from National Institute of Standards and Technology) by gel permeation chromatography using an apparatus equipped with a light scattering detector and a viscosity detector, Plotting the measured data with logarithms of absolute molecular weights as abscissa against logarithms of intrinsic viscosities as ordinate, approximating with Formula (I-II) in the least squares sense logarithms of absolute molecular weights and logarithms of intrinsic viscosities within the range of from the logarithm of the weight-average molecular weight of the polyethylene standard substance 1475a to the logarithm of the z-average molecular weight of the polymer on the abscissa, and representing the slope of the straight line showing Formula (I-II) by $\alpha_0$.

$$\log[\eta_0] = \alpha_0 \log M_0 + \log K_0 \quad (I-II)$$

In Formula (I-II), $[\eta_0]$ represents the intrinsic viscosity (unit: dl/g) of the polyethylene standard substance 1475a, $M_0$ represents the absolute molecular weight of the polyethylene standard substance 1475a, $K_0$ is a constant. In the measurement of the absolute molecular weight and the intrinsic viscosity of the polymer and the polyethylene standard substance 1475a by gel permeation chromatography, the mobile phase is orthodichlorobenzene and the measurement temperature is 155° C.

In determining an absolute molecular weight from the data obtained by a light scattering detector and determining an intrinsic viscosity ([η]) with a viscosity detector, calculation is carried out using data-processing software OmniSEC (version 4.7) available from Malvern with reference to the document "Size Exclusion Chromatography, Springer (1999)."

The above-mentioned polyethylene standard substance 1475a (available from National Institute of Standards and Technology) is a high-density polyethylene having no branchings. Formula (I-I) and Formula (I-II) given above are Mark-Hauwink-Sakurada equations, which represent the relationship between the intrinsic viscosity and the molecular weight of polymers; the smaller the $\alpha_1$, the larger the number of macromolecular chain entanglements due to a branching structure. Since no branching structure is formed by the polyethylene standard substance 1475a, no macromolecular chain entanglements due to branching structure are formed. The smaller the A, which is the ratio of $\alpha_1$ to $\alpha_0$ of the polyethylene standard substance 1475a, the larger the amount of long chain branching structure formed by the units (A) in a polymer.

From the viewpoint of more reducing extrusion load at the time of molding, the activation energy of flow ($E_a$) of the polymer of the present invention is preferably 40 kJ/mol or more, more preferably 50 kJ/mol or more, and even more preferably 60 kJ/mol or more. Moreover, $E_a$ is preferably 100 kJ/mol or less, more preferably 90 kJ/mol or less, more preferably 80 kJ/mol or less such that the appearance of a molded article produced by extrusion is good. The amount of $E_a$ mainly depends upon the number of long chain branchings in a polymer. A polymer having more long chain branchings is higher in $E_a$.

The activation energy of flow ($E_a$) is determined by the method described below. First, melt complex viscosity-angular frequency curves of a polymer at three or more temperatures (T, unit: ° C.) including 170° C. selected from among 90° C., 110° C., 130° C., 150° C., and 170° C. are measured. The above-mentioned melt complex viscosity-angular frequency curve is a log-log curve in which the melt complex viscosity (unit: Pa·sec) is plotted on the ordinate and the angular frequency (unit: rad/sec) is plotted on the abscissa. Then, for each of the melt complex viscosity-angular frequency curves measured at the individual temperatures other than 170° C., the angular frequency is multiplied by aT and the melt complex viscosity is multiplied by $1/a_T$ such that the curve superposes the melt complex viscosity-angular frequency curve at 170° C. $a_T$ is a value appropriately determined such that the melt complex viscosity-angular frequency curves at the individual temperatures other than 170° C. superpose the melt complex viscosity-angular frequency curve at 170° C.

$a_T$ is commonly called a shift factor and is a value that varies depending on the measurement temperature of a melt complex viscosity-angular frequency curve.

Then, at each temperature (T), $[\ln(a_T)]$ and $[1/(T+273.16)]$ are determined and $[\ln(a_T)]$ and $[1/(T+273.16)]$ are approximated in the least squares sense by the following Formula (II), and then the slope in of the straight line showing Formula (II) is determined. The m is substituted into the following Formula (III) and $E_a$ is calculated.

$$\ln(a_T) = m(1/(T+273.16)) + n \quad (II)$$

$$E_a = |0.008314 \times m| \quad (III)$$

$a_T$: shift factor
$E_a$: activation energy of flow (unit: kJ/mol)
T: temperature (unit: ° C.)

The calculation above may use commercially available calculation software, and examples of the calculation software include Ochestrator produced by TA instruments.

The method described above is based on the following principle.

It is known that melt complex viscosity-angular frequency curves (log-log curves) measured at different temperatures are superposed on one parent curve (called "master curve") by horizontally moving the curves at the individual temperatures by prescribed distances, and this is called "principal of temperature-time superposition." The horizontal movement distance is called a "shift factor," which is a value that depends of temperature. The temperature dependence of a shift factor is known to be represented by the above Formulae (II) and (III), which are called "Arrhenius type equations."

The correlation factor in approximating $[\ln(a_T)]$ and $[1/(T+273.16)]$ in the least squares sense by Formula (II) above is adjusted to 0.9 or more.

The measurement of the above-mentioned melt complex viscosity-angular frequency curve is performed using a viscoelasticity measuring apparatus (e.g. ARES manufactured by TA instruments), usually, under the conditions including: geometry: parallel plates, plate diameter: 25 mm, plate interval: 1.2 to 2 mm, strain: 5%, and angular frequency: 0.1 to 100 rad/sec. The measurement is performed under a nitrogen atmosphere. It is preferable to previously incorporate an adequate amount (for example, 1,000 ppm by weight) of an antioxidant in a measurement sample.

The extensional viscosity nonlinear index, k, which indicates the degree of strain hardening of the polymer of the present invention is preferably 0.85 or more, more preferably 0.90 or more, and even more preferably 0.95 or more, from the viewpoint of superior moldability, such as causing small neck-in during T-die film processing, making a resulting film small in thickness variation, and being less prone to foam breakage during foam molding. Strain hardening of a polymer means that the extensional viscosity of the polymer increases sharply at above a certain amount of strain when a strain is applied to the polymer. From the viewpoint of the facility with which the polymer of the present invention is molded into a desired shape, the index k is preferably 2.00 or less, more preferably 1.50 or less, even more preferably 1.40 or less, further preferably 1.30 or less, and particularly preferably 1.20 or less.

The extensional viscosity nonlinear index k is determined by the method described below.

There are measured a viscosity $\eta_E 1(t)$ of a polymer at an extension time t when the polymer is uniaxially stretched at a temperature of 110° C. at a strain rate of 1 $\sec^{-1}$, and a viscosity $\eta_E 0.1(t)$ of the polymer at an extension time t when the polymer is uniaxially stretched at a temperature of 110° C. at a strain rate of 0.1 $\sec^{-1}$. The $\eta_E 1(t)$ and the $\eta_E 0.1(t)$ measured at an arbitrary same extension time t are substituted into the following formula to calculate $\alpha(t)$.

$$\alpha(t) = \eta_E 1(t) / \eta_E 0.1(t)$$

The logarithm of $\alpha(t)$ $(\ln(\alpha(t)))$ is plotted versus the extension time t, and $\ln(\alpha(t))$ and t are approximated in the least squares sense using the following formula within a range of t of from 2.0 sec to 2.5 sec. The value of the slope of the straight line showing the following formula is k.

$$\ln(\alpha(t)) = kt$$

There is adopted k in the case where the correlation function r2 used for performing approximation in the least squares sense using the above formula is 0.9 or more.

The measurement of viscosity when having performed the above uniaxial stretching is carried out under a nitrogen atmosphere using a viscoelasticity measuring apparatus (e.g., ARES manufactured by TA instruments).

In extensional viscosity measurement, a polymer having long chain branchings has a property that its extensional viscosity deviates from the linear region in a high strain region to increase suddenly, namely, a strain hardening property. In the case of a polymer having a strain hardening property, it is known that the logarithm of $\alpha(t)$ $(\ln(\alpha(t)))$ increases in proportion to $\ln(l/l_0)$, where $l_0$ and l are the lengths of a sample at extension times 0 and t, respectively [reference: Kiyohito Koyama, Osamu Ishizuka, Journal of Fiber Science and Technology, 37, T-258 (1981)]. In the case of a polymer having no strain hardening property, $\alpha(t)$ is 1 at any extension time, and the slope k of a straight line produced by plotting the logarithm of $\alpha(t)$ $(\ln(\alpha(t)))$ versus the extension time is 0. In the case of a polymer having a strain hardening property, the slope k of the straight line plot is not 0 especially in a high strain region. In the present invention, the slope k of the straight line produced by plotting the logarithm of a nonlinear parameter $\alpha(t)$ $(\ln(\alpha(t)))$ versus the extension time is defined as a parameter that indicates the degree of strain hardening property.

The polymer of the present invention may form a mixture with an unreacted compound (α) or a catalyst added in order to promote the reaction. The content of the unreacted compound (α) contained in the mixture is preferably less than 3 parts by weight relative to 100 parts by 100 parts by weight of the present invention in order to suppress adhesion of the polymer to a substrate such as glass and metal.

The polymer of the present invention may be either a crosslinked polymer or an uncrosslinked polymer.

In one embodiment, the polymer of the present invention is an uncrosslinked polymer (hereinafter referred to as a polymer (α)).

The polymer (α) has a gel fraction of less than 20% as described below.

In the polymer (α), the total number of the units (A), the units (B) and the units (C) accounts for preferably 90% or more, more preferably 95% or more, and even more preferably 100% where the total number of all constitutional units contained in the polymer is 100%.

<Crosslinked Polymer>

In one embodiment, the polymer of the present invention is crosslinked. That is, at least some molecules of the polymer of the present invention are connected by a covalent bond between molecules.

Examples of a method for crosslinking the polymer include a method of applying ionizing radiation to crosslink the polymer and a method of crosslinking using an organic peroxide.

When crosslinking is performed by irradiating a polymer with ionizing radiation, ionizing radiation is usually applied to the polymer (α) having been molded into a desired shape beforehand. For the molding, a known method is used, and extrusion forming, injection molding, and press molding are preferred. The molded article to be irradiated with ionizing radiation may be either a molded article containing only the polymer of the present invention as a resin component or a molded article containing the polymer of the present invention and a polymer different from the polymer of the present invention. In the latter case, one example of the polymer different from the polymer of the present invention is the polymer (2) described below. When the molded article comprises the polymer of the present invention and the polymer (2), it is preferred that the content of the polymer of the present invention is 30% by weight to 99% by weight, where the total amount of the polymer of the present invention and the polymer (2) is 100% by weight.

Examples of the ionizing radiation include α rays, β rays, γ rays, electron rays, neutrons, and X-rays, and γ rays of cobalt-60 or electron rays are preferable. When the molded article comprising a polymer is in a sheet-like form, the ionizing radiation may be applied on at least one side of the sheet-like molded article.

The irradiation of ionizing radiation is performed using a known ionizing radiation irradiation apparatus, and the dose of irradiation is usually 5 to 300 kGy, and preferably 30 to 60 kGy. The polymer of the present invention can afford a polymer having a high degree of crosslinking with a dose of irradiation lower than usual.

When a crosslinked polymer by irradiation with ionizing radiation is produced, a polymer crosslinked with a higher degree of crosslinking can be afforded by inclusion of a crosslinking aid in a molded article to be irradiated with ionizing radiation. The crosslinking aid is an agent for increasing the degree of crosslinking of a polymer and improving the mechanical property of the polymer, and a compound having a plurality of double bonds in its single molecule is preferably used. Examples of the cross-linking aid include N,N'-m-phenylenebismaleimide, toluylene bismaleimide, triallyl is ocyanurate, triallyl cyanurate, p-quinonedioxime, nitrobenzene, diphenylguanidine, divinylbenzene, ethylene glycol dimethacrylate, polyethylene glycol dimethacrylate, trimethylolpropane trimethacrylate, trimethyloipropane triacrylate, and allyl methacrylate. Such crosslinking aids may be used in combination.

The added amount of the crosslinking aid is preferably 0.01 to 4.0 parts by weight, and more preferably 0.05 to 2.0 parts by weight where the total weight of the polymer of the present invention and the polymer different from the polymer contained in the molded article to be irradiated with ionizing radiation is 100 parts by weight.

One example of the method of performing crosslinking by use of an organic peroxide is a method of crosslinking a composition comprising the polymer (α) and an organic peroxide by a known molding method accompanied by heating, thereby crosslinking the polymer (α). Examples of such a known shaping method accompanied by heating include extrusion forming, injection molding, and press molding. The resin composition comprising the polymer (α) and an organic peroxide may contain only the polymer of the present invention as a resin component and may contain the polymer of the present invention and a polymer different from that polymer.

When the resin composition comprising the polymer (α) and the organic peroxide contains a polymer different from the polymer of the present invention, examples of the different polymer include the polymer (2) described below, and the content of the polymer of the present invention is preferably 30% by weight to 99% by weight where the total amount of the polymer of the present invention and the polymer (2) is 100% by weight.

When crosslinking with an organic peroxide, an organic peroxide having a decomposition temperature equal to or higher than the flow onset temperatures of the resin component contained in the composition containing the polymer (α) and the organic peroxide is suitably used, and examples of a preferable organic peroxide include dicumylperoxide, 2,5-dimethyl-2,5-di-tert-butylperoxyhex ane, 2,5-dimethyl-2,5-di-tert-butylperoxyhexyne, α,α-di-tert-butylperoxyisopropylbenzene, and tert-butylperoxy-2-ethylhexyl carbonate.

The crosslinked polymer of the present invention may contain a known additive, if necessary. Examples of such additives include flame retardants, antioxidants, weathering agents, lubricants, antiblocking agents, antistatic agents, anticlouding agents, antidripping agents, pigments, and fillers. Such additives can be added by kneading them with the polymer before performing crosslinking.

The crosslinked polymer of the present invention preferably has a gel fraction of 20% or more, preferably 40% or more, more preferably 60% or more, and most preferably 70% or more. The gel fraction indicates the degree of crosslinking of a crosslinked polymer, that the gel fraction of a polymer is higher means that the polymer has a larger amount of crosslinked structure and a stronger network structure has been formed. If the gel fraction of a polymer is high, the polymer is superior in shape retention and is less prone to deform.

The gel fraction can be determined by the method described below. About 500 mg of a polymer and an empty net basket made of wire net (opening: 400 meshes) are weighed. A net basket containing the polymer and 50 mL of xylene (produced by Kanto Chemical Co., Inc., Cica Special Grade or equivalent; a mixture of o-, m-, and p-xylene and ethylbenzene; the total content of o-, m-, and p-xylene is 85% by weight or more) are introduced into a 100-mL test tube, followed by heated extraction at 110° C. for 6 hours. After the extraction, the net basket containing extraction residue is picked out of the test tube, followed by drying under reduced pressure at 80° C. for 8 hours in a vacuum dryer, and then the net basket containing the extraction residue after drying is weighed. The gel weight is calculated from the weight difference of the net basket containing extraction residue after drying and the empty net basket. The gel fraction (% by weight) is calculated based on the following formula.

$$\text{Gel fraction} = (\text{weight of gel}/\text{weight of measured sample}) \times 100$$

<Resin Composition>

The resin composition of the present invention is a resin composition comprising the above-described polymer of the present invention (this may hereinafter be referred to as "polymer (1)") and a polymer (2) that is a polymer whose melting peak temperature or glass transition temperature observed by differential scanning calorimetry is 50° C. to 180° C. except for the exceptive polymers defined below, wherein where the total amount of the polymer (1) and the polymer (2) is 100% by weight, the content of the polymer (1) is 30% by weight to 99% by weight and the content of the polymer (2) is 1% by weight to 70% by weight (this resin composition may hereinafter be referred to as "resin composition (A)". The polymer (1) may be composed of two or polymers, and the polymer (2) may be composed of two or more polymers.

Exceptive polymer: any polymer having constitutional units (A) derived from ethylene and constitutional units (B) represented by Formula (1) below, and optionally having at least one type of constitutional units (C) selected from the group consisting of constitutional units represented by Formula (2) below and constitutional units represented by Formula (3) below, wherein the number of the units (A) accounts for 70% to 99% and the total number of the units (B) and the units (C) accounts for 1% to 30% where the total number of the units (A), the units (B), and the units (C) is 100%, and the number of the units (B) accounts for 1% to 100% and the number of the units (C) accounts for 0% to 99% where the total number of the units (B) and the units (C) is 100%.

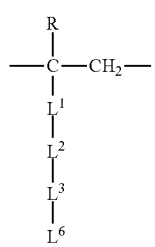

Formula (1)

In Formula (1),
R represents a hydrogen atom or a methyl group,
$L^1$ represents —CO—O—, —O—CO—, or —O—,
$L^2$ represents a single bond, —CH$_2$—, —CH$_2$—CH$_2$—, —CH$_2$—CH$_2$—CH$_2$—, —CH$_2$—CH(OH)—CH$_2$—, or —CH$_2$—CH(CH$_2$OH)—,
$L^3$ represents a single bond, —CO—O—, —O—CO—, —O—, —CO—NH—, —NH—CO—, —CO—NH—CO—, —NH—CO—NH—, —NH—, or —N(CH$_3$)—,
$L^6$ represents an alkyl group having 14 to 30 carbon atoms;

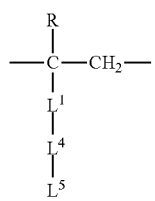

Formula (2)

In Formula (2),
R represents a hydrogen atom or a methyl group,
$L^1$ represents —CO—O—, —O—CO—, or —O—,
$L^4$ represents an alkylene group having 1 to 8 carbon atoms, $L^5$ represents a hydrogen atom, an epoxy group, —CH(OH)—CH$_2$OH, a carboxyl group, a hydroxyl group, an amino group, or an alkylamino group having 1 to carbon atoms;

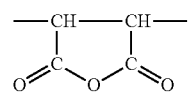

Formula (3)

In each of the horizontal chemical formulae represented by $L^1$, $L^2$, or $L^3$ in Formula (1) and Formula (2) above, the left side thereof corresponds to the top side of Formula (1) or Formula (2) and the right side thereof corresponds to the bottom side of Formula (1) or Formula (2).

The melting peak temperature or glass transition temperature of the polymer (2) observed by differential scanning calorimetry (DSC) is within the range of from 50° C. to 180° C. The melting peak temperature of the polymer (2) is a temperature which corresponds to the top of a melting peak observed by analyzing by the method in accordance with JIS K7121-1987 a melt curve measured by the differential scanning calorimetry described below and at which the melting endotherm is maximum.

The glass transition temperature of the polymer (2) is a midpoint glass transition determined by analyzing, by the method in accordance with JIS K7121-1987, a melt curve measured by the differential scanning calorimetry described below.

[Differential Scanning Calorimetry]

An aluminum pan in which about 5 mg of a sample is enclosed is (1) held at 200° C. for 5 minutes, then (2) cooled from 200° C. to −50° C. at a rate of 5° C./minute, then (3) held at −50° C. for 5 minutes, and then (4) heated from −50° C. to 200° C. at a rate of 5° C./minute, using a differential scanning calorimeter under a nitrogen atmosphere. The differential scanning calorimetry curve produced by the calorimetric measurement in the step (4) is defined as the melt curve.

Examples of the polymer (2) whose melting peak temperature is within the range of from 50° C. to 180° C. include high-density polyethylene (HDPE), high-pressure low-density polyethylene (LDPE), ethylene-α-olefin copolymers, ethylene-vinyl acetate copolymers (EVA), and polypropylene (PP).

Examples of the polymer (2) whose glass transition temperature is within the range of from 50° C. to 180° C. include cyclic olefin polymers (COP), cyclic olefin copolymers (COC), polystyrene (PS), polyvinyl chloride (PVC), acrylonitrile-styrene copolymers (AS), acrylonitrile-butadiene-styrene copolymers (ABS), polymethyl methacrylate (PMMA), polyvinyl alcohol (PVA), polyethylene terephthalate (PET), polyacrylonitrile (PAN), polyamide 6 (PA6), polyamide 66 (PA66), polycarbonate (PC), polyphenylene sulfide (PPS), and polyetheretherketone (PEEK).

The ethylene-α-olefin copolymers as the polymer (2) are copolymers comprising constitutional units derived from ethylene and constitutional units derived from an α-olefin. Examples of the α-olefin include propylene, 1-butene, 1-pentene, 1-hexene, 1-heptene, 1-octene, 4-methyl-1-pentene, and 4-methyl-1-hexene, and these may be used individually or two or more of them may be used together. Preferred as the α-olefin are α-olefins having 4 to 8 carbon atoms, and 1-butene, 1-hexene, or 1-octene is more preferred.

The density of the high-density polyethylene, the high-pressure low-density polyethylene, and the ethylene-α-olefin copolymer as the polymer (2) is 860 kg/m$^3$ to 960 kg/m$^3$.

Examples of the polypropylene as the polymer (2) include a propylene homopolymer, a propylene random copolymer as described below, and a propylene polymeric material as described below. The content of the constitutional units derived from propylene in the polypropylene is more than 50% by weight and up to 100% by weight, where the total amount of the constitutional units constituting the polypropylene is 100% by weight. Preferably, the polypropylene has a melting peak temperature of 100° C. or more.

The above-mentioned propylene random copolymer is a random copolymer comprising constitutional units derived from propylene and at least one type of constitutional units selected from the group consisting of constitutional units derived from ethylene and constitutional units derived from an α-olefin. Examples of the propylene random copolymer include propylene-ethylene random copolymers, propylene-ethylene-α-olefin random copolymers, and propylene-α-olefin random copolymers. The α-olefin is preferably an α-olefin having 4 to 10 carbon atoms and examples of such an α-olefin include linear α-olefins such as 1-butene, 1-pentene, 1-hexene, 1-octene, and 1-decene, and branched α-olefins such as 3-methyl-1-butene and 3-methyl-1-pentene. The propylene random copolymer may contain either one α-olefin or two or more α-olefins.

Examples of the methods for producing a propylene homopolymer and a propylene random copolymer include publicly known polymerization methods such as a slurry polymerization method, a solution polymerization method, a bulk polymerization method, a gas phase polymerization method, etc. using a publicly known Ziegler-Natta catalyst or a publicly known catalyst based on a complex such as a metallocene complex and a non-metallocene complex The aforementioned propylene polymeric material is a polymeric material composed of a propylene homopolymer component (I) and an ethylene copolymer component (II) comprising constitutional units derived from at least one selected from the group consisting of constitutional units derived from propylene and constitutional units derived from an α-olefins having 4 or more carbon atoms, and constitutional units derived from ethylene.

Examples of the α-olefin having 4 or more carbon atoms in the ethylene copolymer component (II) include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. As the α-olefin having 4 or more carbon atoms, α-olefins having 4 to 20 carbon atoms are preferred, α-olefins having 4 to 10 carbon atoms are more preferred, and 1-butene, 1-hexene, or 1-octene is even more preferred. The ethylene copolymer component (II) may contain either a single α-olefin having 4 or more carbon atoms or two or more α-olefin having 4 or more carbon atoms.

Examples of the ethylene copolymer component (II) include propylene-ethylene copolymers, ethylene-1-butene copolymers, ethylene-1-hexene copolymers, ethylene-1-octene copolymers, propylene-ethylene-1-butene copolymers, propylene-ethylene-1-hexene copolymers, and propylene-ethylene-1-octene copolymers. The ethylene copolymer component (II) may be a random copolymer or a block copolymer.

The propylene polymeric material can be produced via multistage polymerization using a polymerization catalyst. For example, the propylene polymeric material can be produced by producing its propylene homopolymer component (I) by an earlier polymerization step and producing its ethylene copolymer component (II) by a later polymerization step.

Examples of the polymerization catalyst to be used for the production of the propylene polymeric material include the above-mentioned catalysts to be used for the production of a propylene homopolymer and a propylene random copolymer.

Examples of the polymerization method used in each polymerization step of the production of the propylene polymeric material include a bulk polymerization method, a solution polymerization method, a slurry polymerization method, and a gas phase polymerization method. Examples of an inert hydrocarbon solvent to be used for the solution polymerization method and the slurry polymerization method include propane, butane, isobutane, pentane, hexane, heptane, and octane. These polymerization methods may be performed in combination and also may be either in a batch mode or in a continuous mode. As the polymerization method used in the production of the propylene polymeric material, preferred are continuous gas phase polymerization and bulk-gas phase polymerization in which bulk polymerization and gas phase polymerization are performed continuously.

The polypropylene as the polymer (2) is preferably a propylene homopolymer.

The polymer of the present invention and the resin composition of the present invention containing that polymer may contain additives such as inorganic fillers, organic fillers, antioxidants, weathering stabilizers, LTV absorbers, heat stabilizers, light stabilizers, antistatic agents, crystal nucleating agents, pigments, adsorbents, metal chlorides, hydrotalcites, aluminates, lubricants, and silicone compounds.

When the polymer or the resin composition contains an additive, the additive may be beforehand incorporated in one or more raw materials to be used for the production of the polymer, or alternatively may be incorporated after producing the polymer. When producing a polymer and then incorporating an additive into the polymer, the additive can be incorporated while melt-kneading the polymer.

The loading of such an additive is preferably 0.01 parts by weight to 10 parts by weight relative to 100 parts by weight of the polymer.

Examples of the inorganic fillers include talc, calcium carbonate, and calcined kaolin.

Examples of the organic fillers include fiber, wood flour, and cellulose powder.

Examples of antioxidants include phenol-based antioxidants, sulfur-containing antioxidants, phosphorus-containing antioxidants, lactone-based antioxidants, and vitamine-based antioxidants.

Examples of the UV absorbers include benzotriazole-based UV absorbers, tridiamine-based UV absorbers, anilide-based UV absorbers, and benzophenone-based UV absorbers.

Examples of the light stabilizers include hindered amine light stabilizers and benzoate-based light stabilizers.

Examples of the pigments include titanium dioxide and carbon black.

Examples of the adsorbents include metal oxides such as zinc oxide and magnesium oxide.

Examples of the metal chlorides include iron chloride and calcium chloride.

Examples of the lubricants include fatty acids, higher alcohols, aliphatic amides, and aliphatic esters.

The polymer and the resin composition of the present invention and molded articles thereof can be used as heat storage materials.

Since a heat storage material comprising the polymer of the present invention is superior in molding processability and shape retention, the shape of the heat storage material may be in any shape, for example, a spherical shape, an angular shape (a cubic shape), a beads shape, a cylindrical shape (a pellet shape), a powdery shape, a rod shape (a stick shape), a needle shape, a fibrous shape, a strand shape, a yarn shape, a cord shape, a rope shape, a net shape, a plate shape, a sheet shape, a film shape, a woven fabric shape, a nonwoven fabric shape, a box shape (a capsule shape), a foam shape, and an arbitrary the shape of a foamed article, and arbitrary three-dimensional shapes, and the shape can be chosen according to the purpose of use.

The heat storage material in a spherical shape, an angular shape (a cubic shape), a beads shape, a cylindrical shape (a pellet shape), or a powder shape may form a core-shell structure in which the polymer of the present invention is covered with a material different from the polymer of the present invention, or a core-shell structure in which a material different from the polymer of the present invention is covered with the polymer of the present invention. The materials different from the polymer of the present invention includes a polymer different from the polymer of the present invention, metal, and inorganic substances other than metal.

The heat storage material in a rod shape (a stick shape), a needle shape, a fibrous shape, a strand shape, a yarn shape, a cord shape, a rope shape, or a net shape may form a core-sheath structure in which the polymer of the present invention is covered with a material different from the polymer of the present invention, or a core-sheath structure in which a material different from the polymer of the present invention is covered with the polymer of the present invention.

The heat storage material in a plate shape, a sheet shape, a film shape, a woven fabric shape, a nonwoven fabric shape, or a box shape (a capsule shape) may form a laminate structure in which both sides or one side is covered with a material different from the polymer of the present invention, or a core-sheath structure in which a material different from the polymer of the present invention is covered with the polymer of the present invention.

The heat storage material in a foam shape may form a heat storage material in a shape different from a foam shape, or a core-shell structure, core-sheath structure, or laminate structure with a material different from the polymer of the present invention.

The heat storage material can be molded into an arbitrary three-dimensional shape by extrusion forming, injection molding, vacuum molding, blow molding, or roll forming, for example, and also may be subjected to multilayer forming with a material different from the polymer of the present invention.

<Foamed Article Containing Polymer>

The foamed article containing the polymer of the present invention can be produced by foaming a resin composition comprising the polymer of the present invention and a foaming agent (this may hereinafter be referred to as a "resin composition (B)").

Examples of the foaming agent include known physical foaming agents and known thermal decomposition type foaming agents. Two or more foaming agents may be used in combination. The resin composition (B) may also contain a polymer different from the polymer of the present invention. When the resin composition (B) contains a polymer different from the polymer of the present invention, the polymer may be the polymer (2) described above. When the resin composition (B) comprises the polymer (1) and the polymer (2), the content of the polymer (1) is preferably 30% by weight to 99% by weight and the content of the polymer (2) is preferably 1% by weight to 70% by weight where the total amount of the polymer (1) and the polymer (2) is 100% by weight.

Examples of physical foaming agents include air, oxygen, nitrogen, carbon dioxide, ethane, propane, n-butane, isobutane, n-pentane, isopentane, n-hexane, isohexane, cyclohexane, heptane, ethylene, propylene, water, petroleum ether, methyl chloride, ethyl chloride, monochlorotrifluoromethane, dichlorodifluoromethane, and dichlorotetrafluoroethane; among these, carbon dioxide, nitrogen, n-butane, isobutane, n-pentane, or isopentane is preferred from the viewpoints of economical efficiency and safety.

Examples of the heat decomposition type foaming agents include inorganic foaming agents, such as sodium carbonate; and organic foaming agents, such as azodicarbonamide, N,N-dinitropentamethylenetetramine, p,p'-oxy-bisbenzenesulfonylhydrazide, and hydrazodicarbonamide; among these, azodicarbonamide, sodium hydrogencarbonate, or p,p'-oxybisbenzenesulfonylhydrazide is preferred from the viewpoints of economical efficiency and safety, and a foaming agent comprising azodicarbonamide or sodium hydrogencarbonate is more preferred because the molding temperature range is wide or a foamed article having fine bubbles can be obtained.

When a heat decomposition type foaming agent is used, a heat decomposition type foaming agent whose decomposition temperature is 120 to 240° C. is usually used.

When a heat decomposition type foaming agent having a decomposition temperature of higher than 200° C., it is preferred to lower the decomposition temperature to 200° C. or lower by using a foaming aid in combination. Examples of the foaming aid include metal oxides, such as zinc oxide and lead oxide; metal carboxylates, such as zinc carbonate; metal chlorides, such as zinc chloride; urea; metal soaps, such as zinc stearate, lead stearate, dibasic lead stearate, zinc laurate, zinc 2-ethylhexoate, and dibasic lead phthalate; organotin compounds, such as dibutyltin dilaurate and dibutyltin dimaleate; and inorganic salts, such as tribasic lead sulphate, dibasic lead phosphite, and basic lead sulfite.

A masterbatch composed of a heat decomposition type foaming agent, a foaming aid, and a resin can be used as the heat decomposition type foaming agent. The type of the resin to be used for the masterbatch is not particularly limited, and the resin component or the resin composition of the present invention is preferred. The total amount of the heat decomposition type foaming agent and the foaming aid contained in the masterbatch is usually 5 to 90% by weight, where the amount of the resin contained in the masterbatch is 100% by weight.

In order to acquire a foamed article having finer bubbles, the resin composition preferably further contains a foam nucleating agent. Examples of the foam nucleating agent include talc, silica, mica, zeolite, calcium carbonate, calcium silicate, magnesium carbonate, aluminum hydroxide, barium sulfate, aluminosilicate, clay, quartz powder, and diatomite; organic polymer beads having a particle diameter of 100 μm or less made of polymethyl methacrylate or polystyrene; metal salts, such as calcium stearate, magnesium stearate, zinc stearate, sodium benzoate, calcium benzoate, and aluminum benzoate; and metal oxides, such as magnesium oxide and zinc oxide; and two or more of them may be used in combination.

In the resin composition (B), the amount of the foaming agent is appropriately determined according to the type of the foaming agent to be used and the expansion ratio of a foamed article to produce, and it is usually 1 to 100 parts by weight, where the weight of the resin component contained in the resin composition (B) is 100 parts by weight.

The resin composition (B) may, if necessary, contain known additives, such as a heat-resistant stabilizer, a weathering stabilizer, a pigment, a filler, a lubricant, an antistatic agent, and a flame retardant.

Preferably, the resin composition (B) is one prepared by melt-kneading the polymer of the present invention, a foaming agent, and other components, which are incorporated if necessary. Examples of the method of melt-kneading include, for example, a method in which a polymer, a foaming agent, etc. are mixed with a kneading machine, such as a tumbler blender and a Henschel mixer, and then are melt-kneaded with a single screw extruder, a multiple screw extruder, or the like, or a method in which the components are melt-kneaded with a kneading machine, such as a kneader and a Banbury mixer.

For the production of a foamed article comprising a polymer, a known method is used, and extrusion foam forming, injection foam molding, compression foam molding, etc. are suitably used.

When the foamed article of the present invention contains the crosslinked polymer of the present invention, examples of the method for producing the foamed article include a method comprising the step of irradiating a resin composition comprising the polymer (α) and a foaming agent with ionizing radiation or melt-kneading a crosslinked polymer and a foaming agent to produce a resin composition (α) comprising a crosslinked polymer and the foaming agent, and the step of heating the resin composition (α) to produce a foamed article (hereinafter referred to as Method (A)), and a method comprising the step of heating and pressurizing a resin composition comprising the polymer (α), a foaming agent, and an organic peroxide or a resin composition comprising a crosslinked polymer and a foaming agent, within a mold to produce a resin composition (β) comprising a crosslinked polymer, and the step of opening the mold to produce a foamed article (hereinafter referred to as Method (B)).

The method (A) is described concretely below.

The ionizing radiation with which the resin composition comprising the polymer (A) and the foaming agent may be the ionizing irradiation that is to be used for the production of the crosslinked molded article of the present invention. The irradiation method and the dose of the ionizing radiation may be the same as the method and the dose disclosed as the irradiation method and the dose used in the production of the uncrosslinked molded article of the present invention.

The resin composition comprising the polymer (α) and a foaming agent is usually irradiated with ionizing radiation after being shaped into a desired shape at a temperature lower than the decomposition temperature of the foaming agent. Examples of the method of shaping into a sheet include a method of shaping into a sheet shape with a calender roll, a method of shaping into a sheet shape with a press forming machine, and a method of shaping into a sheet shape by melt-extruding through a T die or a circular die.

The melt-kneading of the crosslinked polymer of the present invention and the foaming agent is usually performed at a temperature lower than the decomposition temperature of the foaming agent.

As the method of producing a foamed article by heating in the step of heating the resin composition (α) produce a foamed article, a known method of producing a resin foamed article can be employed, and methods by which the resin composition (α) can be subjected to heat foam processing continuously such as a vertical hot air foaming method, a horizontal hot air foaming method, and a horizontal chemical foaming method, are preferred. The heating temperature is a temperature equal to or higher than the decomposition temperature of the foaming agent, and preferably is a temperature 5 to 50° C. higher than the decomposition temperature of a heat decomposition-type foaming agent. The heating time can appropriately be chosen according to the type and the amount of the foaming agent, and when heating with an oven, the heating time is usually 3 to 5 minutes.

The method (B) is described concretely below.

Examples of the organic peroxide include organic peroxides that can be used for the production of the crosslinked polymer of the present invention.

The resin composition to be pressurized while being heated in a mold is preferably a resin composition prepared by melt-kneading beforehand a resin composition comprising the polymer (α), a foaming agent and an organic peroxide or a resin composition comprising a crosslinked polymer and a foaming agent, at a temperature that is lower than the decomposition temperature of the foaming agent and also lower than the one-minute half-life temperature of the organic peroxide.

The temperature at which the resin composition comprising the polymer (α), the foaming agent, and the organic peroxide is heated is preferably a temperature that is equal to or higher than the one-minute half-life temperature of the organic peroxide and that is equal to or higher than the decomposition temperature of the foaming agent.

In the step of opening the mold to produce a foamed article, it is preferred to open the mold after cooling the mold to a temperature of 40° C. to 100° C. The temperature of the mold at the time when the mold is opened is preferably 40° C. or more, and more preferably 50° C. or more from the viewpoint of increasing the melt viscosity of the resin composition (f3) and promoting the expansion at the time of foaming. From the viewpoint of inhibiting escape of gas in foaming, the temperature of the mold is preferably 90° C. or less, and more preferably 80° C. or less.

Since the temperature of the mold suitable for opening varies depending upon the viscosity and the melting point of the resin composition (13) or the size of the foamed article to be produced, the temperature of the mold can be adjusted appropriately.

In order to increase the expansion ratio of the strength of the foamed article comprising the crosslinked polymer of the present invention, the resin composition comprising the polymer (α) and the foaming agent preferably further comprises a crosslinking aid. Examples of the crosslinking aid include the crosslinking aids to be used for the production of the crosslinked polymer of the present invention. The amount of the crosslinking aid contained in the resin composition comprising the polymer (α), the foaming agent and the crosslinking aid is preferably 0.01 to 4.0 parts by weight, and more preferably 0.05 to 2.0 parts by weight where the weight of the resin component contained in the resin composition is 100 parts by weight.

Since the heat storage material comprising the polymer of the present invention is superior in heat storage performance, mold processability, shape retention, and moisture permeability, it can be used suitably as a product that is directly or indirectly required to have hot and cold insulative performance or a component thereof, for example.

Examples of the product that is directly or indirectly required to have hot and cold insulative performance or a component thereof include building materials, furniture, interior appliances, bedding, a bathroom materials, vehicles, air conditioners, electric appliances, hot insulative containers, clothing, daily necessities, agricultural materials, fermentation systems, thermoelectric conversion systems, and heat carrying media.

Examples of the building materials include flooring material, a wallplate, wallpaper, ceiling material, roof material, floor heating systems, tatami, door, fusuma, rain shutter door, shoji, window, and window frame.

When using as a flooring material, a wallplate, a ceiling material, or a roof material, a laminate comprising the heat storage material in a plate shape, a sheet shape, or a foam body shape, a heat insulation material made of a material different from the polymer of the present invention, and a heat shielding material made of a material different from the polymer of the present invention can suitably be used in order to maintain the indoor space temperature more constant against change of the outside environment temperature.

Examples of the heat insulation material include polystyrene foam, polyurethane foam, acrylic resin foam, phenolic resin foam, a polyethylene resin foam, foamed rubber, glass wool, rock wool, foamed ceramics, vacuum insulating material, and composite materials thereof.

Examples of the heat shielding material include aluminum plate, aluminum foil, aluminum powder-containing paint, ceramic powder paint, and composite materials thereof.

When using as a wallplate, a ceiling material, or a roof material, a laminate comprising the heat storage material in a plate shape, a sheet shape, of a foam body shape and a flame retardant, semi-flame retardant, or non-inflammable fireproof material made of a material different from the polymer of the present invention can suitably be used in order to impart fire resistant properties.

Examples of the fireproof material include concrete, gypsum, woody cement, calcium silicate, glass, metal, foamed fire-protecting material, fire retarding material-containing materials, and composite materials thereof.

When using as a component of a floor heating system, a laminate comprising the heat storage material in a plate shape, a sheet shape, or a foam body shape, a heat insulation material made of a material different from the polymer of the present invention, and a sensible heat storage material made of a material different from the polymer of the present invention can suitably be used in order to utilize the heat generated by a heating element such as a heating cable, a plane heater, and hot water piping, efficiently for maintaining room temperature.

Examples of the sensible heat storage material include concrete, mortar, concrete slab, and composite materials thereof.

When using as a component of tatami, a laminate comprising the heat storage material in a plate shape, a sheet shape, or a foam body shape, a heat insulation material made of a material different from the polymer of the present invention, a tatami board made of a material different from the polymer of the present invention, and a tatami surface made of a material different from the polymer of the present invention can suitably be used in order to maintain the indoor space temperature more constant against change of the outside environment temperature. When using for a tatami board material, a heat storage tatami board made of a mixture of the heat storage material and a woody fiber can suitably be used, and when using for a tatami surface, a heat storage tatami surface made of a heat storage fiber in which there is formed a core-sheath structure of the heat storage material in a fibrous shape or a strand shape and a tatami surface material made of a material different from the polymer of the present invention can suitably be used.

When using as a component of a door, a component of a fusuma, or a component of a rain shutter door, a laminate comprising the heat storage material in a plate shape, a sheet shape, or a foamed body shape, a heat insulation material made of a material different from the polymer of the present invention, and a surface material made of a material different from the polymer of the present invention can suitably be used in order to maintain the temperature of a room separated by a door, a fusuma, or a rain shutter door more constant.

When using as a component of shoji, the heat storage material in a foam body shape or a nonwoven fabric shape or a laminate comprising the heat storage material in a foam body shape or a nonwoven fabric shape and a shoji paper made of a material different from the polymer of the present invention can suitably be used in order to maintain more constant the temperature of a room separated by shoji or in order to impart light transmittance to some extent.

When using as a component of a window, a laminate comprising the heat storage material in a foam body shape or a nonwoven fabric shape and glass, polycarbonate, or polymethyl methacrylate can suitably be used in order to maintain the indoor space temperature more constant against change of the outside environment temperature and in order to impart light transmittance to some extent.

When using as a component of a window frame, a laminate composed of a heat storage material in a plate shape, a sheet shape, or a foam body shape and a window frame made of metal or a window frame made of a polymer different from the polymer of the present invention in order to maintain the indoor space temperature more constant against change of the outside environment temperature and in order to minimize the difference between the room temperature and the temperature of a window frame to prevent dew condensation.

Examples of the furniture, interior appliances, and bedding include a partition board, a blind, a curtain, a carpet, bedding, and a mattress.

When using as a component of a partition board, a laminate comprising the heat storage material in a plate shape, a sheet shape, or a foam body shape, a heat insulation material made of a material different from the polymer of the present invention, and a surface material made of a material different from the polymer of the present invention can suitably be used in order to maintain the temperature of a room separated by partition boards more constant.

When using as a component of a blind, a laminate composed the heat storage material in a plate shape or a sheet shape and a heat shielding material made of a material different from the polymer of the present invention in order to maintain the indoor space temperature more constant against change of the outside environment temperature and in order to impart light shielding performance. For example, when the configuration of a feather material of the blind is composed of a heat shielding surface and a heat storage surface, the amount of solar heat entering into a building can be controlled according to season or time zone by using it with the heat shielding surface facing outside in the summer season and using it in the winter season with the heat storage surface facing outside in the day time and with the heat storage surface facing inside in the night so that the power consumption of an air conditioner can be reduced.

When using as a curtain, a carpet, and bedding, a heat storage woven fabric or a heat storage nonwoven fabric made of heat storage fiber in which a core-sheath structure of the heat storage material in a fibrous shape or a strand shape and a fiber material made of a material different from the polymer of the present invention can suitably be used in order to impart arbitrary feeling and tough feeling.

When using as a carpet, a laminate comprising the heat storage material in a plate shape, a sheet shape, or a foam body shape and a woven fabric or a nonwoven fabric made of fiber made of a material different from the polymer of the present invention can suitably be used in order to impart arbitrary feeling and tough feeling.

When using as a mattress, the heat storage material in a foam body shape can suitably be used in order to impart softness.

Examples of the bathroom material include bathtub material, bath lid material, bathroom flooring material, bathroom wallplate, and bathroom ceiling material.

When using as bathtub material or a bath lid material, a laminate comprising the heat storage material in a plate shape, a sheet shape, or a foam body shape, a heat insulation material made of a material different from the polymer of the present invention, and a surface material made of a material different from the polymer of the present invention can suitably be used in order to maintain the water temperature in a bathtub more constant against change of the temperature in the bathroom.

When using as a bathroom flooring material, a bathroom wallplate, or a bathroom ceiling material, a laminate comprising the heat storage material in a plate shape, a sheet shape, or a foam body shape, a heat insulation material made of a material different from the polymer of the present invention, and a heat shielding material made of a material different from the polymer of the present invention can suitably be used in order to maintain the bathroom temperature more constant against change of the outside environment temperature.

Examples of the component of a vehicle include an engine warming-up system, a gasoline evaporation loss prevention device (canister), an air conditioner in a vehicle, an interior material, a component of a container of a cold insulative vehicle, and a component of a container of a hot insulative vehicle.

Examples of a component of an air conditioner include a heat storage material of a building frame heat storage type air conditioning system, a component of a heat storage tank of a water heat storage type air conditioning system, a component of a heat storage tank of an ice heat storage type air conditioning system, a heat medium piping material or a heat insulating material thereof, a cold medium piping material or a heat insulating material thereof, and a duct material of a heat-exchange type ventilation system.

Examples of the electric appliances include:

electronic devices, such as television, blu-ray recorder/player, DVD recorder/player, monitor, display, projector, rear projection television, component stereo, radio cassette recorder, digital camera, digital camcorder, cellular phone, smart phone, notebook personal computer, desktop personal computer, tablet personal computer, PDA, printer, 3D printer, scanner, home video game machine, handheld game machine, storage battery for electronic devices, and transformer for electronic devices;

heating type household electric appliances, such as electric heater, fan heater, dehumidifier, humidifier, hot carpet, kotatsu, electric blanket, electric rug, electric footwarmer, heated toilet seat, warm water flush toilet seat, iron, trouser press, futon dryer, clothes dryer, hair dryer, hair iron, warm massager, thermotherapy device, tableware washer, tableware dryer, and dry type garbage disposer;

heating type cooking household appliances, such as IH cooking heater, hot plate, microwave oven, oven range, rice cooker, rice cake making machine, home bakery, toaster, electronic fermentation machine, electric pot, electric kettle, and coffee machine;

cooking household appliances which generate frictional heat, such as mixer/food processor and rice-polishing machine; and hot/cold insulation chambers with an electric power source, such as refrigerator-freezer, thermohygrostat cool chamber, milk cool chamber, brown rice cool chamber, vegetable cool chamber, cold rice tub, freeze/refrigeration showcase, prefab type cool chamber, prefab type refrigeration showcase, hot-cold kitchen cart, wine cellar, food vending machine, and lunch warming cabinet.

When using as a component of an electronic device, the heat storage material in a plate shape or a sheet shape can suitably be used in order to protect an electronic component from the heat generated from electronic components constituting the electronic device. Especially when a large amount of heat is locally generated, such as a highly integrated electronic component, a laminate comprising the heat storage material in a plate shape or a sheet shape and a highly heat conductive material made of a material different from the polymer of the present invention can suitably be used in order to make the heat generated from a heating body to be absorbed efficiently by with the heat storage material in a plate shape or a sheet shape.

Examples of the highly heat conductive material include carbon nanotube, boron nitride nanotube, graphite, copper, aluminum, boron nitride, aluminum nitride, aluminum oxide, magnesium oxide, and composite materials thereof.

When using as a component of an electronic device to be used in contact with the human body, a laminate composed of the heat storage material in a plate shape or a sheet shape and a housing material in order to inhibit the heat generated by the electronic component constituting the electronic device from transmitting to the human body via the housing constituting the electronic device.

When using as a component of a heating type household electric appliance, the heat storage material in a plate shape or a sheet shape can suitably be used in order to protect other components constituting the heating type household electric appliance from the heat generated from the heating device constituting the heating type household electric appliance. In order to improve heat insulation performance and reduce power consumption, a laminate comprising the heat storage material in a plate shape, a sheet shape, or a foam body shape and a heat insulation material made of a material different from the polymer of the present invention can suitably be used.

When using as a component of a heating type cooking household appliance, the heat storage material in a plate shape or a sheet shape can suitably be used in order to protect other components constituting the heating type cooking household appliance from the heat generated from the heating device constituting the heating type cooking household appliance. In order to improve heat insulation performance and reduce power consumption, a laminate comprising the heat storage material in a plate shape, a sheet shape, or a foam body shape and a heat insulation material made of a material different from the polymer of the present invention can suitably be used.

When using as a component of a cooking household appliance which generates frictional heat, a laminate comprising the heat storage material in a plate shape or a sheet shape and a highly heat conductive material made of a material different from the polymer of the present invention can suitably be used in order to protect foods from frictional heat.

When using for a component of a hot/cold insulative chamber with an electric power source, a laminate comprising the heat storage material in a plate shape, a sheet shape, or a foam body shape, a heat insulation material made of a material different from the polymer of the present invention, and a heat shielding material made of a material different from the polymer of the present invention can suitably be used in order to maintain the interior temperature more constant against change of the outside environment temperature.

Examples of the hot and cool insulative container include a hot and cool insulative container for transporting or storing samples or organs, a hot and cool insulative container for transporting or storing medicines or chemical substances, and a hot and cool insulative container for transporting or storing foods. When using for a component of a hot and cool insulative container, a laminate comprising the heat storage material in a plate shape, a sheet shape, or a foam body shape, a heat insulation material made of a material different from the polymer of the present invention, and a heat shielding material made of a material different from the polymer of the present invention can suitably be used in order to maintain the inner temperature more constant against change of the outside environment temperature.

Examples of the clothing include pajamas, cold-proof clothing, glove, socks, sportswear, wet suit, dry suit, heat-resistant protective clothing, and fire-resistant protective clothing. When using for clothing, a heat storage woven fabric or a heat storage nonwoven fabric composed of heat storage fiber in which there is formed a core-sheath structure of the heat storage material in a fibrous shape or a strand shape and a fiber material made of a material different from the polymer of the present invention can suitably be used in order to maintain the body temperature constant and impart arbitrary touch feeling.

When using for a wet suit or a dry suit, a laminate comprising the heat storage material in a plate shape or a sheet shape, the heat storage woven fabric or the heat storage nonwoven fabric and a heat insulation material made of a material different from the polymer of the present invention can suitably be used in order to maintain the body temperature more constant against cold water.

When using for heat-resistant protective clothing, and fire-resistant protective clothing, a laminate comprising the heat storage material in a plate shape or a sheet shape, the heat storage woven fabric or the heat storage nonwoven fabric, a heat insulation material made of a material different from the polymer of the present invention, and a heat shielding material made of a material different from the polymer of the present invention in order to maintain the body temperature more constant from a heating element or a flame.

Examples of the daily necessaries include tableware, lunch box, canteen, thermos bottle, handwarmer, hot water bag, cold insulation material, and microwave oven heating type heat insulation material.

When using as a component of tableware or a lunch box, a laminate comprising the heat storage material in a plate shape, a sheet shape, or a foam body shape and a heat insulation material made of a material different from the polymer of the present invention in order to maintain the food temperature more constant against the outside environment temperature.

Examples of a fermentation system to produce compost or biogas by fermenting organic wastes, such as commercially or domestically released kitchen garbage, sludge, animal excrement, stockbreeding-fishery residues, or plants include a bio type garbage disposer, a fermenter for compost production, and a fermenter for biogas production. When using as the fermentation system, a laminate comprising the heat storage material in a plate shape, a sheet shape, or a foam body shape and a heat insulation material made of a material different from the polymer of the present invention can suitably be used in order to maintain the temperature in a chamber more constant at a temperature suitable for fermentation against change of the outside environment temperature.

Examples of the agricultural material include film for greenhouses, agricultural heat insulation sheet, hose and pipe for sprinkling water, and agricultural warming mat for seedling. When using as an agricultural material, a laminate comprising the heat storage material in a plate shape, a sheet shape, or a foam body shape and a heat insulation material made of a material different from the polymer of the present invention can suitably be used in order to maintain the crop ambient temperature more constant at a temperature suitable for the growth of agricultural products against change of the outside environment temperature

EXAMPLES

The present invention is described in more detail below with reference to Examples and Comparative Examples.

[I] Numbers (unit: c,v0) of constitutional units (A) derived from ethylene, constitutional units (B) represented by the above Formula (1), and constitutional units (C) represented by the above Formula (2) contained in a polymer A nuclear magnetic resonance spectrum (hereinafter, NMR spectrum) was measured under the measurement conditions shown below using a nuclear magnetic resonance spectrometer (NMR).

<Proton Nuclear Magnetic Resonance ($^1$H-NMR) Measurement Conditions>

Device: AVANCEM 600HD manufactured by Bruker BioSpin K.K.
Measurement probe: 10-mm cryoprobe
Measurement solvent: 1,1,2,2-tetrachloroethane-d9
Sample concentration: 20 mg/mL
Measurement temperature: 135° C.
Measuring method: proton method
Number of transients: 64
Pulse width: 30 degrees
Pulse repetition time: 4 seconds
Measurement standard: tetramethylsilane <Carbon Nuclear Magnetic Resonance ($^{13}$C-NMR) Measurement Conditions>

Device: AVANCEIII 600HD manufactured by Bruker BioSpin K.K.
Measurement probe: 10-mm cryoprobe
Measurement solvent: mixed solvent of 1,2-dichlorobenzene/1,1,2,2-tetrachloroethane-d$_2$=85/15 (volumetric ratio)
Sample concentration: 100 mg/mL Measurement temperature: 135° C.
Measurement method: proton decoupling method
Number of transients: 256
Pulse width: 45 degrees
Pulse repetition time: 4 seconds
Measurement standard: tetramethylsilane <Numbers of Constitutional Units ($A_1$) Derived from Ethylene and Constitutional Units ($C_1$) Derived from Methyl Acrylate Contained in an Ethylene-methyl Acrylate Copolymer>(Unit: %)

For the $^{13}$C-NMR. spectrum of an ethylene-methyl acrylate copolymer measured under the above-described $^{13}$C-NMR. measurement conditions, integral values within the following ranges $a_1$, $b_1$, $c_1$, $d_1$, and $e_1$, and then the numbers of constitutional units ($A_1$) derived from ethylene and the constitutional units ($C_1$) derived from methyl acrylate were calculated from the contents (numbers) of three types of diad (EE, EA, AA) calculated from the following formulae. Herein, EE represents ethylene-ethylene diad, EA represents ethylene-methyl acrylate diad, and AA represents methyl acrylate-methyl acrylate diad.

$a_1$: 28.1-30.5 ppm
$b_1$: 31.9-32.6 ppm
$c_1$: 41.7 ppm
$d_1$: 43.1-44.2 ppm
$e_1$: 45.0-46.5 ppm
EE=$a_1$/4+$b_1$/2
EA=$e_1$
AA=$c_1$+$d_1$ The number of constitutional units ($A_1$)=100−the number of constitutional units ($C_1$)

The number of constitutional units ($C_1$)=100×(EA/2+AA)/(EE+EA+AA)

<Conversion ($X_1$) of Constitutional Units ($C_1$) Derived from Methyl Acrylate to Constitutional Units ($B_2$) Represented by Formula (1)>(Unit: %)

In an example in which there was obtained a polymer composed of constitutional units ($A_2$) derived from ethylene, constitutional units ($B_2$) represented by Formula (1), and constitutional units ($C_2$) derived from methyl acrylate by reacting an ethylene-methyl acrylate copolymer with a long chain alkyl alcohol, integral values within the ranges $f_1$ and $g_1$ given below were determined for a $^{13}$C-NMR spectrum of the polymer measured under the $^{13}$C-NMR measurement conditions shown above. Then, a conversion ($X_1$) with which the constitutional units ($C_1$) derived from methyl acrylate contained in the ethylene-methyl acrylate copolymer were converted to the constitutional units ($B_2$) represented by Formula (1) of the polymer was calculated from the formula given below.

$f_1$: 50.6-51.1 ppm
$g_1$: 63.9-64.8 ppm

Conversion($X_1$)=100×$g_1$/($f_1$+$g_1$)

<Numbers of Constitutional Units ($A_2$) Derived from Ethylene, Constitutional Units ($B_2$) Represented by the Formula (1), and Constitutional Units ($C_2$) Derived from Methyl Acrylate Contained in a Polymer>(Unit: %)

The number of constitutional units ($A_2$) derived from ethylene, the number of constitutional units ($B_2$) represented by the Formula (1), and the number of constitutional units ($C_2$) derived from methyl acrylate contained in a polymer were calculated from the following formulae, respectively.

The number of constitutional units ($A_2$) contained in a polymer=the number of constitutional units ($A_1$) contained in an ethylene-methyl acrylate copolymer The number of constitutional units ($B_2$) contained in a polymer=(the number of constitutional units ($C_1$) contained in an ethylene-methyl acrylate copolymer)×conversion ($X_1$)/100

The number of constitutional units ($C_2$) contained in a polymer=(the number of constitutional units ($C_1$) contained in an ethylene-methyl acrylate copolymer)−(the number of constitutional units ($B_2$) contained in a polymer)

As to a polymer produced using an ethylene-ethyl acrylate copolymer instead of an ethylene-methyl acrylate, the constitutional units ($A_2$), ($B_2$), and ($C_2$) were calculated in the same manner except that the integration range $f_1$ to 59.6-60.1 ppm.

<Numbers of Constitutional Units ($A_3$) Derived from Ethylene and Constitutional Units ($C_3$) Derived from Methyl Methacrylate Contained in an Ethylene-methyl Methacrylate Copolymer>(Unit: %)

For the $^{13}$C-NMR spectrum of an ethylene-methyl methacrylate copolymer measured under the above-described $^{13}$C-NMR measurement conditions, integral values within the following ranges $a_2$, $b_2$, $c_2$, and $d_2$, and then the numbers of constitutional units ($A_3$) derived from ethylene and the constitutional units ($C_3$) derived from methyl methacrylate were calculated from the contents (numbers) of three types of diad (EE, EM, MM) calculated from the following formulae.

Herein, EE represents ethylene-ethylene diad, EM represents ethylene-methyl methacrylate diad, and MM represents methyl methacrylate-methyl methacrylate diad.

$a_2$: 28.1-31.5 ppm
$b_2$: 44.5-45.0 ppm
$c_2$: 45.0-46.0 ppm
$d_2$: 46.0-47.0 ppm
EE=$a_2$/4
EM=$d_2$
MM=$b_2$+$C_2$ The number of constitutional units ($A_3$)=100−the number of constitutional units ($C_3$)

The number of constitutional units ($C_3$)=100×(EM/2+MM)/(EE+EM+MM)

<Conversion ($X_2$) of Constitutional Units ($C_3$) Derived from Methyl Methacrylate to Constitutional Units ($B_4$) Represented by Formula (1)>(Unit: %)

In an example in which there was obtained a polymer composed of constitutional units ($A_4$) derived from ethylene, constitutional units ($B_4$) represented by Formula (1), and constitutional units ($C_4$) derived from methyl methacrylate by reacting an ethylene-methyl methacrylate copolymer with a long chain alkyl alcohol, integral values within the ranges $f_2$ and $g_2$ given below were determined for a $^{13}$C-NMR spectrum of the polymer measured under the $^{13}$C-NMR measurement conditions shown above. Then, a conversion ($X_2$) with which the constitutional units ($C_3$) derived from methyl methacrylate contained in the ethylene-methyl methacrylate copolymer were converted to the constitutional units ($B_4$) represented by Formula (1) of the polymer was calculated from the formula given below.

$f_2$: 50.6-51.1 ppm
$g_2$: 63.9-64.8 ppm

Conversion($X_2$)=100×$g_2$/($f_2$+$g_2$)

<Numbers of Constitutional Units (A4) Derived from Ethylene, Constitutional Units ($B_4$) Represented by the Formula (1), and Constitutional Units ($C_4$) Derived from Methyl Methacrylate Contained in a Polymer>(Unit: %)

The number of constitutional units ($A_4$) derived from ethylene, the number of constitutional units ($B_4$) represented by the Formula (1), and the number of constitutional units $(C_4)$ derived from methyl acrylate contained in the polymer were calculated from the following formulae, respectively The number of constitutional units $(A_4)$ contained in a polymer=the number of constitutional units $(A_3)$ contained in an ethylene-methyl methacrylate copolymer The number of constitutional units $(B_4)$ contained in a polymer=(the number of constitutional units $(C_3)$ contained in an ethylene-methyl methacrylate copolymer)×conversion $(X_2)/100$ The number of constitutional units $(C_4)$ contained in a polymer=(the number of constitutional units $(C_3)$ contained in an ethylene-methyl methacrylate copolymer)–(the number of constitutional units $(B_4)$ contained in a polymer)

<Numbers of Constitutional Units $(A_5)$ Derived from Ethylene and Constitutional Units $(C_5)$ Derived from Glycidyl Methacrylate Contained in an Ethylene-glycidyl Methacrylate Copolymer>(Unit: %)

For the $^1$H-NMR spectrum of an ethylene-glycidyl methacrylate copolymer measured under the above-described $^1$H-NMR measurement conditions, integral values within the following ranges $a_3$, $b_3$, $c_3$, $d_3$, $e_3$, and $f_3$, and then the numbers of constitutional units $(A_5)$ derived from ethylene and the constitutional units $(C_5)$ derived from glycidyl methacrylate were calculated from the following formulae.

$a_3$: 0.30-2.15 ppm
$b_3$: 2.50-2.68 ppm
$c_3$: 2.68-2.86 ppm
$d_3$: 3.00-3.22 ppm
$e_3$: 3.93-4.01 ppm
$f_3$: 4.23-4.36 ppm The number of constitutional units $(A_5)$=the number of $(a_3-C_5\times5)/4$ The number of constitutional units $(C_5)$=the number of $(b_3+c_a+d_3+e_3+f_3)/5$ <Conversion $(X_3)$ of Constitutional Units $(C_5)$ Derived from Glycidyl Methacrylate to Constitutional Units $(B_6)$ Represented by Formula (1)>(Unit: %)

In an example in which there was obtained a polymer composed of constitutional units $(A_6)$ derived from ethylene, constitutional units $(B_6)$ represented by Formula (1), and constitutional units $(C_6)$ derived from glycidyl methacrylate by reacting an ethylene-glycidyl methacrylate copolymer with a long chain alkyl carboxylic acid, integral values within the ranges X, Y and Z given below were determined for a $^1$H-NMR spectrum of the polymer measured under the $^1$H-NMR measurement conditions shown above. Subsequently, the constitutional units $(B_6)$ derived from the long chain alkyl carboxylic acid (the total of the positional isomers $B_{6-1}$ and $B_{6-2}$ of the addition reaction) was calculated from the following formulas.

W: 3.10-3.30 ppm
X: 3.55-4.05 ppm
Y: 4.05-4.80 ppm
Z: 5.00-5.40 ppm

Constitutional units $(B_{6-1})=((X-2Z)+(Y-2W-2Z)/4)/2$
Constitutional units $(B_{6-2})=Z$
Constitutional units $(C_6)=W$ Conversion$(X_3)=100\times(B_{6-1}+B_{6-2})/(B_{6-1}+B_{6-2}+C_6)$ <Numbers of Constitutional Units $(A_6)$ Derived from Ethylene, Constitutional Units $(B_6)$ Represented by the Formula (1), and Constitutional Units $(C_6)$ Derived from Glycidyl Methacrylate Contained in a Polymer>(Unit: %)

The number of constitutional units $(A_6)$ derived from ethylene, the number of constitutional units $(B_6)$ represented by the Formula (1), and the number of constitutional units $(C_6)$ derived from glycidyl methacrylate contained in the polymer were calculated from the following formulae, respectively.

The number of constitutional units $(A_6)$ contained in a polymer=the number of constitutional units $(A_5)$ contained in an ethylene-glycidyl methacrylate copolymer The number of constitutional units $(B_6)$ contained in a polymer=(the number of constitutional units $(C_5)$ contained in an ethylene-glycidyl methacrylate copolymer)×conversion $(X_3)/100$ The number of constitutional units $(C_6)$ contained in a polymer=(the number of constitutional units $(C_5)$ contained in an ethylene-glycidyl methacrylate copolymer)–(the number of constitutional units $(B_6)$ contained in a polymer)

[II] Content of unreacted compound having an alkyl group having 14 to 30 carbon atoms (unit: % by Weight)

In "Production of polymer" in each Example, the product obtained is a mixture of the polymer and the unreacted compound having an alkyl group having 14 to 30 carbon atoms. The content of the unreacted compound having an alkyl group having 14 to 30 carbon atoms contained in the product was measured by the following method using gas chromatography (GC). The content of the unreacted compound is a value determined when the total weight of the resulting polymer and the unreacted compound is 100% by weight.

[GC measurement conditions]
GC device: Shimadzu GC2014
Column: DB-5MS (60 m, 0.25 mmphi, 1.0 μm)
Column temperature: A column held at 40° C. is heated to 300° C. at a rate of
10'C/min and then held at 300° C. for 40 minutes.
Vaporizing chamber/detector temperature: 300° C./300° C. (FID)
Carrier gas: helium
Pressure: 220 kPa
Full flow: 17.0 mL/min
Column flow rate: 1.99 mL/min
Purge flow rate: 3.0 mL/min
Line speed: 31.8 mm/sec
Injection system/split ratio: split injection/6:1
Injection amount: 1 μL
Sample preparation method: 8 mg/mL (o-dichlorobenzene solution)

(1) Production of calibration curve
[Solution preparation]

Into a 9-mL vial tube was weighed 5 mg of a standard, then 100 mg of n-tridecane was weighed thereinto as an internal standard substance, and then 6 mL of o-dichlorobenzene was added as a solvent to dissolve the sample completely, and thus a standard solution for production of a calibration curve was obtained. Two additional standard solutions were prepared in the same manner as above except that the amount of the standard was changed to 25 mm and 50 mm.

[GC Measurement]

A standard solution for producing a calibration curve was measured under the GC measurement conditions described above, and a calibration curve in which the GC area ratio of the standard and the internal standard substance was plotted on the ordinate and the weight ratio of the weight of the standard and the weight of the internal standard substance was plotted on the abscissa, and then the slope a of the calibration curve was determined.

(2) Measurement of content of an object to be measured (unreacted compound having an alkyl group having 14 to 30 carbon atoms) in a sample (product)

[Solution Preparation]

Into a 9-mL vial tube were weighed 50 nag of a sample and 100 mg of n-tridecane, and 6 mL of o-dichlorobenzene was added to completely dissolve the sample at 80° C., and thus a sample solution was obtained.

[GC Measurement]

The sample solution was measured under the GC measurement conditions specified above, and then the content Ps of the object to be measured in the sample was calculated according to the following formula.

$P_S$: Content of an object to be measured contained in a sample (% by weight)
$W_S$: Weight of the sample (mg)
$W_{IS}$: Weight of the internal standard substance (IS) (mg)
$A_S$: Peak area count number of the object to be measured
$A_{IS}$: Peak area count number of the internal standard substance (IS)
A: Slope of the calibration curve of the object to be measured $$P_S = \frac{W_{IS} \times A_S}{W_S \times A_{IS} \times a} \times 100$$

[III] Method of Evaluating Physical Properties of Polymer (1) Melting peak temperature ($T_m$, unit: ° C.), melting enthalpy ($\Delta H$, unit: J/g) observed within a temperature range of from 10° C. (inclusive) to 60° C. (exclusive)

An aluminum pan in which about 5 mg of a sample was enclosed was (1) held at 150° C. for 5 minutes, then (2) cooled from 150° C. to −50° C. at a rate of 5° C./minute, then (3) held at −50° C. for 5 minutes, and then (4) heated from −50° C. to about 150° C. at a rate of 5° C./minute, using a differential scanning calorimeter (DSC Q100 manufactured by TA Instruments) under nitrogen atmosphere. The differential scanning calorimetry curve produced by the calorimetric measurement in the step (4) was defined as a melt curve. The melt curve was analyzed by the method in accordance with JIS K7121-1987 and a melting peak temperature was determined. The melting enthalpy $\Delta H$ (J/g) was determined by analyzing the portion of the melt curve within the temperature range of from 10° C. (inclusive) to 60° C. (exclusive) by the method in accordance with JIS K7122-1987.

(2) Ratio A defined by formula (I) (unit: none)

The absolute molecular weight and the intrinsic viscosity of each of the polymer and the polyethylene standard substance 1475a (available from National Institute of Standards and Technology) were measured by gel permeation chromatography (GPC) using an apparatus equipped with a light scattering detector and a viscosity detector.

GPC device: HLC-8121 GPC/HT manufactured by TOSOH Corporation
Light scattering detector: Precision Detectors PD2040
Differential pressure viscosity detector: Viscotek H502
GPC column: GMHHR-H(S) HT three columns, produced by TOSOH Corporation
Sample solution concentration: 2 mg/mL
Injection amount: 0.3 L.
Measurement temperature: 155° C.
Dissolution conditions: 145° C., 2 hr
Mobile phase: orthodichlorobenzene (with addition of 0.5 mg/mL of BHT)
Flow rate during elution: 1 mL/minute
Measurement time: about 1 hour

[GPC Device]

As a GPC device equipped with a differential refractometer (RI), HLC-8121 GPC/HT manufactured by TOSOH Corporation was used. PD2040 manufactured by Precision Detectors was connected as a light scattering detector (LS) to the GPC device. The scattering angle used for light scattering detection was 90°. H502 manufactured by Viscotek was connected as a viscosity detector (VISC) to the GPC device. LS and VISC were installed in the column oven of the GPC device and were connected in order of LS, RI, and VISC. For the calibration of LS and VISC and the correction of the delay volume between the detectors, a polystyrene standard substance Polycal TDS-PS-N (weight average molecular weight Mw: 104,349, polydispersity: 1.04) produced by Malvern was used at a solution concentration of 1 mg/mL. As the mobile phase and the solvent, orthodichlorobenzene to which dibutylhydroxytoluene had been added as stabilizer at a concentration of 0.5 mg/mL was used. The conditions for dissolving the sample were 145° C. and 2 hours. The flow rate was adjusted to 1 mL/minute. Three columns, GMHHR-H(S) HT manufactured by TOSOH Corporation, connected in series were used. The temperatures of the column, the sample injection part, and the detectors were adjusted to 155° C. The sample solution concentration was adjusted to 2 mg/mL. The injection amount (sample loop volume) of the sample solution was adjusted to 0.3 mL. The refractive index increment (dn/dc) of NIST1475a and the sample in orthodichlorobenzene was adjusted to −0.078 mL/g. The dn/dc of the polystyrene standard substance was adjusted to 0.079 mL/g. In determining an absolute molecular weight and an intrinsic viscosity ([η]) from the data of the respective detectors, calculation was carried out using data-processing software OmniSEC (version 4.7) available from Malvern with reference to the document "Size Exclusion Chromatography, Springer (1999)." The refractive index increment is a rate of change of the refractive index relative to the concentration change.

$\alpha_1$ and $a_0$ in Formula (I) were calculated by the method described below, and both of them were substituted into Formula (I) to calculate A.

$$A = \alpha_1 / \alpha_0 \qquad (I)$$

$\alpha_1$ is a value obtained by a method comprising plotting the measured data with logarithms of molecular weights of the polymer as abscissa versus logarithms of intrinsic viscosities of the polymer as ordinate, approximating in the least squares sense logarithms of absolute molecular weights and logarithms of intrinsic viscosities within the range of from the logarithm of the weight-average molecular weight of the polymer to the logarithm of the z-average molecular weight of the polymer on the abscissa, and representing the slope of the straight line showing Formula (I-I) by $\alpha_1$, $$\log [\eta_1] = \alpha_1 \log M_1 + \log K_1 \qquad (I-I)$$

in Formula (I-I), $[\eta_1]$ represents the intrinsic viscosity (unit: dl/g) of the polymer, $M_1$ represents the absolute molecular weight of the polymer, and $K_1$ is a constant. A value obtained by a method comprising plotting the measured data with logarithm of logarithms of absolute molecular weights of the polyethylene standard substance 1475 as abscissa versus logarithms of intrinsic viscosities of the polyethylene standard substance 1475 as ordinate, approximating in the least squares sense logarithms of absolute molecular weights and logarithms of intrinsic viscosities within the range of from the logarithm of the weight-average molecular weight of the polyethylene standard substance 1475 to the logarithm of the z-average molecular weight of the polyethylene standard substance 1475 on the abscissa, and representing the slope of the straight line showing Formula (I-II) by $\alpha_0$, $$\log [\eta_0] = \alpha_0 \log M_0 + \log K_0 \quad (I\text{-}II)$$

In Formula (I-II), $[\eta_0]$ represents the intrinsic viscosity (unit Wg) of the polyethylene standard substance 1475a, $M_0$ represents the absolute molecular weight of the polyethylene standard substance 1475a, and $K_0$ is a constant.

(3) Activation energy of flow ($E_a$, unit: kJ/mol)

The activation energy of flow Ea was determined by the method described below. Using a strain controlling type rotary viscometer (rheometer), a melt complex viscosity-angular frequency curve of the polymer was measured under the following conditions (a) to (d). The above-mentioned melt complex viscosity-angular frequency curve is a log-log curve in which the melt complex viscosity (unit: Pa·sec) is plotted on the ordinate and the angular frequency (unit: rad/sec) is plotted on the abscissa.

Measurement was carried out under nitrogen.

Condition (a) Geometry: parallel plate; diameter: 25 mm, plate distance: 1.5 to 2 mm
Condition (b) Strain: 5%
Condition (c) Shear rate: 0.1 to 100 rad/sec
Condition (d) Temperature: 170, 150, 130, 110, 90° C.

Then, for each of the melt complex viscosity-angular frequency curves measured at the individual temperatures other than 170° C., the angular frequency was multiplied by aT and the melt complex viscosity was multiplied by 1/$a_T$ such that the curve superposed the melt complex viscosity-angular frequency curve at 170° C. $a_T$ was determined such that the melt complex viscosity-angular frequency curves at the individual temperatures other than 170° C. superposed the melt complex viscosity-angular frequency curve at 170° C.

Then, at each temperature (T), $[\ln(a_T)]$ and $[1/(T+273.16)]$ were determined and $[\ln(a_T)]$ and $[1/(T+273.16)]$ were approximated in the least squares sense by the following Formula (II), and then the slope m of the straight line showing Formula (II) was determined. The m was substituted into the following Formula (III) and Ea was calculated.

$$\ln(a_T) = m(1/(T+273.16)) + n \quad (II)$$

$$E_a = |10.008314 \times m| \quad (III)$$

$a_T$: shift factor
$E_a$: activation energy of flow (unit: kJ/mol)
T: temperature (unit: OC)

Using Ochestrator produced by TA Instruments as calculation software, there was adopted an $E_a$ value in the case that the correlation factor r2 in approximating $[\ln(a_T)]$ and $[1/T+273.16)]$ in the least squares sense by Formula (II) is 0.9 or more.

(4) Extensional viscosity nonlinear index (k, unit: none)

The extensional viscosity nonlinear index k was determined by the method described below.

There were measured a viscosity $\eta_\varepsilon 1(t)$ of a polymer at an extension time t when the polymer was uniaxially stretched at a temperature of 110° C. at a strain rate of 1 sec$^{-1}$ under a nitrogen atmosphere using a viscoelasticity measuring apparatus (ARES manufactured by TA instruments), and a viscosity $\eta_E 0.1(t)$ of the polymer at an extension time t when the polymer was uniaxially stretched at a temperature of 110° C. at a strain rate of 0.1 sec$^{-1}$. The $\eta_E 1$ (t) and the $\eta_E 0.1$ (t) measured at an arbitrary same extension time t were substituted into the following formula to calculate $\alpha(t)$.

$$\alpha(t) = \eta_E 1 (t)/\eta_E 0.1(t)$$

The logarithm of $\alpha(t)$ ($\ln(\alpha(t))$) was plotted versus the extension time t, and $\ln(\alpha(t))$ an t were approximated in the least squares sense using the following formula within a range of t of from 2.0 sec to 2.5 sec. The slope of the straight line showing the following formula is k.

$$\ln(\alpha(t)) = kt$$

There was adopted k in the case where the correlation function r2 used for performing approximation in the least squares sense using the above formula was 0.9 or more.

(5) Molding processability

Each of the specimens (20 mm in length, 20 mm in width, 1 mm in thickness) prepared by compression molding under the conditions described in Examples and Comparative Examples was subjected to D hardness measurement using a Durometer Hardness tester (DIGITAL HARDNESS TESTER MODEL RH-305A, manufactured by EXCEL) in accordance with JIS K7215, and it was checked whether the specimen cracked during the measurement.

In addition, a specimen (20 mm in length, 20 mm in width, 1 mm in thickness) was put on a glass plate (MICRO SLIDE GLASS produced by Matsunami Glass Ind., Ltd.; 91 mm in length, 26 mm in width, 0.9 to 1.2 mm in thickness) at the plane center thereof and was left standing in a gear oven at 40° C. for 30 minutes. Then, the glass plate was taken out of the gear oven and was left standing at 23° C. for 30 minutes. Then, the glass plate was made to stand with its longitudinal axis stood vertically, and at that time it was examined whether the specimen fell down without adhering to the glass plate.

A specimen which did not fracture and failed to adhere to the glass plate was judged to be very good in molding processability and this was expressed by the symbol o. A specimen which did not fracture but adhered to the glass plate was judged to be good in molding processability and this was expressed by the symbol Δ. A specimen which fractured was judged to be poor in molding processability and this was expressed by the symbol ×. The specimens which fractured were judged to be poor in molding processability and were not subjected to the adhesion evaluation.

(6) Shape retention

As the shape retention after a polymer phase-transferred from crystals to amorphous, shape retention at 90° C., which is higher than the melting peak temperature of the polymer, was evaluated. Each of the specimens prepared by compression molding under the conditions described in Examples and Comparative Examples (20 mm in length, 20 mm in width, 1 mm in thickness) was put on the plane center of a glass plate (MICRO SLIDE GLASS produced by Matsunami Glass Ind., Ltd.; 91 mm in length, 26 mm in width, 0.9 to 1.2 mm in thickness) and was left standing in a gear oven at 90° C. for 30 minutes, and then change in shape of the specimen was evaluated. A specimen with which no change in shape, such as crack, shrinkage, or settling, was observed is judged as being good in shape retention and this is expressed by the symbol o. A specimen with which change in shape was observed is judged as being poor in shape retention, and this is expressed by the symbol ×.

(7) Water vapor transmission rate per a thickness of 1 mm (unit: gmm/m$^2$/24 hours)

Using the specimens produced by compression molding under the conditions described in Examples and Comparative Examples (0.5 mm in thickness for Examples 1, 2, 4 and Comparative Examples 3, 4; 1.0 mm in thickness for Examples 5, 6, 7, 9, 10, 11, 12, 13), measurement was performed at 23° C. and 90 (NRH according to JIS K7129B using a water vapor transmission analyzer (PERMA- TRAN-W 3/33, manufactured by MOCON). The measured water vapor transmission rate (g/m²/24 hours) was converted into a water vapor transmission rate per a thickness of 1 mm, and thus a water vapor transmission rate per a thickness of 1 mm (gmm/m²/24 hours) was calculated.

[IV] Method for Evaluating Physical Properties of Crosslinked Polymer (1) Gel fraction (unit: % by weight)

About 500 mg of each of the crosslinked polymers prepared under the conditions described in Examples and Comparative Examples as a measurement sample, and an empty net basket made of wire net (opening: 400 meshes) were weighed, respectively. A net basket containing the crosslinked polymer and 50 mL of xylene (produced by Kanto Chemical Co., Inc., Cica Special Grade; a mixture of o-, m-, and p-xylene and ethylbenzene; the total content of o-, m-, and p-xylene was 85% by weight more) were introduced into a 100-mL test tube, followed by heated extraction at 110° C. for 6 hours. After the extraction, the net basket containing extraction residue was picked out of the test tube, followed by drying under reduced pressure at 80° C. for 8 hours in a vacuum dryer, and then the net basket containing the extraction residue after drying was weighed. The gel weight was calculated from the weight difference of the net basket containing extraction residue after drying and the empty net basket. The gel fraction (% by weight) was calculated based on the following formula.

Gel fraction=(weight of gel/weight of measured sample)×100

[V] Method of Evaluating Physical Properties of Foamed Article (1) Gel fraction (unit: % by weight)

About 500 mg of each of the foamed articles prepared under the conditions described in Examples and Comparative Examples as a measurement sample, and an empty net basket made of wire net (opening: 400 meshes) were weighed, respectively. A net basket containing a foamed article and 50 mL of xylene (produced by Kanto Chemical Co., Inc., Cica Special Grade; a mixture of o-, m-, and p-xylene and ethylbenzene; the total content of o-, m-, and p-xylene was 85% by weight more) were introduced into a 100-mL test tube, followed by heated extraction at 110° C. for 6 hours. After the extraction, the net basket containing extraction residue was dried under reduced pressure at 80° C. for 8 hours in a vacuum dryer, and then the net basket containing the extraction residue after drying was weighed. The gel weight was calculated from the weight difference of the net basket containing extraction residue after drying and the empty net basket. The gel fraction (% by weight) was calculated based on the following formula.

Gel fraction=(weight of gel/weight of measured sample)×100

(2) Foamability

For the foamed articles prepared under the conditions described in Examples and Comparative Examples, one having an expansion ratio of 2 or more is expressed by o, and one having an expansion ratio of less than 2 or the case that no foamed article was obtained is expressed by x.

[VI] Method for Evaluating Physical Properties of a Crosslinked Resin Composition (1) Melting peak temperature ($T_m$, unit: ° C.), melting enthalpy ($\Delta H$, unit: J/g) of from 10° C. (inclusive) to 60° C. (exclusive)

An aluminum pan in which about 5 mg of a sample was enclosed was (1) held at 200° C. for 5 minutes, then (2) cooled from 200° C. to −50° C. at a rate of 5° C./minute, then (3) held at −50° C. for 5 minutes, and then (4) heated from −50° C. to about 200° C. at a rate of 5° C./minute, using a differential scanning calorimeter (DSC Q100 manufactured by TA Instruments) under nitrogen atmosphere. The differential scanning calorimetry curve produced by the calorimetric measurement in the step (4) was defined as the melt curve. The melt curve was analyzed by the method in accordance with JIS K7121-1987 and a melting peak temperature was determined.

The melting enthalpy $\Delta H$ (J/g) was determined by analyzing the portion of the melt curve within the temperature range of from 10° C. (inclusive) to 60° C. (exclusive) by the method in accordance with JIS K7122-1987.

(2) Permanent compression set (unit: %)

Measurement was conducted in accordance with JIS K6262 under conditions including a test temperature of 70° C., a compression ratio of 25%, and a test time of 22 hours.

[VII] Raw materials

<Copolymer having Constitutional Units (A) and Constitutional Units (C)>

A-1: Ethylene-methyl acrylate copolymer Acryft CG4002 (produced by
  Sumitomo Chemical Co., Ltd.), the number of constitutional units derived from ethylene: 88.9% (72.4% by weight), the number of constitutional units derived from methyl acrylate: 11.1% (27.6% by weight), MFR (measured at 190° C. and 21 N): 6.0 g/10 minutes A-1': Ethylene-methyl acrylate copolymer The ethylene-methyl acrylate copolymer A-1' was produced as follows.

In an autoclave type reactor, ethylene and methyl acrylate were copolymerized using tert-butyl peroxypivalate as a radical polymerization initiator, at a reaction temperature of 195° C. and a reaction pressure of 160 MPa, and thus an ethylene-methyl acrylate copolymer A-1' was obtained. The composition and the MFR of the resulting copolymer A-1' were as follows. The number of constitutional units derived from ethylene: 87.1% (68.8% by weight), the number of constitutional units derived from methyl acrylate: 12.9% (31.2% by weight), MFR. (measured at 190° C. and 21 N): 40.5 g/10 minutes A-1": Ethylene-methyl methacrylate copolymer The ethylene-methyl methacrylate copolymer A-1" was produced as follows.

In an autoclave type reactor, ethylene and methyl methacrylate were copolymerized using tert-butyl peroxypivalate as a radical polymerization initiator, at a reaction temperature of 202° C. and a reaction pressure of 199 MPa, and thus an ethylene-methyl methacrylate copolymer A-1" was obtained. The composition and the MFR of the resulting copolymer A-1" were as follows. The number of constitutional units derived from ethylene: 88.8% (69.0% by weight), the number of constitutional units derived from methyl methacrylate: 11.2 (31.0% by weight), MFR (measured at 190° C. and 21 N): 40.0 g/10 minutes A-2: Ethylene-ethyl acrylate copolymer NUC-6570 (produced by NUC), the number of constitutional units derived from ethylene: 92.2% (76.8% by weight), the number of constitutional units derived from ethyl acrylate: 7.8% (23.2% by weight), MFR (measured at 190° C. and 21 N): 20 g/10 minutes A-3: Ethylene-glycidyl methacrylate copolymer Bondfast 20C (produced by Sumitomo Chemical Co., Ltd.), the number of constitutional units derived from ethylene: 95.3% (80.0% by weight), the number of constitutional units derived from glycidyl methacrylate: 4.7% (20.0% by weight), MFR (measured at 190° C. and 21 N): 13 g/10 minutes <Compound having an Alkyl Group having 14 to 30 Carbon Atoms>

B-1: KALCOL 220-80 (a mixture of n-docosyl alcohol, n-eicosyl alcohol, and n-octadecyl alcohol) (produced by Kao Corporation)

B-2: n-Eicosyl alcohol (produced by Tokyo Chemical Industry Co., Ltd.)

B-3: KALCOL 8098 (n-octadecyl alcohol) (produced by Kao Corporation)

B-3': n-Octadecyl alcohol (produced by Tokyo Chemical Industry Co., Ltd.)

B-4: KALCOL 6098 (n-hexadecyl alcohol) (produced by Kao Corporation)

B-5: KAT,COL 4098 (n-tetradecyl alcohol) (produced by Kao Corporation)

B-6: n-Octadecanoic acid (produced by Tokyo Chemical Industry Co., Ltd.)

<Catalyst>

C-1: Tetra(n-butyl) orthotitanate (produced by Tokyo Chemical Industry Co., Ltd.)

C-2: Tetra(n-octadecyl) orthotitanate (produced by Tokyo Chemical Industry Co., Ltd.)

<Olefin Polymer>

D-1: SUMITOMO NOBLEN D101 (propylene homopolymer, melting point: 163° C.) (produced by Sumitomo Chemical Co., Ltd.)

D-2: SUMITOMO NOBLEN 5131 (propylene random copolymer, melting point: 132° C.) (produced by Sumitomo Chemical Co., Ltd.)

D-3: HI-ZEX 3300F (high-density polyethylene, melting point: 132° C.) (produced by Prime Polymer Co., Ltd.)

<Organic Peroxide>

E-1: PERCUMYL D (dicumyl peroxide) (one-minute half-life temperature: 175° C.) (produced by NOF Corporation)

E-2: PERHEXYL I (tert-hexylperoxyisopropyl monocarbonate) (one-minute half-life temperature: 155° C.) (produced by NOF Corporation)

E-3: Kayahexa AD-40C (mixture comprising 2,5-dimethyl-2,5-di(tert-butylperoxy)hexane, calcium carbonate, and amorphous silicon dioxide) (one-minute half-life temperature: 180° C.) (produced by Kayaku Akzo Corporation)

<Crosslinking Aid>

F-1: Hi-Cross MS50 (mixture of trimethylolpropane trimethacrylate and amorphous silicon dioxide) (produced by Seiko Chemical Co., Ltd.)

<Foaming Agent>

G-1: CELLMIC CAP (mixture comprising azodicarbonamide and dinitrosopentamethylenetetramine) (decomposition temperature: 125 to 130° C.) (produced by Sankyo Kasei Co., Ltd.)

<Additives>

H-1: Zinc stearate (produced by Nitto Kasei Kogyo K. K.)

H-2: Zinc oxide (produced by Honjo Chemical Corporation)

<Antioxidant>

I-1: IRGANOX 1010 (pentaerythritol-tetrakis[3-(3',5'-di-tert-butyl-4'-hydroxyphenyl) propionate]) (produced by BASF A.G.)

<Processing Heat Stabilizer>

J-1: IRGAFOS 168 (tris(2,4-di-tert-butylphenyl)phosphite) (produced by BASF A.G.)

Example 1

(1) Production of polymer composed of constitutional units (A), constitutional units (B), and constitutional units (C) (ethylene-n-eicosyl acrylate-methyl acrylate copolymer)

In a 3-L separable flask, 150 g (40.5 parts by weight) of copolymer A-1, 170 g (46.0 parts by weight) of compound B-2, and 50 mL (13.5 parts by weight) of catalyst C-1 were dissolved in 880 mL of heptane and were stirred under a nitrogen atmosphere at 100° C. for 3 hours, and then the mixture was reprecipitated in 5 L of ethanol, affording a polymer (ex1, ethylene-n-eicosyl acrylate-methyl acrylate copolymer). Moreover, the polymer (ex1) was compression molded at 100° C. for 10 minutes to prepare specimens being 1 mm and 0.5 mm in thickness, respectively, which were then evaluated. The physical property values and the evaluation results of the polymer (ex1) are shown in Table 1.

(2) Preparation of resin composition comprising polymer (ex1) and organic peroxide Using a micro compounder (Xplore, manufactured by DSM), 100 parts by weight of the polymer (ex1) obtained in Example 1 (1) and 2.0 parts by weight of an organic peroxide E-1 were kneaded under conditions including a kneading temperature of 80° C., a kneading time of 5 minutes, and a screw rotation speed of 100 rpm, and thus a resin composition comprising the polymer (ex1) and the organic peroxide was prepared.

(3) Preparation of crosslinked polymer

The resin composition obtained in Example 1 (2) was filled into a mold having a cavity size of 50 mm in length, 50 mm in width, and 0.3 mm in thickness and then was subjected to heating and compression under conditions including a temperature of 165° C., a time of 30 minutes, and a pressure of 10 MPa, and thus a crosslinked polymer (ex1-1) was obtained. The gel fraction of the crosslinked polymer (ex1-1) is shown in Table 1.

(4) Preparation of resin composition comprising polymer, organic peroxide, and foaming agent Using a micro compounder (Xplore, manufactured by DSM), 100 parts by weight of the polymer (ex1) obtained in Example 1 (1), 2.0 parts by weight of an organic peroxide E-1, 8.2 parts by weight of a foaming agent, 2.0 parts by weight of an additive X-1, and 1.0 part by weight of an additive H-2 were kneaded under conditions including a kneading temperature of 80° C., a kneading time of 5 minutes, and a screw rotation speed of 100 rpm, and thus a resin composition comprising the polymer (ex1), the organic peroxide and the foaming agent was prepared.

(5) Preparation of foamed article

The resin composition obtained in Example 1 (4) was filled into a mold having dimensions of 45 mm×45 mm×5 mm and then was subjected to heating and compression under conditions including a temperature of 140° C., a time of 30 minutes. Then, the mold was released at a temperature of 140° C., affording a foamed article. The gel fraction and the foamability of the foamed article are shown in Table 1.

Example 2

(1) Production of polymer composed of constitutional units (A), constitutional units (B), and constitutional units (C) (ethylene-n-eicosyl acrylate-methyl acrylate copolymer)

In 500 mL of xylene were dissolved 60 g (26.0 parts by weight) of A-1, 151 g (65.3 parts by weight) of B-2, and 20 mL (8.7 parts by weight) of C-1, which were then stirred under a nitrogen atmosphere in a 3-L separable flask at 150°

C. for 3 hours, and then the mixture was reprecipitated in 3 L of ethanol, affording a polymer (ex2, ethylene-n-eicosyl acrylate-methyl acrylate copolymer). Moreover, the polymer (ex2) was compression molded at 100° C. for 10 minutes to prepare specimens being 1 mm and 0.5 mm in thickness, respectively, which were then evaluated. The physical property values and the evaluation results of the polymer (ex2) are shown in Table 1.

Example 3

(1) Production of polymer composed of constitutional units (A), constitutional units (B), and constitutional units (C) (ethylene-n-hexadecyl acrylate-ethyl acrylate copolymer)

45.4 g (56.8 parts by weight) of A-2, 30.7 g (38.4 parts by weight) of B-3', and 3.9 g (4.9 parts by weight) of C-1 were kneaded with a Labo Plastomill (Model 65C150, manufactured by Toyo Seiki Seisaku-sho, Ltd.) under a nitrogen atmosphere, at a rotation speed of 60 rpm, at a chamber temperature of 150° C., for 20 minutes. The resulting mixture was dissolved in 100 mL of xylene at 100° C. and then was reprecipitated in 500 mL of ethanol, affording a polymer (ex3, ethylene-n-hexadecyl acrylate-ethyl acrylate copolymer). Moreover, the polymer (ex3) was compression molded at 100° C. for 10 minutes to prepare a specimen being 1 mm in thickness, which was then evaluated. The physical property values and the evaluation results of the polymer (ex3) are shown in Table 1.

Example 4

(1) Production of polymer composed of constitutional units (A) and constitutional units (B) (reaction product of ethylene-glycidyl methacrylate copolymer/n-octadecanoic acid)

50.7 g (72.5 parts by weight) of A-3 and 19.3 g (27.5 parts by weight) of B-6 were kneaded with a Labo Plastomill (Model 65C150, manufactured by Toyo Seiki Seisaku-sho, Ltd.) under a nitrogen atmosphere, at a rotation speed of 80 rpm, at a chamber temperature of 200° C., for 10 minutes. The resulting mixture was dissolved in 100 mL of xylene at 100° C. and then was reprecipitated in 500 mL of ethanol, affording a polymer (ex4) (reaction product of ethylene-glycidyl methacrylate copolymer/n-hexadecanoic acid). Moreover, the polymer (ex4) was compression molded at 210° C. for 10 minutes to prepare specimens being 1 mm and 0.5 mm in thickness, respectively, which were then evaluated. The physical property values and the evaluation results of the polymer (ex4) are shown in Table 1.

(2) Preparation of resin composition comprising polymer and organic peroxide

Using a micro compounder (Xplore, manufactured by DSM), 100 parts by weight of the polymer (ex4) obtained in Example 4 (1) and 2.0 parts by weight of an organic peroxide E-1 were kneaded under conditions including a kneading temperature of 80° C., a kneading time of 5 minutes, and a screw rotation speed of 100 rpm, and thus a resin composition comprising the polymer (ex4) and the organic peroxide was prepared.

(3) Preparation of crosslinked polymer

The resin composition obtained in Example 4 (2) was filled into a mold having a cavity size of 50 mm in length, 50 mm in width, and 0.3 mm in thickness and then was subjected to heating and compression under conditions including a temperature of 165° C., a time of 30 minutes, and a pressure of 10 MPa, and thus a crosslinked polymer (ex4-1) was obtained.

The gel fraction of the crosslinked polymer (ex4-1) is shown in Table 1.

(4) Preparation of resin composition comprising polymer, organic peroxide, and foaming agent Using a micro compounder (Xplore, manufactured by DSM), 100 parts by weight of the polymer (ex4) obtained in Example 4 (1), 2.0 parts by weight of E-2, 8.2 parts by weight of G-1, 2.0 parts by weight of H-1, and 1.0 part by weight of H-2 were kneaded under conditions including a kneading temperature of 80° C., a kneading time of 5 minutes, and a screw rotation speed of 100 rpm, and thus a resin composition comprising the polymer (ex4), the organic peroxide and the foaming agent was prepared.

(5) Preparation of foamed article

The resin composition obtained in Example 4 (4) was filled into a mold having a cavity size of 45 mm in length, 45 mm in width, and 5 mm in thickness and then was subjected to heating and compression under conditions including a temperature of 140° C., a time of 30 minutes, and a pressure of 20 MPa. Then, the mold was released at a temperature of 140° C., affording a foamed article. The gel fraction and the foamability of the foamed article are shown in Table 1.

Example 5

(1) Production of polymer composed of constitutional units (A), constitutional units (B), and constitutional units (C) (ethylene-n-docosyl acrylate-n-eicosyl acrylate-n-octadecyl acrylate-methyl acrylate copolymer)

Using a continuous twin screw extruder, 43.7 parts by weight of A-1, 41.4 parts by weight of B-1, and 14.9 parts by weight of C-2 were kneaded under a pressure reduction of 10 kPa, at a rotation speed of 150 rpm and a temperature of 180° C., for a kneading time of 7 minutes, affording a polymer (ex5, ethylene-n-docosyl acrylate-n-eicosyl acrylate-n-octadecyl acrylate-methyl acrylate copolymer). Moreover, the polymer (ex5) was compression molded at 150° C. for 10 minutes to prepare a specimen being 1 mm in thickness, which was then evaluated. The physical property values and the evaluation results of the polymer (ex5) are shown in Table 1.

(2) Preparation of resin composition comprising polymer and organic peroxide

Using a micro compounder (Xplore, manufactured by DSM), 100 parts by weight of the polymer (ex5) obtained in Example 5 (i) and 2.0 parts by weight of E-1 were kneaded under conditions including a kneading temperature of 80° C., a kneading time of 5 minutes, and a screw rotation speed of 100 rpm, and thus a resin composition comprising the polymer (ex5) and the organic peroxide was prepared.

(3) Preparation of crosslinked polymer

The resin composition obtained in Example 5 (2) was filled into a mold having a cavity size of 50 mm in length, 50 mm in width, and 0.3 mm in thickness and then was subjected to heating and compression under conditions including a temperature of 165° C., a time of 30 minutes, and a pressure of 10 MPa, and thus a crosslinked polymer (ex5-1) was obtained. The gel fraction of the crosslinked polymer (ex5-1) is shown in Table 1.

(4) Preparation of resin composition comprising polymer, organic peroxide, and foaming agent Using a micro compounder (Xplore, manufactured by DSM), 100 parts by weight of the polymer (ex5) obtained in Example 5 (1), 2.0 parts by weight of E-2, 8.2 parts by weight of G-1, 2.0 parts by weight of H-1, and 1.0 part by weight of H-2 were kneaded under conditions including a kneading temperature of 80° C., a kneading time of 5 minutes, and a screw rotation speed of 100 rpm, and thus a resin composition comprising the polymer (ex5), the organic peroxide and the foaming agent was prepared.

(5) Preparation of foamed article

The resin composition obtained in Example 5 (4) was filled into a mold having a cavity size of 45 mm in length, 45 mm in width, and 5 mm in thickness and then was subjected to heating and compression under conditions including a temperature of 140° C., a time of 30 minutes, and a pressure of 20 MPa. Then, the mold was released at a temperature of 140° C., affording a foamed article. The gel fraction and the foamability of the foamed article are shown in Table 1.

Example 6

(1) Production of polymer composed of constitutional units (A), constitutional units (B), and constitutional units (C) (ethylene-n-docosyl methacrylate-n-eicosyl methacrylate-n-octadecyl methacrylate-methyl methacrylate copolymer)

The atmosphere in a separable flask having a capacity of 0.3 L and equipped with a stirrer, a cooling tube, a Dean-Stark tube, and a finger baffle was replaced by nitrogen, and then 40.00 g of A-1", 32.95 g of B-1, 0.70 g of C-2, and 58 mL of heptane were added, and then heated to reflux for 33 while setting an oil bath temperature at 150° C. Then, the oil bath temperature was set at 120° C. and the solvent was distilled off under a pressure reduction of 1 kPa for 3 hours, and thus, a polymer ((ex6, ethylene-n-docosyl methacrylate-n-eicosyl methacrylate-n-octadecyl methacrylate-methyl methacrylate copolymer) was obtained. Moreover, the polymer (ex6) was compression molded at 150° C. for 10 minutes to prepare a specimen being 1 mm in thickness, which was then evaluated. The physical property values and the evaluation results of the polymer (ex6) are shown in Table 1.

(2) Preparation of resin composition comprising polymer and organic peroxide

Using a micro compounder (Xplore, manufactured by DSM), 100 parts by weight of the polymer obtained in Example 6 (1) and 2.0 parts by weight of E-1 were kneaded under conditions including a kneading temperature of 80° C., a kneading time of 5 minutes, and a screw rotation speed of 100 rpm, and thus a resin composition comprising the polymer (ex6) and the organic peroxide was prepared.

(3) Preparation of crosslinked polymer

The resin composition obtained in Example 6 (2) was filled into a mold having a cavity size of 50 mm in length, 50 mm in width, and 0.3 mm in thickness and then was subjected to heating and compression under conditions including a temperature of 165° C., a time of 30 minutes, and a pressure of 10 MPa, and thus a crosslinked polymer (ex6-1) was obtained.

The gel fraction of the crosslinked polymer (ex6-1) is shown in Table 1.

(4) Preparation of resin composition comprising polymer, organic peroxide, and foaming agent Using a micro compounder (Xplore, manufactured by DSM), 100 parts by weight of the polymer (ex6) obtained in Example 6 (1), 2.0 parts by weight of E-2, 8.2 parts by weight of G-1, 2.0 parts by weight of H-1, and 1.0 part by weight of H-2 were kneaded under conditions including a kneading temperature of 80° C., a kneading time of 5 minutes, and a screw rotation speed of 100 rpm, and thus a resin composition comprising the polymer (ex6), the organic peroxide and the foaming agent was prepared.

(5) Preparation of foamed article

The resin composition obtained in Example 6 (4) was filled into a mold having a cavity size of 45 mm in length, 45 mm in width, and 5 mm in thickness and then was subjected to heating and compression under conditions including a temperature of 140° C., a time of 30 minutes, and a pressure of 20 MPa. Then, the mold was released at a temperature of 140° C., affording a foamed article. The gel fraction and the foamability of the foamed article are shown in Table 1.

Example 7

(1) Production of polymer composed of constitutional units (A), constitutional units (B), and constitutional units (C) (ethylene-n-docosyl acrylate-n-eicosyl acrylate-n-octadecyl acrylate-methyl acrylate copolymer)

The atmosphere in a separable flask having a capacity of 0.3 L and equipped with a stirrer, a cooling tube, a Dean-Stark tube, and a finger baffle was replaced by nitrogen, and then 40.00 g of A-1, 37.95 g of B-1, 0.72 g of C-2, and 58 mL of heptane were added, and then heated to reflux for 9 while setting an oil bath temperature at 170° C. Then, the oil bath temperature was set at 120° C. and the solvent was distilled off under a pressure reduction of 1 kPa for 3 hours, and thus, a polymer (ex7) (ethylene-n-docosyl acrylate-n-eicosyl acrylate-n-octadecyl acrylate-methyl acrylate copolymer) was obtained. Moreover, the polymer (ex7) was compression molded at 150° C. for 10 minutes to prepare a specimen being 1 mm in thickness, which was then evaluated. The physical property values and the evaluation results of the polymer (ex7) are shown in Table 1.

Example 8

(1) Production of polymer composed of constitutional units (A), constitutional units (B), and constitutional units (C) (ethylene-n-octadecyl acrylate-methyl acrylates copolymer)

The atmosphere in a separable flask having a capacity of 0.3 L and equipped with a stirrer, a cooling tube, a Dean-Stark tube, and a finger baffle was replaced by nitrogen, and then 60.00 g of A-1, 41.32 g of B-3, 1.07 g of C-2, and 263 mL of heptane were added, and then heated to reflux for 12 while setting an oil bath temperature at 170° C. Then, the oil bath temperature was set at 120° C. and the solvent was distilled off under a pressure reduction of 1 kPa for 3 hours, and thus, a polymer (ex8) (ethylene-n-octadecyl acrylate-methyl acrylate copolymer) was obtained. Moreover, the polymer (ex8) was compression molded at 150° C. for 10 minutes to prepare a specimen being 1 mm in thickness, which was then evaluated. The physical property values and the evaluation results of the polymer (ex8) are shown in Table 1.

Example 9

(1) Production of polymer composed of constitutional units (A), constitutional units (B), and constitutional units (C) (ethylene-n-hexadecyl acrylate-methyl acrylate copolymer)

The atmosphere in a separable flask having a capacity of 0.3 L and equipped with a stirrer, a cooling tube, a Dean-Stark tube, and a finger baffle was replaced by nitrogen, and then 40.00 g of A-1, 28.71 g of B-4, 0.72 g of C-2, and 58 mL of heptane were added, and then heated to reflux for 12 while setting an oil bath temperature at 170° C. Then, the oil bath temperature was set at 120° C. and the solvent was distilled off under a pressure reduction of 1 kPa for 3 hours, and thus, a polymer (ex9) (ethylene-n-hexaclecyl acrylate-methyl acrylate copolymer) was obtained. Moreover, the polymer (ex9) was compression molded at 150° C. for 10 minutes to prepare a specimen being 1 mm in thickness, which was then evaluated. The physical property values and the evaluation results of the polymer (ex9) are shown in Table 2.

Example 10

(1) Production of polymer composed of constitutional units (A), constitutional units (B), and constitutional units (C) (ethylene-n-tetradecyl acrylate-methyl acrylates copolymer)

The atmosphere in a separable flask having a capacity of 0.3 L and equipped with a stirrer, a cooling tube, a Dean-Stark tube, and a finger baffle was replaced by nitrogen, and then 40.00 g of A-1, 25.36 g of B-5, 0.72 g of C-2, and 58 mL of heptane were added, and then heated to reflux for 12 while setting an oil bath temperature at 170° C. Then, the oil bath temperature was set at 120° C. and the solvent was distilled off under a pressure reduction of 1 kPa for 3 hours, and thus, a polymer (ex10) (ethylene-n-tetradecyl acrylate-methyl acrylate copolymer) was obtained. Moreover, the polymer (ex10) was compression molded at 150° C. for 10 minutes to prepare a specimen being 1 mm in thickness, which was then evaluated. The physical property values and the evaluation results of the polymer (ex10) are shown in Table 2.

Example 11

(1) Production of polymer composed of constitutional units (A), constitutional units (B), and constitutional units (C) (ethylene-n-docosyl acrylate-n-eicosyl acrylate-n-octadecyl acrylate-methyl acrylate copolymer)

The atmosphere in a separable flask having a capacity of 0.3 L and equipped with a stirrer and a finger baffle was replaced by nitrogen, and then 80.00 g of A-1', 77.79 g of B-1, and 1.65 g of C-2 were added, and then heated and stirred under a pressure reduction of 1 kPa for 12 while setting an oil bath temperature at 130° C., and thus a polymer (exit) (ethylene-n-docosyl acrylate-n-eicosyl acrylate-n-octadecyl acrylate-methyl acrylate copolymer) was obtained. Moreover, the polymer (exit) was compression molded at 150° C. for 10 minutes to prepare a specimen being 1 mm in thickness, which was then evaluated. The physical property values and the evaluation results of the polymer (ex11) are shown in Table 2.

(2) Preparation of resin composition comprising polymer and organic peroxide

Using a micro compounder (Xplore, manufactured by DSM), 100 parts by weight of the polymer (ex11) obtained in Example 11 (1) and 2.0 parts by weight of E-1 were kneaded under conditions including a kneading temperature of 80° C., a kneading time of 11 minutes, and a screw rotation speed of 100 rpm, and thus a resin composition comprising the polymer (ex11) and the organic peroxide was prepared.

(3) Preparation of crosslinked polymer

The resin composition obtained in Example 11 (2) was filled into a mold having a cavity size of 50 mm in length, 50 mm in width, and 0.3 mm in thickness and then was subjected to heating and compression under conditions including a temperature of 165° C., a time of 30 minutes, and a pressure of 10 MPa, and thus a crosslinked polymer (ex11-1) was obtained. The gel fraction of the crosslinked polymer (ex11-1) is shown in Table 2.

Example 12

(1) Production of polymer composed of constitutional units (A), constitutional units (B), and constitutional units (C) (ethylene-n-octadecyl acrylate-methyl acrylates copolymer)

The atmosphere in a separable flask having a capacity of 0.3 L and equipped with a stirrer and a finger baffle was replaced by nitrogen, and then 80.00 g of A-1', 65.64 g of B-3, and 1.65 g of C-2 were added, and then heated and stirred under a pressure reduction of 1 kPa for 12 while setting an oil bath temperature at 130° C., and thus a polymer (ex12) (ethylene-n-octadecyl acrylate-methyl acrylate copolymer) was obtained. Moreover, the polymer (ex12) was compression molded at 150° C. for 10 minutes to prepare a specimen being 1 mm in thickness, which was then evaluated. The physical property values and the evaluation results of the polymer (ex12) are shown in Table 2.

(2) Preparation of resin composition comprising polymer and organic peroxide

Using a micro compounder (Xplore, manufactured by DSM), 100 parts by weight of the polymer (ex12) obtained in Example 12 (1) and 2.0 parts by weight of E-1 were kneaded under conditions including a kneading temperature of 80° C., a kneading time of 5 minutes, and a screw rotation speed of 100 rpm, and thus a resin composition comprising the polymer (ex12) and the organic peroxide was prepared.

(3) Preparation of crosslinked polymer

The resin composition obtained in Example 12 (2) was filled into a mold having a cavity size of 50 mm in length, 50 mm in width, and 0.3 mm in thickness and then was subjected to heating and compression under conditions including a temperature of 165° C., a time of 30 minutes, and a pressure of 10 MPa, and thus a crosslinked polymer (ex12-1) was obtained. The gel fraction of the crosslinked polymer (ex12-1) is shown in Table 2.

(4) Preparation of resin composition comprising polymer, organic peroxide, and foaming agent Using a micro compounder (Xplore, manufactured by DSM), 100 parts by weight of the polymer (ex12) obtained in Example 12 (1), 2.0 parts by weight of E-2, 8.2 parts by weight of G-1, 2.0 parts by weight of H-1, and 1.0 part by weight of H-2 were kneaded under conditions including a kneading temperature of 80° C., a kneading time of 5 minutes, and a screw rotation speed of 100 rpm, and thus a resin composition comprising the polymer (ex12), the organic peroxide and the foaming agent was prepared.

(5) Preparation of foamed article

The resin composition obtained in Example 12 (4) was filled into a mold having a cavity size of 45 mm in length, 45 mm in width, and 5 mm in thickness and then was subjected to heating and compression under conditions including a temperature of 140° C., a time of 30 minutes, and a pressure of 20 MPa. Then, the mold was released at a temperature of 140° C., affording a foamed article. The gel fraction and the foamability of the foamed article are shown in Table 2.

Example 13

(1) Production of polymer composed of constitutional units (A), constitutional units (B), and constitutional units (C) (ethylene-n-hexadecyl acrylate-methyl acrylate copolymer)

The atmosphere in a separable flask having a capacity of 0.3 L and equipped with a stirrer and a finger baffle was replaced by nitrogen, and then 80.00 g of A-1', 58.83 g of B-4, and 1.65 g of C-2 were added, and then heated and stirred under a pressure reduction of 1 kPa for 12 while setting an oil bath temperature at 130° C., and thus a polymer (ex13) (ethylene-n-hexadecyl acrylate-methyl acrylate copolymer) was obtained. Moreover, the polymer (ex13) was compression molded at 150° C. for 10 minutes to prepare a specimen being 1 mm in thickness, which was then evaluated. The physical property values and the evaluation results of the polymer (ex13) are shown in Table 2.

(2) Preparation of resin composition comprising polymer and organic peroxide

Using a micro compounder (Xplore, manufactured by DSM), 100 parts by weight of the polymer (ex13) obtained in Example 13 (1) and 2.0 parts by weight of E-1 were kneaded under conditions including a kneading temperature of 80° C., a kneading time of 5 minutes, and a screw rotation speed of 100 rpm, and thus a resin composition comprising the polymer (ex13) and the organic peroxide was prepared.

(3) Preparation of crosslinked polymer

The resin composition obtained in Example 13 (2) was filled into a mold having a cavity size of 50 mm in length, 50 mm in width, and 0.3 mm in thickness and then was subjected to heating and compression under conditions including a temperature of 165° C., a time of 30 minutes, and a pressure of 10 MPa, and thus a crosslinked polymer (ex13-1) was obtained. The gel fraction of the crosslinked polymer (ex13-1) is shown in Table 2.

(4) Preparation of resin composition comprising polymer, organic peroxide, and foaming agent Using a micro compounder (Xplore, manufactured by DSM), 100 parts by weight of the polymer (ex13) obtained in Example 13 (1), 2.0 parts by weight of E-2, 8.2 parts by weight of G-1, 2.0 parts by weight of H-1, and 1.0 part by weight of H-2 were kneaded under conditions including a kneading temperature of 80° C., a kneading time of 5 minutes, and a screw rotation speed of 100 rpm, and thus a resin composition comprising the polymer (ex13), the organic peroxide and the foaming agent was prepared.

(5) Preparation of foamed article

The resin composition obtained in Example 13 (4) was filled into a mold having a cavity size of 45 mm in length, 45 mm in width, and 5 mm in thickness and then was subjected to heating and compression under conditions including a temperature of 140° C., a time of 30 minutes, and a pressure of 20 MPa. Then, the mold was released at a temperature of 140° C., affording a foamed article. The gel fraction and the foamability of the foamed article are shown in Table 2.

Comparative Example 1

(1) Production of polymer composed of constitutional units (B) (octadecyl methacrylate homopolymer)

18.8 mL of octadecyl methacrylate (produced by Tokyo Chemical Industry Co., Ltd.) and 39.4 mg of 2,2c-azobisisobutyronitrile (10-hour half-life temperature: 65° C.) (produced by Tokyo Chemical Industry Co., Ltd.) were dissolved in 18.5 mL of toluene, and stirring was performed under a nitrogen atmosphere, at 80° C. for 3 hours in a 100 mL eggplant flask, and then the mixture was reprecipitated in 100 mL of ethanol, and thus a polymer composed of the units (B) (cf1, octadecyl methacrylate homopolymer) was obtained. Moreover, the polymer (cf1) was compression molded at 120° C. for 10 minutes to prepare specimens being 1 mm and 0.5 mm in thickness, respectively, which were then evaluated. The physical property values and the evaluation results of the polymer (cf1) are shown in Table 2. The activation energy of flow E and the extensional viscosity nonlinear index k were disclosed as being not measurable because the specimens were poor in shape retention at the measurement temperatures and the specimens sagged downward to deform during the measurement.

(2) Preparation of resin composition comprising polymer and organic peroxide

Using a micro compounder (Xplore, manufactured by DSM), 100 parts by weight of the polymer (cf1) obtained in Comparative Example 1 (1) and 2.0 parts by weight of E-1 were kneaded under conditions including a kneading temperature of 80° C., a kneading time of 5 minutes, and a screw rotation speed of 100 rpm, and thus a resin composition comprising the polymer (cf1) and the organic peroxide was prepared.

(3) Preparation of crosslinked polymer

The resin composition obtained in Comparative Example 1 (2) was filled into a mold having a cavity size of 50 mm in length, 50 mm in width, and 0.3 mm in thickness and then was subjected to heating and compression under conditions including a temperature of 165° C., a time of 30 minutes, and a pressure of 10 MPa, and thus a crosslinked polymer (cf1-1) was obtained. The gel fraction of the crosslinked polymer (cf1-1) is shown in Table 2.

(4) Preparation of resin composition comprising polymer, organic peroxide, and foaming agent Using a micro compounder (Xplore, manufactured by DSM), 100 parts by weight of the polymer (cf1) obtained in Comparative Example 1 (1), 2.0 parts by weight of E-2, 8.2 parts by weight of G-1, 2.0 parts by weight of H-1, and 1.0 part by weight of H-2 were kneaded under conditions including a kneading temperature of 80° C., a kneading time of 5 minutes, and a screw rotation speed of 100 rpm, and thus a resin composition comprising the polymer (cf1), the organic peroxide and the foaming agent was prepared.

(5) Preparation of foamed article

The resin composition obtained in Comparative Example 1 (4) was filled into a mold having a cavity size of 45 mm in length, 45 mm in width, and 5 mm in thickness and then was subjected to heating and compression under conditions including a temperature of 140° C., a time of 30 minutes, and a pressure of 20 MPa. Then, the mold was at a temperature of 140° C., but no foamed article was obtained. The foamability of the foamed article are shown in Table 2.

Comparative Example 2

(1) Production of polymer composed of constitutional units (B) (reaction product of glycidyl methacrylate homopolymer/n-octadecanoic acid)

85.5 mL of glycidyl methacrylate (produced by Tokyo Chemical Industry Co., Ltd.) and 5.5 g of di-tert-butyl peroxide (10-hour half-life temperature: 124° C.) (produced by Tokyo Chemical Industry Co., Ltd.) were dissolved in 37.6 g of n-pentyl propionate, and stirring was performed under a nitrogen atmosphere, at 152° C. for 5.5 hours in a 200 mL eggplant flask, and then the mixture was reprecipitated in 1 L of ethanol, and thus an intermediate (cf2-0, glycidyl methacrylate homopolymer) was obtained.

To 20 g of the resulting intermediate (cf2-0) was added 40 g of B-3, and stirring was performed in the presence of nitrogen at 130° C. for 3 hours in a 100-mL eggplant flask. The product was dissolved in 100 mL of tetrahydrofuran and then was reprecipitated in 500 mL of ethanol, and a polymer (cf2) composed of the units (B) (reaction product of glycidyl methacrylate homopolymer/n-octadecanoic acid) was thereby obtained. Moreover, the polymer (cf2) was compression molded at 120° C. for 10 minutes to prepare specimens being 1 mm and 0.5 mm in thickness, respectively, which were then evaluated. The physical property values and the evaluation results of the polymer (cf2) are shown in Table 2. The activation energy of flow E and the extensional viscosity nonlinear index k were not measurable because the specimens were poor in shape retention at the measurement temperatures and the specimens sagged downward to deform during the measurement.

(2) Preparation of resin composition comprising polymer and organic peroxide

Using a micro compounder (Xplore, manufactured by DSM), 100 parts by weight of the polymer (cf2) obtained in Comparative Example 2 (1) and 2.0 parts by weight of E-1 were kneaded under conditions including a kneading temperature of 80° C., a kneading time of 5 minutes, and a screw rotation speed of 100 rpm, and thus a resin composition comprising the polymer (cf2) and the organic peroxide was prepared.

(3) Preparation of crosslinked polymer

The resin composition obtained in Comparative Example 2 (2) was filled into a mold having a cavity size of 50 mm in length, 50 mm in width, and 0.3 mm in thickness and then was subjected to heating and compression under conditions including a temperature of 165° C., a time of 30 minutes, and a pressure of 10 MPa, and thus a crosslinked polymer (cf2-1) was obtained. The gel fraction of the crosslinked polymer (cf2-1) is shown in Table 2.

(4) Preparation of resin composition comprising polymer, organic peroxide, and foaming agent Using a micro compounder (Xplore, manufactured by DSM), 100 parts by weight of the polymer obtained in Comparative Example 2 (1), 2.0 parts by weight of E-2, 8.2 parts by weight of G-1, 2.0 parts by weight of H-1, and 1.0 part by weight of H-2 were kneaded under conditions including a kneading temperature of 80° C., a kneading time of 5 minutes, and a screw rotation speed of 100 rpm, and thus a resin composition comprising the polymer (cf2), the organic peroxide and the foaming agent was prepared.

(5) Preparation of foamed article

The resin composition obtained in Comparative Example 2 (4) was filled into a mold having a cavity size of 45 mm in length, 45 mm in width, and 5 mm in thickness and then was subjected to heating and compression under conditions including a temperature of 140° C., a time of 30 minutes, and a pressure of 20 MPa. Then, the mold was at a temperature of 140° C., but no foamed article was obtained. The foamability of the foamed article are shown in Table 2.

Comparative Example 3

(1) Ethylene-octene copolymer

An ethylene-octene copolymer ENGAGE 8003 (produced by The Dow Chemical Company) was compression molded at 120° C. for 10 minutes to prepare specimens being 1 mm and 0.5 mm in thickness, respectively, which were then evaluated. The physical property values and the evaluation results of the ethylene-octene copolymer (cf3) are shown in Table 2.

(2) Preparation of resin composition comprising polymer and organic peroxide

Using a micro compounder (Xplore, manufactured by DSM), 100 parts by weight of the ethylene-octene copolymer ENGAGE 8003 (produced by The Dow Chemical Company) and 2.0 parts by weight of E-1 were kneaded under conditions including a kneading temperature of 80° C., a kneading time of 5 minutes, and a screw rotation speed of 100 rpm, and thus a resin composition comprising the polymer (cf3)2 and the organic peroxide was prepared.

(3) Preparation of crosslinked polymer

The resin composition obtained in Comparative Example 3 (2) was filled into a mold having a cavity size of 50 mm in length, 50 mm in width, and 0.3 mm in thickness and then was subjected to heating and compression under conditions including a temperature of 165° C., a time of 30 minutes, and a pressure of 10 MPa, and thus a crosslinked polymer (cf3-1) was obtained. The gel fraction of the crosslinked polymer (cf3-1) is shown in Table 2.

(4) Preparation of resin composition comprising polymer, organic peroxide, and foaming agent Using a micro compounder (Xplore, manufactured by DSM), 100 parts by weight of the ethylene-octene copolymer ENGAGE 8003 (produced by The Dow Chemical Company), 2.0 parts by weight of E-2, 8.2 parts by weight of G-1, 2.0 parts by weight of H-1, and 1.0 part by weight of H-2 were kneaded under conditions including a kneading temperature of 80° C., a kneading time of 5 minutes, and a screw rotation speed of 100 rpm, and thus a resin composition comprising the polymer (cf3), the organic peroxide and the foaming agent was prepared.

(5) Preparation of foamed article

The resin composition obtained in Comparative Example 3 (4) was filled into a mold having a cavity size of 45 mm in length, 45 mm in width, and 5 mm in thickness and then was subjected to heating and compression under conditions including a temperature of 140° C., a time of 30 minutes, and a pressure of 20 MPa. Then, the mold was released at a temperature of 140° C., affording a foamed article. The gel fraction and the foamability of the foamed article are shown in Table 2.

Comparative Example 4

(1) Production of ethylene-α-olefin copolymer

To a 5-liter autoclave equipped with a stirrer, dried under reduced pressure and then purged with nitrogen was added 1.4 L of a toluene solution containing 706 g of α-olefin C2024 (a mixture of olefins having 18 carbon atoms, 20 carbon atoms, 22 carbon atoms, 24 carbon atoms, and 26 carbon atoms, respectively, produced by INEOS), and subsequently, toluene was added so that the liquid amount might become 3 L. The temperature of the autoclave was raised to 60° C., and then ethylene was added so that its partial pressure might become 0.1 MPa, thereby stabilizing the system. A hexane solution of triisobutylaluminum (0.34 mol/L, 14.7 ml) was added thereto. Subsequently, a toluene solution of dimethylanilinium tetrakis(pentafluorophenyl) borate (1.0 mmol/13.4 mL) and a toluene solution of diphenylmethylene(cyclopentadienyl)(fluorenyl)zirconium dichloride (0.2 mmol/L, 7.5 mL) were charged to initiate polymerization, and then ethylene gas was fed such that the total pressure is kept constant. After a lapse of 3 hours, 2 ml of ethanol was added, thereby stopping the polymerization. After the stop of the polymerization, an ethylene-α-olefin copolymer (cf4) was deposited by adding a toluene solution containing the polymer into acetone, and the polymer (cf4) collected by filtration was further washed with acetone twice. The resulting polymer (cf4) was vacuum dried at 80° C., affording 369 g of the polymer (cf4). The polymer (cf4) was compression molded at 100° C. for 10 minutes to prepare specimens being 1 mm and 0.5 mm in thickness, respectively, which were then evaluated.

The physical property values and the evaluation results of the polymer (cf4) are shown in Table 2.

Example 14

(1) Production of crosslinked polymer (crosslinked ethylene-n-docosyl acrylate-n-eicosyl acrylate-n-octadecyl acrylate-methyl acrylate copolymer)

Using a twin screw extruder, 100 parts by weight of the polymer (exit) obtained in Example 11 (1), 1.5 parts by weight of E-3, 1.5 parts by weight of F-1, 0.1 parts by weight of I-1, and 0.1 parts by weight of J-1 were kneaded under conditions including a kneading temperature of 220° C., a residence time of 2 minutes, and a screw rotation speed of 500 rpm, and thus a crosslinked polymer (ex14-1, crosslinked ethylene n-docosyl acrylate-n-eicosyl acrylate-n-octadecyl acrylate-methyl acrylate copolymer) was prepared.

(2) Evaluation of crosslinked polymer

The gel fraction and the permanent compression set were evaluated for the crosslinked polymer (ex14-1) obtained in Example 14 (1). The evaluated results are shown in Table 3. The permanent compression set was not measurable because the specimen was drawn to deform when being detached from a compression plate.

Example 15

(1) Production of resin composition containing a polymer and a polymer different from that polymer (resin composition comprising an ethylene-n-docosyl acrylate-n-eicosyl acrylate-n-octadecyl acrylate-methyl acrylate copolymer and a polypropylene homopolymer)

Using a twin screw extruder, 80 parts by weight of the polymer (ex11) obtained in Example 11 (i), 20 parts by weight of D-1, 0.1 parts by weight of I-1, and 0.1 parts by weight of J-1 were kneaded under conditions including a kneading temperature of 220° C., a residence time of 2 minutes, and a screw rotation speed of 500 rpm, and thus a resin composition (ex15) (resin composition comprising an ethylene-n-docosyl acrylate-n-eicosyl acrylate-n-octadecyl acrylate-methyl acrylate copolymer and a polypropylene homopolymer) was prepared.

(2) Evaluation of resin composition

The permanent compression set was evaluated for the resin composition (ex15) obtained in Example 15 (1). The evaluated results are shown in Table 3. The permanent compression set was not measurable because the specimen was drawn to deform when being detached from a compression plate.

Example 16

(1) Production of resin composition containing a polymer and a polymer different from that polymer (resin composition comprising an ethylene-n-docosyl acrylate-n-eicosyl acrylate-n-octadecyl acrylate-methyl acrylate copolymer and a polypropylene homopolymer)

A resin composition (ex16) (resin composition comprising an ethylene-n-docosyl acrylate-n-eicosyl acrylate-n-octadecyl acrylate-methyl acrylate copolymer and a polypropylene homopolymer) was prepared in the same manner as Example 15 except that the amount of the polymer (ex11) obtained in Example 11 (1) from 80 parts by weight to 90 parts by weight and the amount of D-1 from 20 parts by weight to 10 parts by weight.

(2) Evaluation of resin composition

The permanent compression set was evaluated for the resin composition (ex16) obtained in Example 16 (1). The evaluated results are shown in Table 3. The permanent compression set was not measurable because the specimen was drawn to deform when being detached from a compression plate.

Example 17

(1) Production of crosslinked resin composition (resin composition comprising a crosslinked ethylene-n-docosyl acrylate-n-eicosyl acrylate-n-octadecyl acrylate-methyl acrylate copolymer and a polypropylene homopolymer)

Using a twin screw extruder, 80 parts by weight of the polymer (ex11) obtained in Example 11 (1), 20 parts by weight of D-1, 1.0 part by weight of E-3, 1.0 part by weight of F-1, 0.1 parts by weight of I-1, and 0.1 parts by weight of J-1 were kneaded under conditions including a kneading temperature of 220° C., a residence time of 2 minutes, and a screw rotation speed of 500 rpm, and thus a crosslinked resin composition (ex16, resin composition comprising a crosslinked ethylene-n-docosyl acrylate-n-eicosyl acrylate-n-octadecyl acrylate-methyl acrylate copolymer and a polypropylene homopolymer) was prepared.

(2) Evaluation of crosslinked resin composition

The gel fraction and the permanent compression set were evaluated for the crosslinked resin composition obtained in Example 17 (1). The evaluated results are shown in Table 3.

Example 18

(1) Production of crosslinked resin composition (resin composition comprising a crosslinked ethylene-n-docosyl acrylate-n-eicosyl acrylate-n-octadecyl acrylate-methyl acrylate copolymer and a polypropylene homopolymer)

A resin composition (ex18) (resin composition comprising a crosslinked ethylene-n-docosyl acrylate-n-eicosyl acrylate-n-octadecyl acrylate-methyl acrylate copolymer and a polypropylene homopolymer) was prepared in the same manner as Example 17 except that the amount of E-3 from 1.0 part by weight to 1.5 parts by weight and the amount of F-1 from 1.0 part by weight to 1.5 part by weight.

(2) Evaluation of crosslinked resin composition

The gel fraction and the permanent compression set were evaluated for the crosslinked resin composition (ex18) obtained in Example 18 (1). The evaluated results are shown in Table 3.

Example 19

(1) Production of crosslinked resin composition (resin composition comprising a crosslinked ethylene-n-docosyl acrylate-n-eicosyl acrylate-n-octadecyl acrylate-methyl acrylate copolymer and a polypropylene homopolymer)

A crosslinked resin composition (ex19, resin composition comprising a crosslinked ethylene-n-docosyl acrylate-n-eicosyl acrylate-n-octadecyl acrylate-methyl acrylate copolymer and a polypropylene homopolymer) was prepared in the same manner as Example 17 except that the amount of the polymer (ex11) obtained in Example 11 (1) from 80 parts by weight to 90 parts by weight and the amount of D-1 from 20 parts by weight to 10 parts by weight.

(2) Evaluation of crosslinked resin composition

The gel fraction and the permanent compression set were evaluated for the crosslinked resin composition (ex19) obtained in Example 19 (1). The evaluated results are shown in Table 3.

Example 20

(1) Production of crosslinked resin composition (resin composition comprising a crosslinked ethylene-n-docosyl acrylate-n-eicosyl acrylate-n-octadecyl acrylate-methyl acrylate copolymer and a polypropylene random copolymer)

A crosslinked resin composition (ex20, resin composition comprising a crosslinked ethylene-n-docosyl acrylate-n-eicosyl acrylate-n-octadecyl acrylate-methyl acrylate copolymer and a polypropylene random copolymer) was prepared in the same manner as Example 17 except that 20 parts by weight of E-3 was exchanged for 20 parts by weight of D-2.

(2) Evaluation of crosslinked resin composition

The gel fraction and the permanent compression set were evaluated for the crosslinked resin composition (ex20) obtained in Example 20 (1). The evaluated results are shown in Table 3.

Example 21

(1) Production of crosslinked resin composition (resin composition comprising a crosslinked ethylene-n-docosyl acrylate-n-eicosyl a crylate-n-octadecyl acrylate-methyl acrylate copolymer and high-density polyethylene)

A crosslinked resin composition (ex21, resin composition comprising a crosslinked ethylene-n-docosyl acrylate-n-eicosyl acrylate-n-octadecyl acrylate-methyl acrylate copolymer and high-density polyethylene) was prepared in the same manner as Example 17 except that 20 parts by weight of D-1 was exchanged for 20 parts by weight of D-3.

(2) Evaluation of crosslinked resin composition

The gel fraction and the permanent compression set were evaluated for the crosslinked resin composition (ex21) obtained in Example 21 (1). The evaluated results are shown in Table 3.

TABLE 1

| | Example | | | | | | | |
|---|---|---|---|---|---|---|---|---|
| | 1 | 2 | 3 | 4 | 5 | 6 | 7 | 8 |
| Noncrosslinked polymer | | | | | | | | |
| Content of constitutional unit (A) (%) | 88.9 | 88.9 | 92.2 | 95.3 | 88.9 | 88.8 | 88.9 | 88.9 |
| Content of constitutional unit (B) (%) | 4.4 | 6.0 | 5.6 | 4.5 | 8.3 | 9.5 | 9.7 | 9.3 |
| Content of constitutional unit (C) (%) | 6.6 | 5.0 | 2.2 | 0.2 | 2.8 | 1.7 | 1.3 | 1.8 |
| Content of unreacted compounds having a C14-C30 alkyl group-containing compound (wt %) | 1.6 | 12.9 | ND | ND | 6 | 2.2 | 2.6 | 0.4 |
| Melting peak temperature Tm (° C.) | 41 | 43 | 32 | 48 | 46 | 53 | 53 | 36 |
| Melting enthalpy ΔH (J/g) | 65 | 69 | 54 | 54 | 79 | 92 | 104 | 82 |
| Ratio A defined by Formula (I) | 0.55 | 0.71 | 0.73 | 0.69 | 0.65 | 0.71 | 0.85 | 0.44 |
| Activation energy of flow $E_a$ (kJ/mol) | ND | ND | ND | 79.78 | ND | ND | 61.95 | ND |
| Extensional viscosity nonlinear index k | ND | ND | ND | 1.18 | ND | ND | 1.06 | ND |
| Molding processability | ○ | Δ | ○ | Δ | ○ | ○ | ○ | ○ |
| Shape retention | ○ | ○ | ○ | ○ | ○ | ○ | ○ | ○ |
| Water vapor transmission rate (gmm/m² · 24 hours) | 0.51 | 0.49 | ND | 0.45 | 0.26 | 0.10 | 0.11 | ND |
| Gel fraction of crosslinked polymer (wt %) | 92 | ND | ND | 88 | 86 | 89 | ND | ND |
| Gel fraction of foam (wt %) | 93 | ND | ND | 96 | 86 | 84 | ND | ND |
| Foamability | ○ | ND | ND | ○ | ○ | ○ | ND | ND |

In the table, ND means "unevaluated" (for foamability) or "unmeasured" (for properties other than foamability).

TABLE 2

| | Example | | | | | Comparative Example | | | |
|---|---|---|---|---|---|---|---|---|---|
| | 9 | 10 | 11 | 12 | 13 | 1 | 2 | 3 | 4 |
| Noncrosslinked polymer | | | | | | | | | |
| Content of constitutional unit (A) (%) | 88.9 | 88.9 | 87.1 | 87.1 | 87.1 | | | | |
| Content of constitutional unit (B) (%) | 9.8 | 9.9 | 10.8 | 10.8 | 10.8 | | | | |
| Content of constitutional unit (C) (%) | 1.2 | 1.1 | 2.0 | 2.1 | 2.1 | | | | |
| Content of unreacted compounds having a C14-C30 alkyl group-containing compound (wt %) | 1.9 | 1.2 | 0.9 | 1.4 | 1.5 | ND | ND | ND | ND |
| Melting peak temperature Tm (° C.) | 25 | 28 | 50 | 36 | 25 | 35 | 48 | 79 | 34 |
| Melting enthalpy ΔH (J/g) | 73 | 52 | 92 | 76 | 65 | 64 | 49 | 33 | 83 |
| Ratio A defined by Formula (I) | 0.49 | 0.47 | 0.68 | 0.48 | 0.53 | 10.4 | Unmeasurable | 1.09 | 0.94 |
| Activation energy of flow $E_a$ (kJ/mol) | ND | 64.85 | 65.57 | 60.56 | 63.96 | Unmeasurable | Unmeasurable | 36.80 | ND |
| Extensional viscosity nonlinear index k | ND | 1.10 | ND | ND | ND | Unmeasurable | Unmeasurable | 0.13 | ND |
| Molding processability | ○ | Δ | ○ | ○ | Δ | x | x | Δ | Δ |
| Shape retention | ○ | ○ | ○ | ○ | ○ | x | x | x | ○ |

TABLE 2-continued

|  | Example | | | | | Comparative Example | | | |
|---|---|---|---|---|---|---|---|---|---|
|  | 9 | 10 | 11 | 12 | 13 | 1 | 2 | 3 | 4 |
| Water vapor transmission rate (gmm/m² · 24 hours) | 0.90 | 1.43 | 0.09 | 0.36 | 0.99 | Unmeasurable | Unmeasurable | 0.27 | 0.05 |
| Gel fraction of crosslinked polymer (wt %) | ND | ND | 90 | 89 | 89 | 11 | 10 | 98 | ND |
| Gel fraction of foam (wt %) | ND | ND | ND | 88 | 87 | ND | ND | 90 | ND |
| Foamability | ND | ND | ND | ○ | ○ | x | x | ○ | ND |

In the table, ND means "unevaluated" (for foamability) or "unmeasured" (for properties other than foamability).

TABLE 3

|  | Example | | | | | | | |
|---|---|---|---|---|---|---|---|---|
|  | 14 | 15 | 16 | 17 | 18 | 19 | 20 | 21 |
| Polymer obtained in Example 11(1) (ex11) (part(s) by weight) | 100 | 80 | 90 | 80 | 80 | 90 | 80 | 80 |
| Propylene homopolymer (D-1) (part by weight) | 0 | 20 | 10 | 20 | 20 | 10 | 0 | 0 |
| Propylene random copolymer (D-2) (part by weight) | 0 | 0 | 0 | 0 | 0 | 0 | 20 | 0 |
| High-density polyethylene (D-3) (part by weight) | 0 | 0 | 0 | 0 | 0 | 0 | 0 | 20 |
| Organic peroxide (E-3) (part by weight) | 1.5 | 0 | 0 | 1 | 1.5 | 1 | 1 | 1 |
| Crosslinking aid (F-1) (part by weight) | 1.5 | 0 | 0 | 1 | 1.5 | 1 | 1 | 1 |
| Antioxidant (I-1) (part by weight) | 0.1 | 0.1 | 0.1 | 0.1 | 0.1 | 0.1 | 0.1 | 0.1 |
| Heat stabilizer (J-1) (part by weight) | 0.1 | 0.1 | 0.1 | 0.1 | 0.1 | 0.1 | 0.1 | 0.1 |
| Melting enthalpy ΔH (J/g) | 84 | 76 | 82 | 75 | 73 | 79 | 69 | 65 |
| Gel fraction (wt %) | 57 | ND | ND | 70 | 76 | 60 | 22 | 43 |
| Permanent compression set (%) | Unmeasurable | Unmeasurable | Unmeasurable | 56 | 51 | 25 | 50 | 28 |

In the table, ND means "unmeasured."

The invention claimed is:

1. A polymer comprising structural units (A) derived from ethylene and constitutional units (B) represented by formula (1) below and optionally comprising at least one type of constitutional units (C) selected from the group consisting of constitutional units represented by formula (2) below and constitutional units represented by formula (3) below, wherein where the total number of the units (A), the units (B), and the units (C) is 100%, the number of the units (A) accounts for 70% to 99% and the total number of the units (B) and the units (C) accounts for 1% to 30%; and where the total number of the units (B) and the units (C) is 100%, the number of the units (B) accounts for 1% to 100% and the number of the units (C) accounts for 0% to 99%, formula (1)

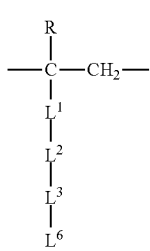

in formula (1) R represents a hydrogen atom or methyl group, $L^1$ represents —CO—O—, —O—CO—, or —O—, $L^2$ represents a single bond, —CH₂—, —CH₂—CH₂—, —CH₂—CH₂—CH₂—, —CH₂—CH(OH)—CH₂—, or —CH₂—CH(CH₂OH)—, $L^3$ represents a single bond, —CO—O—, —O—CO—, —O—, —CO—NH—, —NH—CO—, —CO—NH—CO—, —NH—CO—NH—, —NH—, or —N(CH₃)—, $L^6$ represents an alkyl group having 14 to 30 carbon atoms;

formula (2)

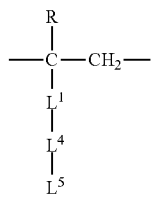

in formula (2),

R represents a hydrogen atom or a methyl group, $L^1$ represents —CO—O—, —O—CO—, or —O—, $L^4$ represents an alkylene group having 1 to 8 carbon atoms, $L^5$ represents a hydrogen atom, an epoxy group, —CH(OH)—CH₂OH, a carboxyl group, a hydroxyl group, an amino group, or an alkylamino group having 1 to carbon atoms;

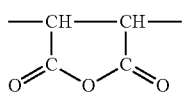

formula (3)

in each of the horizontal chemical formulae represented by $L^1$, $L^2$, or $L^3$ in formula (1) and formula (2) above, the left side thereof corresponds to the top side of formula (1) or formula (2) and the right side thereof corresponds to the bottom side of formula (1) or formula (2), wherein a ratio A defined by formula (I) is 0.95 or less, and wherein $A=\alpha_1/\alpha_0$ (I) in formula (I), wherein $\alpha_1$ is a value obtained by a method comprising: measuring the absolute molecular weight and the intrinsic viscosity of a polymer by gel permeation chromatography using an apparatus equipped with a light scattering detector and a viscosity detector, plotting the measured data with logarithms of absolute molecular weights as abscissa against logarithms of intrinsic viscosities as ordinate, approximating with formula (I-I) in the least squares sense logarithms of absolute molecular weights and logarithms of intrinsic viscosities within the range of from the logarithm of the weight-average molecular weight of the polymer to the logarithm of the z-average molecular weight of the polymer on the abscissa, and representing the slope of the straight line showing formula (I-I) by $\alpha_1$, $\log [\eta_1]=\alpha_1 \log M_1+\log K_1$  formula (I-I)

in formula (I-I), $[\eta_1]$ represents the intrinsic viscosity (unit: dl/g) of the polymer, $M_1$ represents the absolute molecular weight of the polymer, and $K_1$ is a constant; and wherein in formula (I), $\alpha_0$ is a value obtained by a method comprising: measuring the absolute molecular weight and the intrinsic viscosity of a polyethylene standard substance 1475a by gel permeation chromatography using an apparatus equipped with a light scattering detector and a viscosity detector, plotting the measured data with logarithms of absolute molecular weights as abscissa against logarithms of intrinsic viscosities as ordinate, approximating with formula (I-II) in the least squares sense logarithms of absolute molecular weights and logarithms of intrinsic viscosities within the range of from the logarithm of the weight-average molecular weight of the polyethylene standard substance 1475a to the logarithm of the z-average molecular weight of the polymer on the abscissa, and representing the slope of the straight line showing formula (I-II) by $\alpha_0$, $\log [\eta_0]=\alpha_0 \log M_0+\log K_0$  formula (I-II)

in formula (I-II), $[\eta_0]$ represents the intrinsic viscosity (unit: dl/g) of the polyethylene standard substance 1475a, $M_0$ represents the absolute molecular weight of the polyethylene standard substance 1475a, and $K_0$ is a constant; and wherein in the measurement of the absolute molecular weight and the intrinsic viscosity of the polymer and the polyethylene standard substance 1475a by gel permeation chromatography, the mobile phase is orthodichlorobenzene and the measurement temperature is 155° C.

2. The polymer according to claim 1, the fusion enthalpy (ΔH) of which observed within a temperature range of not lower than 10° C. and lower than 60° C. by differential scanning calorimetry is 50 J/g or more.

3. The polymer according to claim 1, having been cross-linked.

4. The polymer according to claim 1, having a gel fraction of 20% or more.

5. The polymer according to claim 1, wherein where the total number of all the constitutional units contained in the polymer is 100%, the total number of the units (A), the units (B), and the units (C) accounts for 90% or more.

6. A molded article comprising the polymer according to claim 1.

7. A foamed article comprising the polymer according to claim 1.

8. A resin composition comprising a polymer (1) that is the polymer according to claim 1, and a polymer (2) that is a polymer whose melting peak temperature or glass transition temperature observed by differential scanning calorimetry is 50° C. to 180° C. except for the exceptive polymers defined below, wherein where the total amount of the polymer (1) and the polymer (2) is 100% by weight, the content of the polymer (1) is 30% by weight to 99% by weight and the content of the polymer (2) is 1% by weight to 70% by weight;

wherein exceptive polymer is any polymer comprising constitutional units (A) derived from ethylene and constitutional unit (B) represented by formula (1) below and optionally comprising at least one type of constitutional units (C) selected from the group consisting of constitutional units represented by formula (2) below and constitutional units represented by formula (3) below, where the total number of the units (A), the units (B), and the units (C) is 100%, the number of the units (A) accounts for 70% to 99% and the total number of the units (B) and the units (C) accounts for 1% to 30%; where the total number of the units (B) and the units (C) is 100%, the number of the units (B) accounts for 1% to 100% and the number of the units (C) accounts for 0% to 99%,

formula (1)

in formula (1),

R represents a hydrogen atom or a methyl group, $L^1$ represents —CO—O—, —O—CO—, or —O—, $L^2$ represents a single bond, —CH$_2$—, —CH$_2$—CH$_2$—, —CH$_2$—CH$_2$—CH$_2$—, —CH$_2$—CH(OH)—CH$_2$—, or —CH$_2$—CH(CH$_2$OH)—, $L^3$ represents a single bond, —CO—O—, —O—CO—, —O—, —CO—NH—, —NH—CO—, —CO—NH—CO—, —NH—CO—NH—, —NH—, or —N(CH$_3$)—, $L^6$ represents an alkyl group having 14 to 30 carbon atoms;

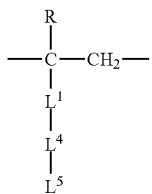

formula (2)

in formula (2),
R represents a hydrogen atom or a methyl group,
$L^1$ represents —CO—O—, —O—CO—, or —O—,
$L^4$ represents an alkylene group having 1 to 8 carbon atoms,
$L^5$ represents a hydrogen atom, an epoxy group, —CH(OH)—CH$_2$OH, a carboxyl group, a hydroxyl group, an amino group, or an alkylamino group having 1 to carbon atoms;

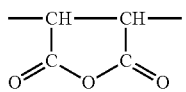

formula (3)

in each of the horizontal chemical formulae represented by $L^1$, $L^2$, or $L^3$ in formula (1) and formula (2) above, the left side thereof corresponds to the top side of formula (1) or formula (2) and the right side thereof corresponds to the bottom side of formula (1) or formula (2).

9. The polymer according to claim 1, wherein where the total number of the units (B) and the units (C) is 100%, the number of the units (B) accounts for 60% to 100% and the number of the units (C) accounts for 0% to 40%.

10. The polymer according to claim 1, wherein where the total number of the units (A), the units (B) and the units (C) is 100%, the number of the units (A) accounts for 70% to 97.5% and the total number of the units (B) and the units (C) accounts for 2.5% to 30%.

11. The polymer according to claim 10, wherein where the total number of the units (B) and the units (C) is 100%, the number of the units (B) accounts for 60% to 100% and the number of the units (C) accounts for 0% to 40%.

* * * * *